US012452461B2

(12) United States Patent
Jhu et al.

(10) Patent No.: US 12,452,461 B2
(45) Date of Patent: Oct. 21, 2025

(54) HIGH-LEVEL SYNTAX FOR VIDEO CODING

(71) Applicant: BEIJING DAJIA INTERNET INFORMATION TECHNOLOGY CO., LTD., Beijing (CN)

(72) Inventors: Hong-Jheng Jhu, San Diego, CA (US); Yi-Wen Chen, San Diego, CA (US); Xiaoyu Xiu, San Diego, CA (US); Tsung-Chuan Ma, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 129 days.

(21) Appl. No.: 17/978,099

(22) Filed: Oct. 31, 2022

(65) Prior Publication Data

US 2023/0199223 A1 Jun. 22, 2023

Related U.S. Application Data

(63) Continuation of application No. PCT/US2021/030275, filed on Apr. 30, 2021.

(Continued)

(51) Int. Cl.
*H04N 19/70* (2014.01)
*H04N 19/103* (2014.01)

(52) U.S. Cl.
CPC .......... *H04N 19/70* (2014.11); *H04N 19/103* (2014.11)

(58) Field of Classification Search
CPC .... H04N 19/70; H04N 19/174; H04N 19/109; H04N 19/103; H04N 19/179; H04N 19/172
See application file for complete search history.

(56) References Cited

U.S. PATENT DOCUMENTS

2006/0115000 A1 6/2006 Otsuka
2009/0175349 A1 7/2009 Ye et al.
(Continued)

FOREIGN PATENT DOCUMENTS

CN 102088603 A 6/2011

OTHER PUBLICATIONS

Hong-Jheng Jhu et al., "AHG9: On syntax signaling order in SPS" Joint Video Experts Team(JVET) of ITU-T SG 16 WP 3 and ISO/IEC JTC 1/SC 29/WG 11, JVET-R0332-v2, 18th Meeting by teleconference, Apr. 15-24, 2020, (14p).
(Continued)

*Primary Examiner* — Tsion B Owens
(74) *Attorney, Agent, or Firm* — Arch & Lake LLP

(57) ABSTRACT

A method, apparatus, and a non-transitory computer-readable storage medium for decoding a video signal are provided. A decoder may receive, through a bitstream, arranged syntax elements in sequence parameter set (SPS) level. The arranged syntax elements in the SPS level are arranged so that functions of related syntax elements are grouped in versatile video coding (VVC) syntax at a coding level. The decoder may receive, through the bitstream and in response to multiple syntax elements satisfy a predefined condition, a second syntax element immediately after the multiple syntax elements. The decoder may perform, through the bitstream, a related syntax element function to video data from the bitstream in accordance with the multiple syntax elements and the second syntax element.

18 Claims, 6 Drawing Sheets

Related U.S. Application Data

(60) Provisional application No. 63/019,250, filed on May 1, 2020.

(56) References Cited

U.S. PATENT DOCUMENTS

| | | | | |
|---|---|---|---|---|
| 2011/0058613 | A1 | 3/2011 | Han et al. | |
| 2021/0321130 | A1 * | 10/2021 | Li | H04N 19/46 |
| 2022/0141495 | A1 * | 5/2022 | Kim | H04N 19/11<br>375/240.26 |
| 2022/0182649 | A1 * | 6/2022 | Wang | H04N 19/31 |

OTHER PUBLICATIONS

Benjamin Bross et al., "Versatile Video Coding (Draft 8)" Joint Video Experts Team(JVET) of ITU-T SG 16 WP 3 and ISO/IEC JTC 1/SC 29/WG 11, JVET-Q2001-vE, 17th Meeting, Brussels, BE, Jan. 7-17, 2020, (514p).
Hong-Jheng Jhu et al., "AHG9: On SPS inter slice related syntaxes" Joint Video Experts Team(JVET) of ITU-T SG 16 WP 3 and ISO/IEC JTC 1/SC 29/WG 11, JVET-R0335-v2, 18th Meeting by teleconference, Apr. 15-24, 2020, (15p).
Zhipin Deng et al., "AHG9: PH and SH syntax cleanups" Joint Video Experts Team(JVET) of ITU-T SG 16 WP 3 and ISO/IEC JTC 1/SC 29/WG 11, JVET-Q0116-v1, 17th Meeting, Brussels, BE, Jan. 7-17, 2020, (9p).
International Search Report issued in Application No. PCT/US2021/030275 dated Oct. 1, 2021(5p).
Jie Chen et al., AHG9: PPS and SH syntax cleanup, Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R0162-v1, Status: Input document to JVET , Purpose: Proposal.(4P).
Martin Pettersson et al.,AHG9: Fixes related to the picture header, Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R0251, Status: Input document to JVET ,Purpose: Proposal.(4P).
The extended European search report of application No. 21797127.4 dated on Apr. 26, 2024.(1P).
Chinese Patent Office, Office Action issue in Application No. 202310842121.X dated on Feb. 8, 2024.(13p).
Notification to Grant Patent Right of CN application No. 202310842121.X dated May 7, 2024 with English translation, (6p).

* cited by examiner

HIGH-LEVEL SYNTAX FOR VIDEO CODING

CROSS-REFERENCE TO RELATED APPLICATIONS

This application is a continuation application of PCT application No. PCT/US2021/030275 filed on Apr. 30, 2021, which is based upon and claims priority to Provisional Application No. 63/019,250 filed on May 1, 2020, the entire contents thereof are incorporated herein by reference in their entirety for all purposes.

TECHNICAL FIELD

This disclosure is related to video coding and compression. More specifically, this application relates to high-level syntax in video bitstream applicable to one or more video coding standards.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for high-level syntax in video coding.

According to a first aspect of the present disclosure, a method for decoding a video signal is provided. The method may include a decoder receiving arranged syntax elements in a sequence parameter set (SPS) level. The arranged syntax elements in the SPS level are arranged so that syntax elements related to a predefined function are grouped at a coding level. The decoder may also receive, in response a first syntax element in the arranged syntax elements satisfying a predefined condition, a second syntax element in the arranged syntax elements immediately after the first syntax element. The decoder may also perform the predefined function to video data from the bitstream in accordance with the first syntax element and the second syntax element.

According to a second aspect of the present disclosure, a computing device is provided. The computing device may include one or more processors, a non-transitory computer-readable memory storing instructions executable by the one or more processors. The one or more processors may be configured to receive arranged syntax elements in a SPS level. The arranged syntax elements in the SPS level are arranged so that syntax elements related to a predefined function are grouped at a coding level. The one or more processors may further be configured to receive, in response to a first syntax element in the arranged syntax elements satisfying a predefined condition, in the arranged syntax elements immediately after the first syntax element. The one or more processors may further be configured to perform the predefined function to video data from a bitstream in accordance with the first syntax element and the second syntax element.

According to a third aspect of the present disclosure, a non-transitory computer-readable storage medium having stored therein instructions is provided. When the instructions are executed by one or more processors of the computing device, the instructions may cause the apparatus to receive arranged syntax elements in a SPS level so that syntax elements related to a predefined function are grouped at a coding level. The instructions may also cause the apparatus to receive, in response to a first syntax element in the arranged syntax elements satisfying a predefined condition, a second syntax element in the arranged syntax elements immediately after the first syntax element. Furthermore, the instructions may also cause the apparatus to perform the predefined function to video data from the bitstream in accordance with the first syntax element and the second syntax element.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
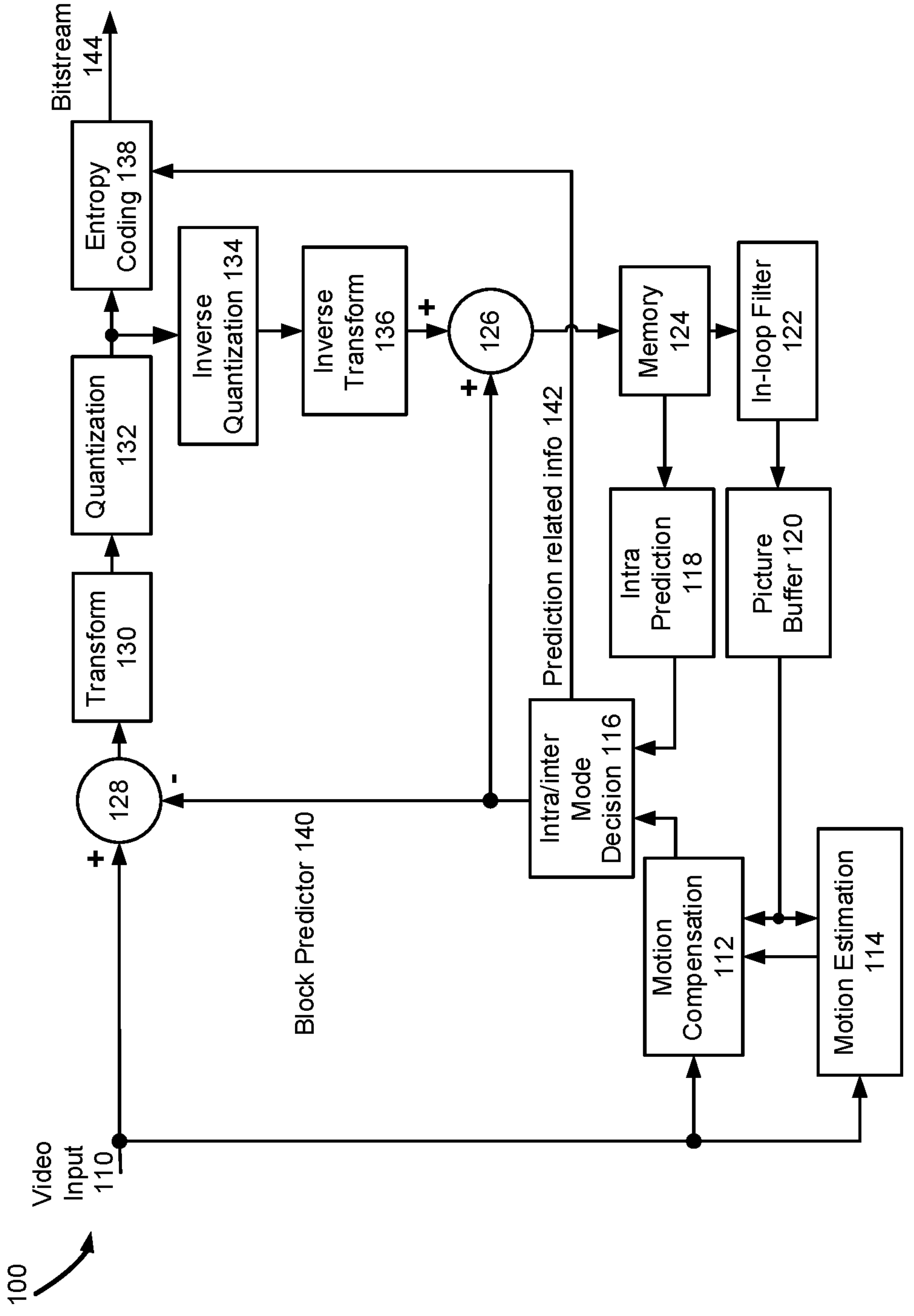
FIG. 1 is a block diagram of an encoder, according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore: instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

Figure 3A:
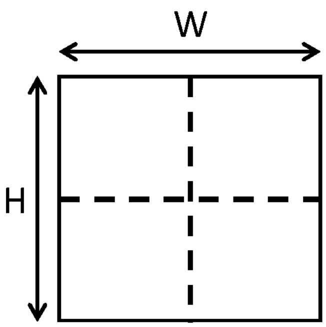
FIG. 3A is a diagram illustrating block partitions in a multi-type tree structure, according to an example of the present disclosure.

FIG. 3A shows a diagram illustrating block quaternary partition in a multi-type tree structure, in accordance with the present disclosure.

Figure 3B:
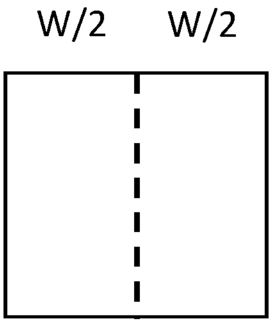
FIG. 3B is a diagram illustrating block partitions in a multi-type tree structure, according to an example of the present disclosure.

FIG. 3B shows a diagram illustrating block vertical binary partition in a multi-type tree structure, in accordance with the present disclosure.

Figure 3C:
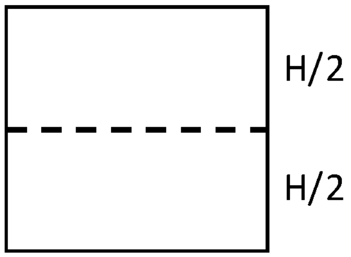
FIG. 3C is a diagram illustrating block partitions in a multi-type tree structure, according to an example of the present disclosure.

FIG. 3C shows a diagram illustrating block horizontal binary partition in a multi-type tree structure, in accordance with the present disclosure.

Figure 3D:
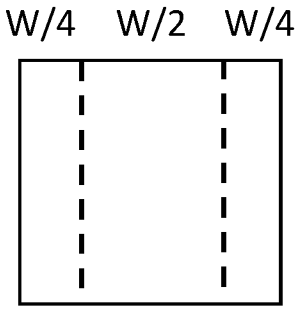
FIG. 3D is a diagram illustrating block partitions in a multi-type tree structure, according to an example of the present disclosure.

FIG. 3D shows a diagram illustrating block vertical ternary partition in a multi-type tree structure, in accordance with the present disclosure.

Figure 3E:
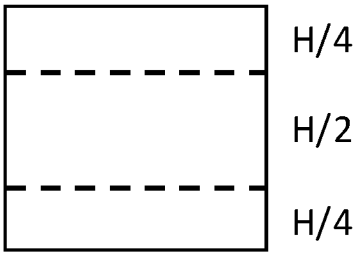
FIG. 3E is a diagram illustrating block partitions in a multi-type tree structure, according to an example of the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal.

Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized.

The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
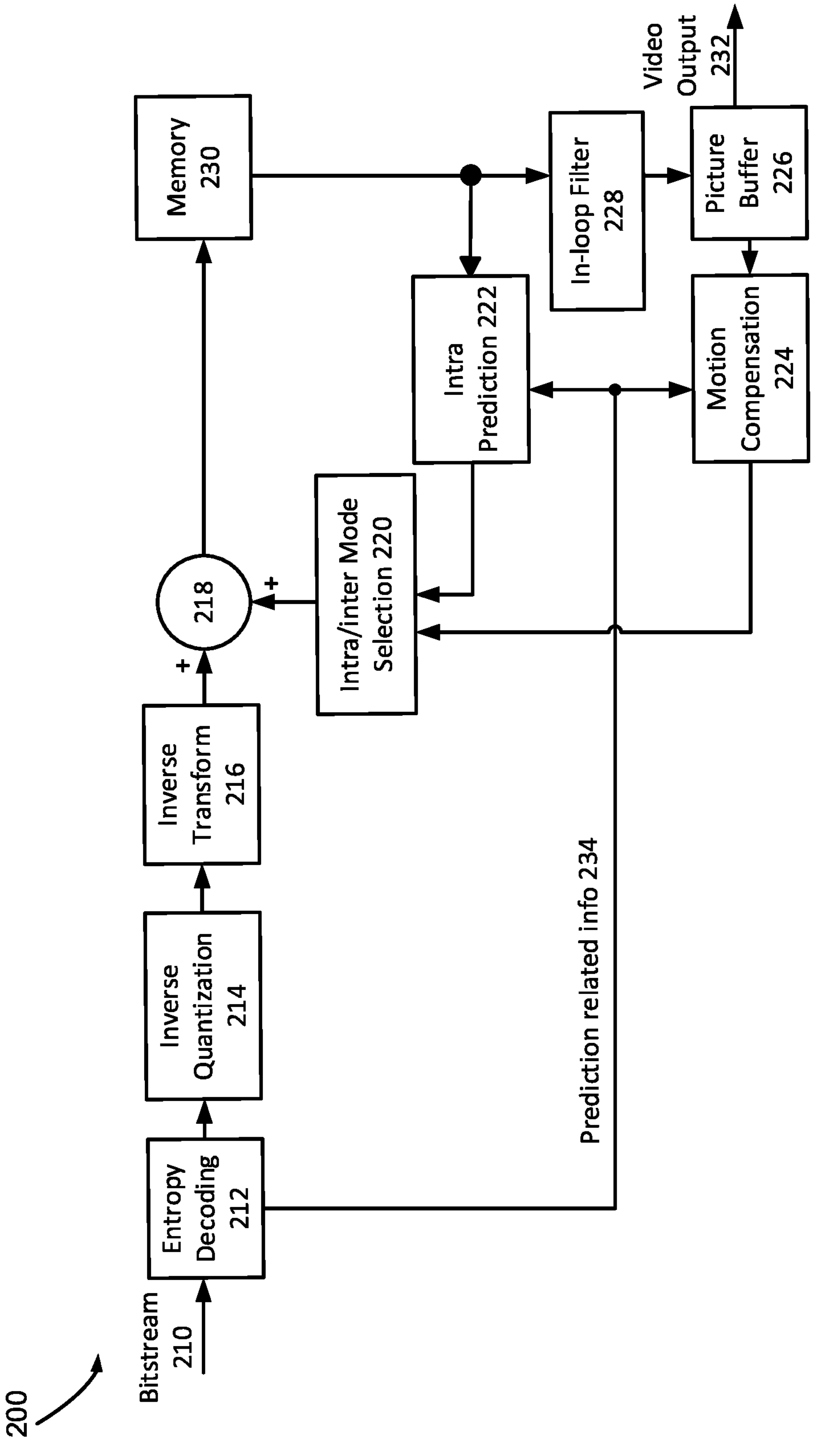
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232. Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

In general, the basic intra prediction scheme applied in the VVC is kept the same as that of the HEVC, except that several modules are further extended and/or improved, e.g., matrix weighted intra prediction (MIP) coding mode, intra sub-partition (ISP) coding mode, extended intra prediction with wide-angle intra directions, position-dependent intra prediction combination (PDPC) and 4-tap intra interpolation. The main focus of the disclosure is to improve the existing high-level syntax design in the VVC standard. The related background knowledge is elaborated in the following sections.

Like HEVC, VVC uses a NAL unit based bitstream structure. A coded bitstream is partitioned into NAL units which, when conveyed over lossy packet networks, should be smaller than the maximum transfer unit size. Each NAL unit consists of a NAL unit header followed by the NAL unit payload. There are two conceptual classes of NAL units. Video coding layer (VCL) NAL units containing coded sample data, e.g., coded slice NAL units, whereas non-VCL NAL units that contain metadata typically belonging to more than one coded picture, or where the association with a single coded picture would be meaningless, such as parameter set NAL units, or where the information is not needed by the decoding process, such as SEI NAL units.

In VVC, a two-byte NAL unit header was introduced with the anticipation that this design is sufficient to support future extensions. The syntax and the associated semantic of the NAL unit header in current VVC draft specification is illustrated in Table 1 and Table 2, respectively. How to read the Table 1 could be found in the VVC specification.

TABLE 1

| NAL unit header syntax | |
|---|---|
| nal_unit_header( ) { | Descriptor |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

TABLE 2

NAL unit header semantics forbidden_zero_bit shall be equal to 0.
nuh_reserved_zero_bit shall be equal to 0. The value 1 of nuh_reserved_zero_bit may be specified in the future by ITU-T | ISO/IEC. Decoders shall ignore (i.e. remove from the bitstream and discard) NAL units with nuh_reserved_zero_bit equal to 1.
nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T | ISO/IEC.
The value of nuh_layer_id shall be the same for all VCL NAL units of a coded picture. The value of nuh_layer_id of a coded picture or a PU is the value of the nuh_layer_id of the VCL NAL units of the coded picture or the PU.
The value of nuh_layer_id for AUD, PH, EOS, and FD NAL units is constrained as follows:
- If nal_unit_type is equal to AUD_NUT, nuh_layer_id shall be equal to vps_layer_id[ 0 ].
[Ed. (YK): Check whether it's better to treat the nuh_layer_id of AUD in the same way as for DCI NAL unit, VPS, and EOB, i.e., not constrained.]
- Otherwise, when nal_unit_type is equal to PH_NUT, EOS_NUT, or FD_NUT, nuh_layer_id shall be equal to the nuh_layer_id of associated VCL NAL unit.
NOTE 1 - The value of nuh_layer_id of DCI, VPS, and EOB NAL units is not constrained.
The value of nal_unit_type shall be the same for all pictures of a CVSS AU.
nal_unit_type specifies the NAL unit type, i.e., the type of RBSP data structure contained in the NAL unit as specified in Table 3.

TABLE 3

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4..6 | RSV_VCL_4... RSV_VCL_6 | Reserved non-IRAP VCL NAL unit types | VCL |
| 7<br>8 | IDR_W_RADL<br>IDR_N_LP | Coded slice of an IDR picture slice_layer_rbsp( ) | VCL |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11<br>12 | RSV_IRAP_11<br>RSV_IRAP_12 | Reserved IRAP VCL NAL unit types | VCL |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17<br>18 | PREFIX_APS_NUT<br>SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23<br>24 | PREFIX_SEI_NUT<br>SUFFIX_SEI_NUT | Supplemental enhancement information sei_rbsp( ) | non-VCL |
| 25 | FD_NUT | Filler data filler_data_rbsp( ) | non-VCL |
| 26 | RSV_NVCL_26 | Reserved non-VCL NAL unit types | non- |

TABLE 3-continued

| NAL unit type codes and NAL unit type classes | | | |
|---|---|---|---|
| nal_unit_ type | Name of nal_unit_type | Content of NAL unit and RBSP syntax structure | NAL unit type class |
| 27 | RSV_NVCL_27 | | VCL |
| 28..31 | UNSPEC_28... UNSPEC_31 | Unspecified non-VCL NAL unit types | non-VCL |

VVC inherits the parameter set concept of HEVC with a few modification and additions. Parameter sets can be either part of the video bitstream or can be received by a decoder through other means (including out-of-band transmission using a reliable channel, hard coding in encoder and decoder, and so on). A parameter set contains an identification, which is referenced, directly or indirectly, from the slice header as discussed in more detail later. The referencing process is known as "activation." Depending on the parameter set type, the activation occurs per picture or per sequence. The concept of activation through referencing was introduced, among other reasons, because implicit activation by virtue of the position of the information in the bitstream (as common for other syntax elements of a video codec) is not available in case of out-of-band transmission.

The video parameter set (VPS) was introduced to convey information that is applicable to multiple layers as well as sub-layers. The VPS was introduced to address these shortcomings as well as to enable a clean and extensible high-level design of multilayer codecs. Each layer of a given video sequence, regardless of whether they have the same or different sequence parameter sets (SPS), refer to the same VPS. The syntax of the video parameter set in current VVC draft specification is illustrated in Table 4. How to read the Table 4 is illustrated in the appendix section of this disclosure which could also be found in the VVC specification.

TABLE 4

| Video parameter set RBSP syntax | |
|---|---|
| video_parameter_set_rbsp( ) { | Descriptor |
| vps_video_parameter_set_id | u(4) |
| vps_max_layers_minus1 | u(6) |
| vps_max_sublayers_minus1 | u(3) |
| if( vps_max_layers_minus1 > 0 && vps_max_sublayers_minus1 > 0 ) | |
| vps_all_layers_same_num_sublayers_flag | u(1) |
| if( vps_max_layers_minus] > 0 ) | |
| vps_all_independent_layers_flag | u(1) |
| for( i = 0; i <= vps_max_layers_minus1; i++ ) { | |
| vps_layer_id[ i ] | u(6) |
| if( i > 0 && !vps_all_independent_layers_flag ) { | |
| vps_independent_layer_flag[ i ] | u(1) |
| if( !vps_independent_layer_flag[ i ] ) { | |
| max_tid_ref_present_flag[ i ] | u(1) |
| for( j = 0; j < i; j++ ) { | |
| vps_direct_ref_layer_flag[ i ][ j ] | u(1) |
| if( max_tid_ref_present_flag[ i ] && vps_direct_ref_layer_flag[ i ][ j ] ) | |
| max_tid_il_ref_pics_plus1[ i ][ j ] | u(3) |
| } | |
| } | |
| } | |
| } | |
| if( vps_max_layers_minus 1 > 0 ) { | |
| if( vps_all_independent_layers_flag ) | |
| each_layer_is_an_ols_flag | u(1) |
| if( !each_layer_is_an_ols_flag ) { | |
| if( !vps_all_independent_layers_flag ) | |
| ols_mode_idc | u(2) |
| if( ols_mode_idc = = 2 ) { | |
| num_output_layer_sets_minus1 | u(8) |
| for( i = 1; i <= num_output_layer_sets_minus1; i ++) | |
| for( j = 0; j <= vps_max_layers_minus1; j++ ) | |
| ols_output_layer_flag[ i ][ j ] | u(1) |
| } | |
| } | |
| } | |
| vps_num_ptls_minus1 | u(8) |
| for( i = 0; i <= vps_num_ptls_minus1; i++ ) { | |
| if( i > 0 ) | |
| pt_present_flag[ i ] | u(1) |
| if( vps_max_sublayers_minus1 > 0 && !vps_all_layers_same_num_sublayers_flag ) | |
| ptl_max_temporal_id[ i ] | u(3) |
| } | |
| while( !byte_aligned( ) ) | |
| vps_ptl_alignment_zero_bit /* equal to 0 */ | f(1) |
| for( i = 0; i <= vps_num_ptls_minus1; i++ ) | |
| profile_tier_level( pt_present_flag[ i ], ptl_max_temporal_id[ i ] ) | |
| for( i = 0; i < TotalNumOlss; i++ ) | |

TABLE 4-continued

| Video parameter set RBSP syntax | |
|---|---|
| if( vps_num_ptls_minus1 > 0 && vps_num_ptls_minus1 + 1 != TotalNumOlss ) | |
| ols_ptl_idx[ i ] | u(8) |
| if( !each_layer_is_an_ols_flag ) { | |
| vps_num_dpb_params_minus1 | ue(v) |
| if( vps_max_sublayers_minus1 > 0 ) | |
| vps_sublayer_dpb_params_present_flag | u(1) |
| for( i = 0; i < VpsNumDpbParams; i++ ) { | |
| if( vps_max_sublayers_minus1 > 0 && !vps_all_layers_same_num_sublayers_flag ) | |
| dpb_max_temporal_id[ i ] | u(3) |
| dpb_parameters( dpb_max_temporal_id[ i ], vps_sublayer_dpb_params_present_flag ) | |
| } | |
| for( i = 0; i < NumMultiLayerOlss; i++ ) { | |
| ols_dpb_pic_width[ i ] | ue(v) |
| ols_dpb_pic_height[ i ] | ue(v) |
| ols_dpb_chroma_format[ i ] | u(2) |
| ols_dpb_bitdepth_minus8[ i ] | ue(v) |
| if( VpsNumDpbParams > 1 && vps_num_dpb_params != NumMultiLayerOlss ) | |
| ols_dpb_params_idx[ i ] | ue(v) |
| } | |
| vps_general_hrd_params_present_flag | u(1) |
| } | |
| if( vps_general_hrd_params_present_flag ) { | |
| general_hrd_parameters( ) | |
| if( vps_max_sublayers_minus1 > 0 ) | |
| vps_sublayer_cpb_params_present_flag | u(1) |
| num_ols_hrd_params_minus1 | ue(v) |
| for( i = 0; i <= num_ols_hrd_params_minus1; i++ ) { | |
| if( vps_max_sublayers_minus1 > 0 && !vps all layers same num sublayers flag ) | |
| hrd_max_tid[ i ] | u(3) |
| firstSubLayer = vps_sublayer_cpb_params_present_flag ? 0 : hrd max_tid[ i ] | |
| ols_hrd_parameters( firstSubLayer, hrd_max_tid[ i ] ) | |
| } | |
| if( num_ols hrd params minus1 > 0 && num_ols_hrd_params_minus1 + 1 != NumMultiLayerOlss ) | |
| for( i = 0; i < NumMultiLayerOlss; i++ ) | |
| ols_hrd_idx[ i ] | ue(v) |
| } | |
| vps_extension_flag | u(1) |
| if( vps_extension_flag ) | |
| while( more_rbsp_data( ) ) | |
| vps_extension_data_flag | u(1) |
| rbsp_trailing_bits( ) | |
| } | |

In VVC, SPSs contain information which applies to all slices of a coded video sequence. A coded video sequence starts from an instantaneous decoding refresh (IDR) picture, or a BLA picture, or a CRA picture that is the first picture in the bitstream and includes all subsequent pictures that are not an IDR or BLA picture. A bitstream consists of one or more coded video sequences. The content of the SPS can be roughly subdivided into six categories: 1) a self-reference (its own ID); 2) decoder operation point related information (profile, level, picture size, number sub-layers, and so on); 3) enabling flags for certain tools within a profile, and associated coding tool parameters in case the tool is enabled; 4) information restricting the flexibility of structures and transform coefficient coding; 5) temporal scalability control; and 6) visual usability information (VUI), which includes HRD information. The syntax and the associated semantic of the sequence parameter set in current VVC draft specification is illustrated in Table 5 and Table 6, respectively. How to read the Table 5 is illustrated in the appendix section of this disclosure which could also be found in the VVC specification.

TABLE 5

| Sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |

TABLE 5-continued

| Sequence parameter set RBSP syntax | |
|---|---|
| if( sps_ptl_dpb_hrd_params_present_flag ) | |
| profile_tier_level( 1, sps_max_sublayers_minus1 ) | |
| sps_gdr_enabled_flag | u(1) |
| chroma_format_idc | u(2) |
| if( chroma_format_idc = = 3 ) | |
| separate_colour_plane_flag | u(1) |
| ref_pic_resampling_enabled_flag | u(1) |
| if( ref_pic_resampling_enabled_flag ) | |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| sps_subpic_info_present_flag | u(1) |
| if( sps_subpic_info_present_flag ) { | |
| sps_num_subpics_minus1 | ue(v) |
| if( sps_num_subpics_minus1 > 0 ) | |
| sps_independent_subpics_flag | u(1) |
| for( i = 0; sps_num_subpics_minus1 > 0 && i <= sps_num_subpics_minus1; i++ ) { | |
| if(i > 0 && pic_width_max_in_luma_samples > CtbSizeY ) | |
| subpic_ctu_top_left_x[ i ] | u(v) |
| if(i > 0 && pic_height_max_in_luma_samples > CtbSizeY ) { | |
| subpic_ctu_top_left_y[ i ] | u(v) |
| if( i < sps_num_subpics_minus1 && | |
| pic_width_max_in_luma_samples > CtbSizeY ) | |
| subpic_width_minus1[ i ] | u(v) |
| if( i < sps_num_subpics_minus1 && | |
| pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| sps_entry_point_offsets_present_flag | u(1) |
| log2_max_pic_order_cnt_lsb_minus4 | u(4) |
| sps_poc_msb_cycle_flag | u(1) |
| if( sps_poc_msb_cycle_flag ) | |
| poc_msb_cycle_len_minus1 | ue(v) |
| num_extra_ph_bits_bytes | u(2) |
| extra ph_bits_struct( num_extra ph_bits_bytes ) | |
| num_extra_sh_bits_bytes | u(2) |
| extra_sh_bits_struct( num_extra_sh_bits_bytes ) | |
| if( sps_ptl_dpb_hrd_params_present_flag ) { | |
| if( sps_max_sublayers_minus1 > 0 ) | |
| sps_sublayer_dpb_params_flag | u(1) |
| dpb_parameters( sps_max_sublayers_minus1, sps_sublayer_dpb_params_flag ) | |
| } | |
| if( ChromaArray Type != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |

TABLE 5-continued

| Sequence parameter set RBSP syntax | |
|---|---|
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArray Type != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArray Type != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| sps_weighted_pred_flag | u(1) |
| sps_weighted_bipred_flag | u(1) |
| long_term_ref_pics_flag | u(1) |
| if( sps_video_parameter_set_id > 0 ) | |
| sps_inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
| num_ref_pic_lists_in_sps[ i ] | ue(v) |
| for( j = 0; j < num_ref_pic_lists_in_sps[ i ]; j++ ) | |
| ref_pic_list_struct( i, j ) | |
| } | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_control_present_in_ph_flag | u(1) |
| sps_smvd_enabled_flag | u(1) |
| sps_dmvr_enabled_flag | u(1) |
| if( sps_dmvr_enabled_flag) | |
| sps_dmvr_control_present_in_ph_flag | u(1) |
| sps_mmvd_enabled_flag | u(1) |
| six_minus_max_num_merge_cand | ue(v) |
| sps_sbt_enabled_flag | u(1) |
| sps_affine_enabled_flag | u(1) |
| if( sps_affine_enabled_flag ) { | |
| five_minus_max_num_subblock_merge_cand | ue(v) |
| sps_affine_type_flag | u(1) |
| if( sps_amvr_enabled_flag ) | |
| sps_affine_amvr_enabled_flag | u(1) |
| sps_affine_prof_enabled_flag | u(1) |
| if( sps_affine_prof_enabled_flag ) | |
| sps_prof_control_present_in_ph_flag | u(1) |
| } | |

TABLE 5-continued

```
Sequence parameter set RBSP syntax

  sps_bcw_enabled_flag                                              u(1)
  sps_ciip_enabled_flag                                             u(1)
  if( sps_mmvd_enabled_flag )
    sps_fpel_mmvd_enabled_flag                                      u(1)
  if( MaxNumMergeCand >= 2 ) {
    sps_gpm_enabled_flag                                            u(1)
    if( sps_gpm_enabled_flag && MaxNumMergeCand >= 3 )
      max_num_merge_cand_minus_max_num_gpm_cand                     ue(v)
  }
  log2_parallel_merge_level_minus2                                  ue(v)
  sps_isp_enabled_flag                                              u(1)
  sps_mrl_enabled_flag                                              u(1)
  sps_mip_enabled_flag                                              u(1)
  if( ChromaArray Type != 0 )
    sps_cclm_enabled_flag                                           u(1)
  if( chroma_format_idc = = 1 ) {
    sps_chroma_horizontal_collocated_flag                           u(1)
    sps_chroma_vertical_collocated_flag                             u(1)
  }
  sps_mts_enabled_flag                                              u(1)
  if( sps_mts_enabled_flag ) {
    sps_explicit_mts_intra_enabled_flag                             u(1)
    sps_explicit_mts_inter_enabled_flag                             u(1)
  }
  sps_palette_enabled_flag
  if( ChromaArray Type = = 3 &&
!sps_max_luma_transform_size_64_flag )
    sps_act_enabled_flag                                            u(1)
  if( sps_transform_skip_enabled_flag | | sps_palette_enabled_flag )
    internal_bit_depth_minus_input_bit_depth                        ue(v)
  sps_ibc_enabled_flag                                              u(1)
  if( sps_ibc_enabled_flag )
    six_minus_max_num_ibc_merge_cand                                ue(v)
  sps_lmcs_enabled_flag                                             u(1)
  sps_lfnst_enabled_flag                                            u(1)
  sps_ladf_enabled_flag                                             u(1)
  if( sps_ladf_enabled_flag ) {
    sps_num_ladf_intervals_minus2                                   u(2)
    sps_ladf_lowest_interval_qp_offset                              se(v)
    for( i = 0; i < sps_num_ladf intervals_minus2 + 1; i++ ) {
      sps_ladf_qp_offset[ i ]                                       se(v)
      sps_ladf_delta_threshold_minus1[ i ]                          ue(v)
    }
  }
  sps_explicit_scaling_list_enabled_flag                            u(1)
  if( sps_lfnst_enabled_flag && sps_explicit_scaling_list_enabled_flag )
    sps_scaling_matrix_for_lfnst_disabled_flag                      u(1)
  if( sps_act_enabled_flag && sps_explicit_scaling_list_enabled_flag )
    sps_scaling_matrix_for_alternative_colour_space_disabled_flag   u(1)
  if( sps_scaling_matrix_for_alternative_colour_space_disabled_flag )
    sps_scaling_matrix_designated_colour_space_flag                 u(1)
  sps_dep_quant_enabled_flag                                        u(1)
  if( !sps_dep_quant_enabled_flag )
    sps_sign_data_hiding_enabled_flag                               u(1)
  sps_virtual_boundaries_enabled_flag                               u(1)
  if( sps_virtual_boundaries_enabled_flag ) {
    sps_virtual_boundaries_present_flag                             u(1)
    if( sps_virtual_boundaries_present_flag ) {
      sps_num_ver_virtual_boundaries                                u(2)
      for( i = 0; i < sps_num_ver_virtual_boundaries; i++ )
        sps_virtual_boundary_pos_x[ i ]                             ue(v)
      sps_num_hor_virtual_boundaries                                u(2)
      for( i = 0; i < sps_num_hor_virtual_boundaries; i++ )
        sps_virtual_boundary_pos_y[ i ]                             ue(v)
    }
  }
  if( sps_ptl_dpb_hrd_params_present_flag ) {
    sps_general_hrd_params_present_flag                             u(1)
    if( sps_general_hrd_params_present_flag ) {
      general_hrd_parameters( )
      if( sps_max_sublayers_minus1 > 0 )
        sps_sublayer_cpb_params_present_flag                        u(1)
      firstSubLayer = sps_sublayer_cpb_params_present_flag ? 0 :
          sps_max_sublayers_minus1
      ols_hrd_parameters( firstSubLayer, sps_max_sublayers_minus1 )
    }
  }
```

TABLE 5-continued

| Sequence parameter set RBSP syntax | |
|---|---|
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

TABLE 6

| Sequence parameter set RBSP semantics |
|---|
| An SPS RBSP shall be available to the decoding process prior to it being referenced, included in at least one AU with TemporalId equal to 0 or provided through external means.<br>All SPS NAL units with a particular value of sps_seq_parameter_set_id in a CVS shall have the same content.<br>sps_seq_parameter_set_id provides an identifier for the SPS for reference by other syntax elements. SPS NAL units, regardless of the nuh_layer_id values, share the same value space of sps_seq_parameter_set_id.<br>Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and all OLSs specified by the VPS that contain the layer with nuh_layer_id equal to vclLayerId also contain the layer with nuh_layer_id equal to spslayerId.<br>sps_video_parameter_set_id, when greater than 0, specifies the value of vps_video_parameter_set_id for the VPS referred to by the SPS.<br>When sps_video_parameter_set_id is equal to 0, the following applies:<br>- The SPS does not refer to a VPS.<br>- No VPS is referred to when decoding each CLVS referring to the SPS.<br>- The value of vps_max_layers_minus1 is inferred to be equal to 0.<br>- The CVS shall contain only one layer (i.e., all VCL NAL unit in the CVS shall have the same value of nuh_layer_id).<br>- The value of GeneralLayerIdx[ nuh_layer_id ] is inferred to be equal to 0.<br>- The value of vps_independent_layer_flag[ GeneralLayerIdx[ nuh_layer_id ] ] is inferred to be equal to 1.<br>When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.<br>The value of sps_video_parameter_set_id shall be the same in all SPSs that are referred to by CLVSs in a CVS.<br>sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.<br>sps_reserved_zero_4bits shall be equal to 0 in bitstreams conforming to this version of this Specification. Other values for sps_reserved_zero_4bits are reserved for future use by ITU-T \| ISO/IEC.<br>sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an ols_hrd_parameters( ) syntax structure may also be present in the SPS. sps_ptl_dpb_hrd_params_present_flag equal to 0 specifies that none of these four syntax structures is present in the SPS.<br>When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag shall be equal to 1.<br>sps_gdr_enabled_flag equal to 1 specifies that GDR pictures may be present in CLVSs referring to the SPS. sps_gdr_enabled_flag equal to 0 specifies that GDR pictures are not present in CLVSs referring to the SPS.<br>chroma_format_idc specifies the chroma sampling relative to the luma sampling as specified in clause 6.2.<br>When sps_video_parameter_set_id is greater than 0, it is a requirement of bitstream conformance that, for any OLS with OLS index i that contains one or more layers that refer to the SPS, the value of chroma_format_idc shall be less than or equal to the value of ols_dpb_chroma_format[ i ].<br>separate_colour_plane_flag equal to 1 specifies that the three colour components of the 4:4:4 chroma format are coded separately. separate_colour plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value. |

TABLE 6-continued

| Sequence parameter set RBSP semantics |
| --- |

NOTE 1 - There is no dependency in decoding processes between the colour planes having different colour_plane_id values. For example, the decoding process of a monochrome picture with one value of colour_plane_id does not use any data from monochrome pictures having different values of colour plane_id for inter prediction.

Depending on the value of separate_colour_plane_flag, the value of the variable ChromaArray Type is assigned as follows:

- If separate_colour_plane_flag is equal to 0, ChromaArray Type is set equal to chroma_format_idc.
- Otherwise (separate_colour_plane_flag is equal to 1), ChromaArray Type is set equal to 0.

ref_pic_resampling_enabled_flag equal to 1 specifies that one or more slices of pictures in the CLVS may refer to a reference picture with a different spatial resolution in an active entry of a reference picture list. ref_pic_resampling_enabled_flag equal to 0 specifies that no slice of pictures in the CLVS refers to a reference picture with a different spatial resolution in an active entry of a reference picture list.

NOTE 2 - When ref_pic_resampling_enabled_flag is equal to 1, for a current picture the reference picture with a different spatial resolution may either belong to the same layer or a different layer than the layer containing the current picture.

res_change_in_clvs_allowed_flag equal to 1 specifies that the picture spatial resolution may change within a CLVS referring to the SPS. res_change_in_clvs_allowed_flag equal to 0 specifies that the picture spatial resolution does not change within any CLVS referring to the SPS. When not present, the value of res_change_in_clvs_allowed_flag is inferred to be equal to 0.

pic_width_max_in_luma_samples specifies the maximum width, in units of luma samples, of each decoded picture referring to the SPS. pic_width_max_in_luma_samples shall not be equal to 0 and shall be an integer multiple of Max( 8, MinCbSizeY ).

When sps_video_parameter_set_id is greater than 0, it is a requirement of bitstream conformance that, for any OLS with OLS index i that contains one or more layers that refers to the SPS, the value of pic_width_max_in_luma_samples shall be less than or equal to the value of ols_dpb_pic_width[ i ].

pic_height_max_in_luma_samples specifies the maximum height, in units of luma samples, of each decoded picture referring to the SPS. pic_height_max_in_luma_samples shall not be equal to 0 and shall be an integer multiple of Max( 8, MinCbSizeY ).

When sps_video_parameter_set_id is greater than 0, it is a requirement of bitstream conformance that, for any OLS with OLS index i that contains one or more layers that refers to the SPS, the value of pic_height_max_in_luma_samples shall be less than or equal to the value of ols_dpb_pic_height[ i ].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pic_width_in_luma_samples equal to pic_width_max_in_luma_samples and pic_height_in_luma_samples equal to pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC * sps_conf_win_left_offset to pic_width_max_in_luma_samples − ( SubWidthC * sps_conf_win_right_offset + 1 ) and vertical picture coordinates from SubHeightC * sps_conf_win_top_offset to pic_height_max_in_luma_samples − ( SubHeightC * sps_conf_win_bottom_offset + 1), inclusive.

The value of Sub WidthC * ( sps_conf_win_left_offset + sps_conf_win_right_offset ) shall be less than pic_width_max_in_luma_samples, and the value of SubHeightC * ( sps_conf_win_top_offset + sps_conf_win_bottom_offset ) shall be less than pic_height_max_in_luma_samples.

When ChromaArray Type is not equal to 0, the corresponding specified samples of the two chroma arrays are the samples having picture coordinates ( x / SubWidthC, y / SubHeightC ), where (x, y) are the picture coordinates of the specified luma samples.

NOTE 3 - The conformance cropping window offset parameters are only applied at the output. All internal decoding processes are applied to the uncropped picture size.

sps_log2_ctu_size_minus5 plus 5 specifies the luma coding tree block size of each CTU. The value of sps_log2_ctu_size_minus5 shall be in the range of 0 to 2, inclusive. The value 3 for sps_log2_ctu_size_minus5 is reserved for future use by ITU-T | ISO/IEC.

The variables CtbLog2SizeY and CtbSizeY are derived as follows:

CtbLog2SizeY = sps_log2_ctu_size_minus5 + 5

CtbSizeY = 1 << CtbLog2SizeY sps_subpic_info_present_flag equal to 1 specifies that subpicture information is present for the CLVS and there may be one or more than one subpicture in each picture of the CLVS. sps_subpic_info_present_flag equal to 0 specifies that subpicture information is not present for the CLVS and there is only one subpicture in each picture of the CLVS.

When res_change_in_clvs_allowed_flag is equal to 1, the value of sps_subpic_info_present_flag shall be equal to 0.

NOTE 4 - When a bitstream is the result of a sub-bitstream extraction process and contains only a subset of the subpictures of the input bitstream to the sub-bitstream extraction process, it might be required to set the value of sps_subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to Ceil( pic_width_max_in_luma_samples − CtbSizeY ) * Ceil( pic_height_max_in_luma_samples + CtbSizeY ) − 1, inclusive. When not present, the value of sps_num_subpics_minus1 is inferred to be equal to 0.

sps_independent_subpics_flag equal to 1 specifies that all subpicture boundaries in the CLVS are treated as picture boundaries and there is no loop filtering across the subpicture boundaries.

TABLE 6-continued

| Sequence parameter set RBSP semantics |
| --- |
| sps_independent_subpics_flag equal to 0 does not impose such a constraint. When not present, the value of sps_independent_subpics_flag is inferred to be equal to 1.<br>subpic_ctu_top_left_x[ i ] specifies horizontal position of top left CTU of i-th subpicture in unit of CtbSize Y. The length of the syntax element is<br>Ceil( Log2( ( pic_width_max_in_luma_samples + CtbSizeY − 1 ) >> CtbLog2SizeY ) ) bits. When not present, the value of subpic_ctu_top_left_x[ i ] is inferred to be equal to 0.<br>subpic_ctu_top_left_y[ i ] specifies vertical position of top left CTU of i-th subpicture in unit of CtbSizeY. The length of the syntax element is<br>Ceil( Log2((pic_height_max_in_luma_samples + CtbSizeY − 1 ) >> CtbLog2SizeY ) ) bits. When not present, the value of subpic_ctu_top_left_y[ i ] is inferred to be equal to 0.<br>subpic_width_minus1 [ i ] plus 1 specifies the width of the i-th subpicture in units of CtbSize Y. The length of the syntax element is<br>Ceil( Log2((pic_width_max_in_luma_samples + CtbSizeY − 1 ) >> CtbLog2SizeY ) ) bits. When not present, the value of subpic_width_minus1[ i ] is inferred to be equal to<br>( ( pic_width_max_in_luma_samples + CtbSizeY − 1 ) >> CtbLog2SizeY ) − subpic_ctu_top_left_x[i] − 1.<br>subpic_height_minus1[ i ] plus 1 specifies the height of the i-th subpicture in units of CtbSize Y. The length of the syntax element is<br>Ceil( Log2((pic_height_max_in_luma_samples + CtbSizeY-1) >> CtbLog2SizeY ) ) bits. When not present, the value of subpic_height_minus1[ i ] is inferred to be equal to<br>( ( pic_height_max_in_luma_samples + CtbSizeY − 1 ) >> CtbLog2SizeY ) − subpic_ctu_top_left_y[i] − 1.<br>For each subpicture with subpicture index i in the range of 0 to sps_num_subpics_minus1, inclusive, it is a requirement of bitstream conformance that all of the following conditions are true:<br>- The value of ( subpic_ctu_top_left_x[ i ] * CtbSizeY ) shall be less than ( pic_width_max_in_luma_samples − sps_conf_win_right_offset * SubWidthC ).<br>- The value of ( ( subpic_ctu_top_left_x[ i ] + subpic_width_minus1 [ i ] + 1) * CtbSizeY ) shall be greater than ( sps_conf_win_left_offset * Sub WidthC ).<br>- The value of ( subpic_ctu_top_left_y[ i ] * CtbSizeY ) shall be less than ( pic_height_max_in_luma_samples − sps_conf_win_bottom_offset * SubHeightC ).<br>- The value of ( ( subpic_ctu_top_left_y[ i ] + subpic_height_minus1 [ i ] + 1) * CtbSizeY ) shall be greater than ( sps_conf_win_top_offset * SubHeightC ).<br>subpic_treated_as_pic_flag[ i ] equal to 1 specifies that the i-th subpicture of each coded picture in the CLVS is treated as a picture in the decoding process excluding in-loop filtering operations.<br>subpic_treated_as_pic_flag[ i ] equal to 0 specifies that the i-th subpicture of each coded picture in the CLVS is not treated as a picture in the decoding process excluding in-loop filtering operations. When not present, the value of subpic_treated_as_pic_flag[ i ] is inferred to be equal to 1.<br>When sps_num_subpics_minus1 is greater than 0 and subpic_treated_as_pic_flag[ i ] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:<br>- For each AU in targetAuSet, all pictures of the layers in targetLayerSet shall have the same value of pic_width_in_luma_samples and the same value of pic_height_in_luma_samples.<br>- All the SPSs referred to by the layers in targetLayerSet shall have the same value of sps_num_subpics_minus1 and shall have the same values of subpic_ctu_top_left_x[ j ], subpic_ctu_top_left_y[ j ], subpic_width_minus1 [ j ], subpic_height_minus1 [ j ], and subpic_treated_as_pic_flag[ j ], respectively, for each value of j in the range of 0 to sps_num_subpics_minus1, inclusive.<br>- For each AU in targetAuSet, all pictures of the layers in targetLayerSet shall have the same value of SubpicIdVal[ j ] for each value of j in the range of 0 to sps_num_subpics_minus1, inclusive.<br>loop_filter_across_subpic_enabled_flag[ i ] equal to 1 specifies that in-loop filtering operations may be performed across the boundaries of the i-th subpicture in each coded picture in the CLVS.<br>loop_filter_across_subpic_enabled_flag[ i ] equal to 0 specifies that in-loop filtering operations are not performed across the boundaries of the i-th subpicture in each coded picture in the CLVS. When not present, the value of loop_filter_across_subpic_enabled_pic_flag[ i ] is inferred to be equal to 0.<br>It is a requirement of bitstream conformance that the shapes of the subpictures shall be such that each subpicture, when decoded, shall have its entire left boundary and entire top boundary consisting of picture boundaries or consisting of boundaries of previously decoded subpictures.<br>sps_subpic_id_len_minus1 plus 1 specifies the number of bits used to represent the syntax element sps_subpic_id[ i ], the syntax elements pps_subpic_id[ i ], when present, and the syntax element slice_subpic_id, when present. The value of sps_subpic_id_len_minus1 shall be in the range of 0 to 15, inclusive. The value of 1 << ( sps_subpic_id_len_minus1 + 1 ) shall be greater than or equal to sps_num_subpics_minus1 + 1.<br>subpic_id_mapping_explicitly_signalled_flag equal to 1 specifies that the subpicture ID mapping is explicitly signalled, either in the SPS or in the PPSs referred to by coded pictures of the CLVS.<br>subpic_id_mapping_explicitly_signalled_flag equal to 0 specifies that the subpicture ID mapping is not explicitly signalled for the CLVS. When not present, the value of subpic_id_mapping_explicitly_signalled_flag is inferred to be equal to 0.<br>subpic_id mapping_in_sps_flag equal to 1 specifies that the subpicture ID mapping is signalled in the SPS when subpic_id_mapping_explicitly_signalled_flag is equal to 1.<br>subpic_id_mapping_in_sps_flag equal to 0 specifies that subpicture ID mapping is signalled in the PPSs referred to by coded pictures of the CLVS when subpic_id_mapping_explicitly_signalled_flag is equal to 1. |

TABLE 6-continued

| Sequence parameter set RBSP semantics |
|---|
| sps_subpic_id[ i ] specifies the subpicture ID of the i-th subpicture. The length of the sps_subpic_id[ i ] syntax element is sps_subpic_id_len_minus1 + 1 bits.<br>bit_depth_minus8 specifies the bit depth of the samples of the luma and chroma arrays, BitDepth, and the value of the luma and chroma quantization parameter range offset, QpBdOffset, as follows:<br>BitDepth =8 + bit_depth_minus8<br>QpBdOffset = 6 * bit_depth_minus8<br>bit_depth_minus8 shall be in the range of 0 to 8, inclusive.<br>When sps_video_parameter_set_id is greater than 0, it is a requirement of bitstream conformance that, for any OLS with OLS index i that contains one or more layers that refer to the SPS, the value of bit_depth_minus8 shall be less than or equal to the value of ols_dpb_bitdepth_minus8[ i ].<br>sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.<br>sps_entry_point_offsets_present_flag equal to 1 specifies that signalling for entry point offsets for tiles or tile-specific CTU rows may be present in the slice headers of pictures referring to the SPS. sps_entry_point_offsets_present_flag equal to 0 specifies that signalling for entry point offsets for tiles or tile-specific CTU rows are not present in the slice headers of pictures referring to the SPS.<br>log2_max_pic_order_cnt_lsb_minus4 specifies the value of the variable MaxPicOrderCntLsb that is used in the decoding process for picture order count as follows:<br>$\text{MaxPicOrderCntLsb} = 2^{(\text{log2\_max\_pic\_order\_cnt\_lsb\_minus4} + 4)}$<br>The value of log2_max_pic_order_cnt_lsb_minus4 shall be in the range of 0 to 12, inclusive.<br>sps_poc_msb_cycle_flag equal to 1 specifies that the ph_poc_msb_cycle_present_flag syntax element is present in PHs referring to the SPS. sps_poc_msb_cycle_flag equal to 0 specifies that the ph_poc_msb_cycle_present_flag syntax element is not present in PHs referring to the SPS.<br>poc_msb_cycle_len_minus1 plus 1 specifies the length, in bits, of the poc_msb_cycle_val syntax elements, when present in the PHs referring to the SPS. The value of poc_msb_cycle_len_minus1 shall be in the range of 0 to 32 - log2_max_pic_order_cnt_lsb_minus4 - 5, inclusive.<br>num_extra_ph_bits_bytes specifies the number of bytes of extra bits in the PH syntax structure for coded pictures referring to the SPS. The value of num_extra_ph_bits_bytes shall be equal to 0 in bitstreams conforming to this version of this Specification. Although the value of num_extra_ph_bits_bytes is required to be equal to 0 in this version of this Specification, decoder conforming to this version of this Specification shall allow the value of num_extra_ph_bits_bytes equal to 1 or 2 to appear in the syntax.<br>num_extra_sh_bits_bytes specifies the number of bytes of extra bits in the slice headers for coded pictures referring to the SPS. The value of num extra sh bits bytes shall be equal to 0 in bitstreams conforming to this version of this Specification. Although the value of num_extra_sh_bits_bytes is required to be equal to 0 in this version of this Specification, decoder conforming to this version of this Specification shall allow the value of num_extra_sh_bits_bytes equal to 1 or 2 to appear in the syntax.<br>sps_sublayer_dpb_params_flag is used to control the presence of max_dec_pic_buffering_minus1 [ i ], max_num_reorder pics[ i ], and max_latency_increase_plus1 [ i ] syntax elements in the dpb_parameters( ) syntax strucure in the SPS. When not present, the value of sps_sub_dpb_params_info_present_flag is inferred to be equal to 0.<br>qtbtt_dual_tree_intra_flag equal to 1 specifies that, for I slices, each CTU is split into coding units with 64×64 luma samples using an implicit quadtree split, and these coding units are the root of two separate coding_tree syntax structure for luma and chroma. qtbtt_dual_tree_intra_flag equal to 0 specifies separate coding_tree syntax structure is not used for I slices. When qtbtt_dual_tree_intra_flag is not present, it is inferred to be equal to 0.<br>log2_min_luma_coding_block_size_minus2 plus 2 specifies the minimum luma coding block size. The value range of log2_min_luma_coding_block_size_minus2 shall be in the range of 0 to Min( 4, sps_log2_ctu_size_minus5 + 3), inclusive.<br>The variables MinCbLog2Size Y, MinCbSize Y, IbcBufWidthY, IbcBufWidthC and Vsize are derived as follows:<br>MinCbLog2SizeY = log2_min_luma_coding_block_size_minus2 + 2<br>MinCbSizeY = 1 << MinCbLog2SizeY<br>IbcBufWidthY = 256 * 128 / CtbSizeY<br>IbcBufWidthC = IbcBufWidthY / SubWidthC<br>VSize = Min( 64, CtbSizeY )<br>The value of MinCbSizeY shall less than or equal to VSize.<br>The variables CtbWidthC and CtbHeightC, which specify the width and height, respectively, of the array for each chroma CTB, are derived as follows:<br>- If chroma_format_idc is equal to 0 (monochrome) or separate_colour_plane_flag is equal to 1,<br>- CtbWidthC and CtbHeightC are both equal to 0.<br>- Otherwise, CtbWidthC and CtbHeightC are derived as follows:<br>CtbWidthC = CtbSize Y / Sub WidthC<br>CtbHeightC = CtbSizeY / SubHeightC<br>For log2BlockWidth ranging from 0 to 4 and for log2BlockHeight ranging from 0 to 4, inclusive, the up-right diagonal scan order array initialization process as specified in clause 6.5.2 is invoked with 1 << log2BlockWidth and 1 << log2BlockHeight as inputs, and the output is assigned to DiagScanOrder[ log2BlockWidth ][ log2BlockHeight ].<br>For log2BlockWidth ranging from 0 to 6 and for log2BlockHeight ranging from 0 to 6, inclusive, the horizontal and vertical traverse scan order array initialization process as specified in clause 6.5.3 is |

TABLE 6-continued

| Sequence parameter set RBSP semantics |
|---|
| invoked with 1 << log2BlockWidth and 1 << log2BlockHeight as inputs, and the output is assigned to HorTravScanOrder[ log2Block Width ][ log2BlockHeight ] and VerTravScanOrder[ log2BlockWidth ][ log2BlockHeight ]. |
| partition_constraints_override_enabled_flag equal to 1 specifies the presence of partition_constraints_override_flag in PHs referring to the SPS. partition_constraints_override_enabled_flag equal to 0 specifies the absence of partition_constraints_override_flag in PHs referring to the SPS. |
| sps_log2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with slice_type equal to 2 (I) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_intra_slice_luma shall be in the range of 0 to Min( 6, CtbLog2SizeY ) − MinCbLog2SizeY, inclusive. The base 2 logarithm of the minimum size in luma samples of a luma leaf block resulting from quadtree splitting of a CTU is derived as follows: |
| MinQtLog2SizeIntraY = sps_log2_diff_min_qt_min_cb_intra_slice_luma + MinCbLog2Size Y (56) |
| sps_max_mtt_hierarchy_depth_intra_slice_luma specifies the default maximum hierarchy depth for coding units resulting from multi-type tree splitting of a quadtree leaf in slices with slice_type equal to 2 (I) referring to the SPS. When partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma shall be in the range of 0 to 2*( CtbLog2SizeY − MinCbLog2SizeY ), inclusive. |
| sps_log2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_intra_slice luma shall be in the range of 0 to ( qtbtt_dual_tree_intra_flag ? Min( 6, CtbLog2SizeY) : CtbLog2SizeY) − MinQtLog2SizeIntraY, inclusive. When sps_log2_diff_max_bt_min_qt_intra_slice_luma is not present, the value of sps_log2_diff_max_bt_min_qt_intra_slice_luma is inferred to be equal to 0. |
| sps_log2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_intra_slice_luma shall be in the range of 0 to Min( 6, CtbLog2SizeY ) − MinQtLog2SizeIntraY, inclusive. When sps_log2_diff_max_tt_min_qt_intra_slice_luma is not present, the value of sps_log2_diff_max_tt_min_qt_intra_slice_luma is inferred to be equal to 0. |
| sps_log2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with slice_type equal to 0 (B) or 1 (P) referring to the SPS. When partition_constraints_override_enabled_flag is equal to 1, the default difference can be overridden by ph_log2_diff_min_qt_min_cb_luma present in PHs referring to the SPS. The value of sps_log2_diff_min_qt_min_cb_inter_slice shall be in the range of 0 to Min( 6, CtbLog2SizeY ) − MinCbLog2SizeY, inclusive. The base 2 logarithm of the minimum size in luma samples of a luma leaf block resulting from quadtree splitting of a CTU is derived as follows: |
| MinQtLog2SizeInterY = sps_log2_diff_min_qt_min_cb_inter_slice + MinCbLog2SizeY |
| sps_max_mtt_hierarchy_depth inter slice specifies the default maximum hierarchy depth for coding units resulting from multi-type tree splitting of a quadtree leaf in slices with slice_type equal to 0 (B) or 1 (P) referring to the SPS. When partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice shall be in the range of 0 to 2*( CtbLog2SizeY − MinCbLog2SizeY ), inclusive. |
| sps_log2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_bt_min_qt_luma present in PHs referring to the SPS. The value of sps_log2_diff_max_bt_min_qt_inter_slice shall be in the range of 0 to CtbLog2SizeY − MinQtLog2SizeInterY, inclusive. When sps_log2_diff_max_bt_min_qt_inter_slice is not present, the value of sps_log2_diff_max_bt_min_qt_inter_slice is inferred to be equal to 0. |
| sps_log2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) referring to the SPS. When partition_constraints_override_enabled_flag is equal to 1, the default difference can be overridden by ph_log2_diff_max_tt_min_qt_luma present in PHs referring to the SPS. The value of sps_log2_diff_max_tt_min_qt_inter_slice shall be in the range of 0 to Min( 6, CtbLog2SizeY ) − MinQtLog2SizeInterY, inclusive. When |

TABLE 6-continued

| Sequence parameter set RBSP semantics |
| --- |
| sps_log2_diff_max_tt_min_qt_inter_slice is not present, the value of sps_log2_diff_max_tt_min_qt_inter_slice is inferred to be equal to 0.<br>sps_log2_diff_min_qt_min_cb_intra_slice_chroma specifies the default difference between the base 2 logarithm of the minimum size in chroma samples of a chroma leaf block resulting from quadtree splitting of a chroma CTU with treeType equal to DUAL_TREE_CHROMA and the base 2 logarithm of the minimum coding block size in chroma samples for chroma CUs with treeType equal to DUAL TREE_CHROMA in slices with slice_type equal to 2 (I) referring to the SPS. When partition_constraints_override_enabled_flag is equal to 1, the default difference can be overridden by ph_log2_diff_min_qt_min_cb_chroma present in PHs referring to the SPS. The value of sps_log2_diff_min_qt_min_cb_intra_slice_chroma shall be in the range of 0 to Min( 6, CtbLog2SizeY) − MinCbLog2SizeY, inclusive. When not present, the value of sps_log2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:<br>MinQtLog2SizeIntraC = sps_log2_diff_min_qt_min_cb_intra_slice_chroma + MinCbLog2Size Y (58)<br>sps_max_mtt_hierarchy_depth_intra_slice_chroma specifies the default maximum hierarchy depth for chroma coding units resulting from multi-type tree splitting of a chroma quadtree leaf with tree Type equal to DUAL_TREE_CHROMA in slices with slice_type equal to 2 (I) referring to the SPS. When partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma shall be in the range of 0 to 2*( CtbLog2SizeY − MinCbLog2SizeY ), inclusive. When not present, the value of sps_max_mtt_hierarchy_depth_intra_slice_chroma is inferred to be equal to 0.<br>sps_log2_diff_max_bt_min_qt_intra_slice_chroma specifies the default difference between the base 2 logarithm of the maximum size (width or height) in chroma samples of a chroma coding block that can be split using a binary split and the minimum size (width or height) in luma samples of a chroma leaf block resulting from quadtree splitting of a chroma CTU with treeType equal to DUAL TREE_CHROMA in slices with slice_type equal to 2 (I) referring to the SPS. When partition_constraints_override_enabled_flag is equal to 1, the default difference can be overridden by ph_log2_diff_max_bt_min_qt_chroma present in PHs referring to the SPS. The value of sps_log2_diff_max_bt_min_qt_intra_slice_chroma shall be in the range of 0 to Min( 6, CtbLog2Size Y ) − MinQtLog2SizeIntraC, inclusive. When sps_log2_diff_max_bt_min_qt_intra_slice_chroma is not present, the value of sps_log2_diff_max_bt_min_qt_intra_slice_chroma is inferred to be equal to 0.<br>sps_log2_diff_max_tt_min_qt_intra_slice_chroma specifies the default difference between the base 2 logarithm of the maximum size (width or height) in chroma samples of a chroma coding block that can be split using a ternary split and the minimum size (width or height) in luma samples of a chroma leaf block resulting from quadtree splitting of a chroma CTU with tree Type equal to DUAL TREE_CHROMA in slices with slice_type equal to 2 (1) referring to the SPS. When partition_constraints_override_enabled_flag is equal to 1, the default difference can be overridden by ph_log2_diff_max_tt_min_qt_chroma present in PHs referring to the SPS. The value of sps_log2_diff_max_tt_min_qt_intra_slice_chroma shall be in the range of 0 to Min( 6, CtbLog2SizeY ) − MinQtLog2SizeIntraC, inclusive. When sps_log2_diff_max_tt_min_qt_intra_slice_chroma is not present, the value of sps_log2_diff_max_tt_min_qt_intra_slice_chroma is inferred to be equal to 0.<br>sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32.<br>When CtbSizeY is less than 64, the value of sps_max_luma_transform_size_64_flag shall be equal to 0.<br>The variables MinTbLog2SizeY, MaxTbLog2SizeY, MinTbSize Y, and MaxTbSizeY are derived as follows:<br>MinTbLog2Size Y = 2<br>MaxTbLog2SizeY = sps_max_luma_transform_size_64_flag ? 6 : 5<br>MinTbSizeY = 1 << MinTbLog2SizeY<br>MaxTbSizeY = 1 << MaxTbLog2SizeY<br>sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.<br>same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.<br>qp_table_start_minus26[ i ] plus 26 specifies the starting luma and chroma QP used to describe the i-th chroma QP mapping table. The value of qp_table_start_minus26[ i ] shall be in the range of -26 - QpBdOffset to 36 inclusive. When qp_table_start_minus26[ i ] is not present in the bitstream, the value of qp_table_start_minus26[ i ] is inferred to be equal to 0.<br>num_points_in_qp_table_minus1 [ i ] plus 1 specifies the number of points used to describe the i-th chroma QP mapping table. The value of num_points_in_qp_table_minus1 [ i ] shall be in the range of 0 to 63 + QpBdOffset, inclusive. When num_points_in_qp_table_minus1 [ 0 ] is not present in the bitstream, the value of num_points_in_qp_table_minus1[ 0 ] is inferred to be equal to 0.<br>delta_qp_in_val_minus1 [ i ][ j ] specifies a delta value used to derive the input coordinate of the j-th pivot point of the i-th chroma QP mapping table. When delta qp_in_val minus1[ 0 ][ j ] is not present in the bitstream, the value of delta_qp_in_val_minus1[ 0 ][ j ] is inferred to be equal to 0. |

TABLE 6-continued

| Sequence parameter set RBSP semantics |
|---|
| delta_qp_diff_val[ i ][ j ] specifies a delta value used to derive the output coordinate of the j-th pivot point of the i-th chroma QP mapping table. |
| The i-th chroma QP mapping table ChromaQpTable[ i ] for i = 0..numQpTables − 1 is derived as follows: |
| qpIn Val[ i ][ 0 ] = qp_table_start_minus26[ i] + 26 |
| qpOutVal[ i ][ 0 ] = qpIn Val[ i ][ 0 ] |
| for(j = 0; j <= num_points_in_qp_table_minus1[ i ]; j++ ) { |
| qpIn Val[ i ][ j + 1 ] = qpIn Val[ i ][ j ] + delta_qp_in_val_minus1 [ i ][ j ] + 1 |
| qpOut Val[ i ][ j + 1 ] = qpOutVal[ i ][ j ] + |
| ( delta_qp_in_val_minus1[ i ][ j ] ^ delta_qp_diff_val[ i ][ j ]) |
| } |
| ChromaQpTable[ i ][ qpIn Val[ i ][ 0 ] ] = qpOutVal[ i ][ 0 ] |
| for( k = qpIn Val[ i ][ 0 ] − 1; k >= − QpBdOffset; k − − ) |
| ChromaQpTable[ i ][ k ] = Clip3( −QpBdOffset, 63, ChromaQpTable[ i ][ k + 1 ] − 1 ) |
| for(j = 0; j <= num_points_in_qp_table_minus1[ i ]; j++ ) { |
| sh = ( delta_qp_in_val_minus1 [ i ][j ] + 1 ) >> 1 |
| for( k = qpIn Val[ i ][ j ] + 1, m = 1; k <= qpInval[ i ][ j + 1 ]; k++, m++ ) |
| ChromaQpTable[ i ][ k ] = ChromaQpTable[ i ][ qpIn Val[ i ][ j ] ] + |
| ( ( qpOutVal[ i ][j + 1] − qpOutVal[ i ][j ] ) * m + sh ) / |
| ( delta_qp_in_val_minus1[ i ][ j ] + 1 ) |
| } |
| for( k = qpIn Val[ i ][ num_points_in_qp_table_minus1[ i ] + 1 ] + 1; k <= 63; k++ ) |
| ChromaQpTable[ i ][ k ] = Clip3(−QpBdOffset, 63, ChromaQpTable[ i ][ k − 1] + 1 ) |
| When same_qp_table_for_chroma is equal to 1, ChromaQpTable[ 1 ][ k ] and ChromaQpTable[ 2 ][ k ] are set equal to ChromaQpTable[ 0 ][ k ] for k in the range of −QpBdOffset to 63, inclusive. |
| It is a requirement of bitstream conformance that the values of qpIn Val[ i ][ j ] and qpOutVal[ i ][ j ] shall be in the range of −QpBdOffset to 63, inclusive for i in the range of 0 to numQpTables − 1, inclusive, and j in the range of 0 to num_points_in_qp_table_minus1[ i ] + 1, inclusive. |
| sps_sao_enabled_flag equal to 1 specifies that the sample adaptive offset process is enabled and may be applied to the reconstructed picture after the deblocking filter process for the CLVS. |
| sps_sao_enabled_flag equal to 0 specifies that the sample adaptive offset process is disabled and not applied to the reconstructed picture after the deblocking filter process for the CLVS. |
| sps_alf_enabled_flag equal to 0 specifies that the adaptive loop filter is disabled and not applied for the CLVS. sps_alf_enabled_flag equal to 1 specifies that the adaptive loop filter is enabled and may be applied for the CLVS. |
| sps_ccalf_enabled_flag equal to 0 specifies that the cross-component adaptive loop filter is disabled and not applied for the CLVS. sps_ccalf_enabled_flag equal to 1 specifies that the cross-component adaptive loop filter is enabled and may be applied for the CLVS. When not present, the value of sps_ccalf_enabled_flag is inferred to be equal to 0. |
| sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax. |
| log2_transform_skip_max_size_minus2 specifies the maximum block size used for transform skip, and shall be in the range of 0 to 3, inclusive. |
| The variable MaxTsSize is set equal to 1 << ( log2_transform_skip_max_size_minus2 + 2 ). |
| sps_bdpcm_enabled flag equal to 1 specifies that intra_bdpcm luma flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0. |
| sps_weighted_pred_flag equal to 1 specifies that weighted prediction may be applied to P slices referring to the SPS. sps_weighted_pred_flag equal to 0 specifies that weighted prediction is not applied to P slices referring to the SPS. |
| sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS. |
| long_term_ref_pics_flag equal to 0 specifies that no LTRP is used for inter prediction of any coded picture in the CLVS. long_term_ref_pics_flag equal to 1 specifies that LTRPs may be used for inter prediction of one or more coded pictures in the CLVS. |
| sps_inter_layer_ref_pics_present_flag equal to 0 specifies that no ILRP is used for inter prediction of any coded picture in the CLVS. sps_inter_layer_ref_pics present_flag equal to 1 specifies that ILRPs may be used for inter prediction of one or more coded pictures in the CLVS. When sps_video_parameter_set_id is equal to 0, the value of sps_inter_layer_ref_pics_present_flag is inferred to be equal to 0. When vps_independent_layer_flag[ GeneralLayerIdx[ nuh_layer_id ] ] is equal to 1, the value of sps_inter_layer_ref_pics_present_flag shall be equal to 0. |
| sps_idr_rpl_present_flag equal to 1 specifies that reference picture list syntax elements are present in slice headers of IDR pictures. sps_idr_rpl present_flag equal to 0 specifies that reference picture list syntax elements are not present in slice headers of IDR pictures. |
| rpl1_same_as_rpl0_flag equal to 1 specifies that the syntax element num_ref_pic_lists_in_sps[ 1 ] and the syntax structure ref_pic_list_struct( 1, rplsIdx ) are not present and the following applies: |
| - The value of num_ref_pic_lists_in_sps[ 1 ] is inferred to be equal to the value of num_ref_pic_lists_in_sps[ 0 ]. |
| - The value of each of syntax elements in ref_pic_list_struct( 1, rplsIdx ) is inferred to be equal to the value of corresponding syntax element in ref_pic_list_struct( 0, rplsIdx ) for rplsIdx ranging from 0 to num_ref_pic_lists_in_sps[ 0 ] − 1. |

TABLE 6-continued

| Sequence parameter set RBSP semantics |
|---|
| num_ref_pic_lists_in_sps[ i ] specifies the number of the ref_pic_list_struct( listIdx, rplsIdx ) syntax structures with listIdx equal to i included in the SPS. The value of num_ref_pic_lists_in_sps[ i ] shall be in the range of 0 to 64, inclusive.<br>NOTE 5 - For each value of listIdx (equal to 0 or 1), a decoder should allocate memory for a total number of num_ref_pic_lists_in_sps[ i ] + 1 ref_pic_list_struct( listIdx, rplsIdx ) syntax structures since there may be one ref_pic_list_struct( listIdx, rplsIdx ) syntax structure directly signalled in the slice headers of a current picture.<br>sps_ref_wraparound_enabled_flag equal to 1 specifies that horizontal wrap-around motion compensation is applied in inter prediction. sps_ref_wraparound_enabled_flag equal to 0 specifies that horizontal wrap-around motion compensation is not applied.<br>It is a requirement of bitstream conformance that, when there is one or more values of i in the range of 0 to sps_num_subpics_minus1, inclusive, for which subpic_treated_as_pic_flag[ i ] is equal to 1 and subpic_width_minus1[ i ] plus 1 is not equal to ( pic_width_max_in_luma_samples + CtbSizeY− 1 ) >> CtbLog2SizeY ), the value of sps_ref_wraparound_enabled_flag shall be equal to 0.<br>sps_temporal_mvp_enabled_flag equal to 1 specifies that temporal motion vector predictors may be used in the CLVS. sps_temporal_mvp_enabled_flag equal to 0 specifies that temporal motion vector predictors are not used in the CLVS.<br>sps_sbtmvp_enabled_flag equal to 1 specifies that subblock-based temporal motion vector predictors may be used in decoding of pictures with all slices having slice_type not equal to I in the CLVS. sps_sbtmvp_enabled_flag equal to 0 specifies that subblock-based temporal motion vector predictors are not used in the CLVS. When sps_sbtmvp_enabled_flag is not present, it is inferred to be equal to 0.<br>sps_amvr_enabled_flag equal to 1 specifies that adaptive motion vector difference resolution is used in motion vector coding. amvr_enabled_flag equal to 0 specifies that adaptive motion vector difference resolution is not used in motion vector coding.<br>sps_bdof_enabled_flag equal to 0 specifies that the bi-directional optical flow inter prediction is disabled. sps_bdof_enabled_flag equal to 1 specifies that the bi-directional optical flow inter prediction is enabled.<br>sps_bdof_control_present_in_ph_flag equal to 1 specifies that ph_disable_bdof_flag is present in PHs referring to the SPS. sps_bdof_control present_in_ph_flag equal to 0 specifies that ph_disable_bdof_flag is not present in PHs referring to the SPS. When sps_bdof_control_present_in_ph_flag is not present, the value of sps_bdof_control_present_in_ph_flag is inferred to be equal to 0.<br>sps_smvd_enabled_flag equal to 1 specifies that symmetric motion vector difference may be used in motion vector decoding. sps_smvd_enabled_flag equal to 0 specifies that symmetric motion vector difference is not used in motion vector coding.<br>sps_dmvr_enabled_flag equal to 1 specifies that decoder motion vector refinement based inter bi-prediction is enabled. sps_dmvr_enabled_flag equal to 0 specifies that decoder motion vector refinement based inter bi-prediction is disabled.<br>sps_dmvr_control_present_in_ph_flag equal to 1 specifies that ph_disable_dmvr_flag is present in PHs referring to the SPS. sps_dmvr_control_present_in_ph_flag equal to 0 specifies that ph_disable_dmvr_flag is not present in PHs referring to the SPS. When sps_dmvr_control_present_in_ph_flag is not present, the value of sps_dmvr_control_present_in_ph_flag is inferred to be equal to 0.<br>sps_mmvd_enabled_flag equal to 1 specifies that merge mode with motion vector difference is enabled. sps_mmvd_enabled_flag equal to 0 specifies that merge mode with motion vector difference is disabled.<br>six_minus_max_num_merge_cand specifies the maximum number of merging motion vector prediction (MVP) candidates supported in the SPS subtracted from 6. The value of six_minus_max_num_merge_cand shall be in the range of 0 to 5, inclusive.<br>The maximum number of merging MVP candidates, MaxNumMergeCand, is derived as follows:<br>MaxNumMergeCand = 6 − six_minus_max_num_merge_cand<br>sps_sbt_enabled_flag equal to 0 specifies that subblock transform for inter-predicted CUs is disabled. sps_sbt_enabled_flag equal to 1 specifies that subblock transform for inter-predicteds CU is enabled.<br>sps_affine_enabled_flag specifies whether affine model based motion compensation can be used for inter prediction. If sps_affine_enabled_flag is equal to 0, the syntax shall be constrained such that no affine model based motion compensation is used in the CLVS, and inter_affine_flag and cu_affine_type_flag are not present in coding unit syntax of the CLVS. Otherwise (sps_affine_enabled_flag is equal to 1), affine model based motion compensation can be used in the CLVS.<br>five_minus_max_num_subblock_merge_cand specifies the maximum number of subblock-based merging motion vector prediction candidates supported in the SPS subtracted from 5. The value of five_minus_max_num_subblock_merge_cand shall be in the range of 0 to 5, inclusive.<br>sps affine type flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.<br>sps_affine_amvr_enabled_flag equal to 1 specifies that adaptive motion vector difference resolution is used in motion vector coding of affine inter mode. sps_affine_amvr_enabled_flag equal to 0 specifies that adaptive motion vector difference resolution is not used in motion vector coding of affine inter mode. When not present, the value of sps_affine_amvr_enabled_flag is inferred to be equal to 0.<br>sps_affine_prof_enabled_flag specifies whether the prediction refinement with optical flow can be used for affine motion compensation. If sps_affine_prof_enabled_flag is equal to 0, the affine motion |

TABLE 6-continued

| Sequence parameter set RBSP semantics |
| --- |

compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.
sps_prof_control_present_in_ph_flag equal to 1 specifies that ph_disable_prof_flag is present in PHs referring to the SPS. sps_prof_control_present_in_ph_flag equal to 0 specifies that ph_disable_prof_flag is not present in PHs referring to the SPS. When sps_prof_control_present_in_ph_flag is not present, the value of sps_prof_control_present_in_ph_flag is inferred to be equal to 0.
sps_bcw_enabled_flag specifies whether bi-prediction with CU weights can be used for inter prediction. If sps_bcw_enabled_flag is equal to 0, the syntax shall be constrained such that no bi-prediction with CU weights is used in the CLVS, and bcw_idx is not present in coding unit syntax of the CLVS. Otherwise (sps_bcw_enabled_flag is equal to 1), bi-prediction with CU weights can be used in the CLVS.
sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.
sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.
sps_gpm_enabled_flag specifies whether geometric partition based motion compensation can be used for inter prediction. sps_gpm_enabled_flag equal to 0 specifies that the syntax shall be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.
max_num_merge_cand_minus_max_num_gpm_cand specifies the maximum number of geometric partitioning merge mode candidates supported in the SPS subtracted from MaxNumMergeCand. The value of max_num_merge_cand_minus_max_num_gpm_cand shall be in the range of 0 to MaxNumMergeCand − 2, inclusive.
The maximum number of geometric partitioning merge mode candidates, MaxNumGpmMergeCand, is derived as follows:

```
if( sps_gpm_enabled_flag && MaxNumMergeCand >= 3 )
  MaxNumGpmMergeCand = MaxNumMergeCand −
    max_num_merge_cand_minus_max_num_gpm_cand
else if( sps_gpm_enabled_flag && MaxNumMergeCand = = 2 )
  MaxNum GpmMergeCand = 2
else
  MaxNumGpmMergeCand = 0
```

log2_parallel_merge_level_minus2 plus 2 specifies the value of the variable Log2ParMrgLevel, which is used in the derivation process for spatial merging candidates as specified in clause 8.5.2.3, the derivation process for motion vectors and reference indices in subblock merge mode as specified in clause 8.5.5.2, and to control the invocation of the updating process for the history-based motion vector predictor list in clause 8.5.2.1. The value of log2_parallel_merge_level_minus2 shall be in the range of 0 to CtbLog2SizeY − 2, inclusive. The variable Log2ParMrgLevel is derived as follows:

Log2ParMrgLevel = log2_parallel_merge_level_minus2 + 2 sps_isp_enabled_flag equal to 1 specifies that intra prediction with subpartitions is enabled. sps_isp_enabled_flag equal to 0 specifies that intra prediction with subpartitions is disabled.
sps_mrl_enabled_flag equal to 1 specifies that intra prediction with multiple reference lines is enabled. sps_mrl_enabled_flag equal to 0 specifies that intra prediction with multiple reference lines is disabled.
sps_mip_enabled_flag equal to 1 specifies that matrix-based intra prediction is enabled. sps_mip_enabled_flag equal to 0 specifies that matrix-based intra prediction is disabled.
sps_cclm_enabled_flag equal to 0 specifies that the cross-component linear model intra prediction from luma component to chroma component is disabled. sps_cclm_enabled_flag equal to 1 specifies that the cross-component linear model intra prediction from luma component to chroma componenent is enabled. When sps_cclm_enabled_flag is not present, it is inferred to be equal to 0.
sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.
sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.
sps_mts_enabled_flag equal to 1 specifies that sps_explicit_mts_intra_enabled_flag is present in the sequence parameter set RBSP syntax and sps_explicit_mts_inter_enabled_flag is present in the sequence parameter set RBSP syntax. sps_mts_enabled_flag equal to 0 specifies that sps_explicit_mts_intra_enabled_flag is not present in the sequence parameter set RBSP syntax and sps_explicit_mts_inter_enabled_flag is not present in the sequence parameter set RBSP syntax.
sps_explicit_mts_intra_enabled_flag equal to 1 specifies that mts_idx may be present in intra coding unit syntax. sps_explicit_mts_intra_enabled_flag equal to 0 specifies that mts_idx is not present in intra coding unit syntax. When not present, the value of sps_explicit_mts_intra_enabled_flag is inferred to be equal to 0.

TABLE 6-continued

| Sequence parameter set RBSP semantics |
|---|
| sps_explicit_mts_inter_enabled_flag equal to 1 specifies that mts_idx may be present in inter coding unit syntax. sps_explicit_mts_inter_enabled_flag equal to 0 specifies that mts_idx is not present in inter coding unit syntax. When not present, the value of sps_explicit_mts_inter_enabled_flag is inferred to be equal to 0. |
| sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled flag is not present, it is inferred to be equal to 0. |
| sps_act_enabled_flag equal to 1 specifies that adaptive colour transform may be used and the cu_act_enabled_flag may be present in the coding unit syntax. sps_act_enabled_flag equal to 0 speifies that adaptive colour transform is not used and cu_act_enabled_flag is not present in the coding unit syntax. When sps_act_enabled_flag is not present, it is inferred to be equal to 0. |
| internal_bit_depth_minus_input_bit_depth specifies the minimum allowed quantization parameter for transform skip mode as follows: |
| QpPrimeTsMin = 4 + 6 * internal_bit_depth_minus_input_bit_depth |
| The value of internal_bit_depth_minus_input_bit_depth shall be in the range of 0 to 8, inclusive. |
| sps_ibc_enabled_flag equal to 1 specifies that the IBC prediction mode may be used in decoding of pictures in the CLVS. sps_ibc_enabled_flag equal to 0 specifies that the IBC prediction mode is not used in the CLVS. When sps_ibc_enabled_flag is not present, it is inferred to be equal to 0. |
| six_minus_max_num_ibc_merge_cand, when sps_ibc_enabled_flag is equal to 1, specifies the maximum number of IBC merging block vector prediction (BVP) candidates supported in the SPS subtracted from 6. The value of six_minus_max_num_ibc_merge_cand shall be in the range of 0 to 5, inclusive. |
| The maximum number of IBC merging BVP candidates, MaxNumIbcMergeCand, is derived as follows: |
| if( sps_ibc_enabled_flag )<br>MaxNumIbcMergeCand = 6 − six_minus_max_num_ibc_merge_cand<br>else<br>MaxNumIbcMergeCand = 0 |
| sps_Imcs_enabled_flag equal to 1 specifies that luma mapping with chroma scaling is enabled and may be used in the CLVS. sps_Imcs_enabled_flag equal to 0 specifies that luma mapping with chroma scaling is disabled and not used in the CLVS. |
| sps_lfnst_enabled_flag equal to 1 specifies that Ifnst_idx may be present in intra coding unit syntax. sps_lfnst_enabled_flag equal to 0 specifies that lfnst_idx is not present in intra coding unit syntax. |
| sps_ladf_enabled_flag equal to 1, specifies that sps_num_ladf_intervals_minus2, sps_ladf_lowest_interval_qp_offset, sps_ladf_qp_offset[ i ], and sps_ladf_delta_threshold_minus1[ i ] are present in the SPS. |
| sps_num_ladf_intervals_minus2 plus 1 specifies the number of sps_ladf_delta_threshold_minus1[ i ] and sps_ladf_qp_offset[ i ] syntax elements that are present in the SPS. The value of sps_num_ladf_intervals_minus2 shall be in the range of 0 to 3, inclusive. |
| sps_ladf_lowest_interval_qp_offset specifies the offset used to derive the variable qP as specified in clause 8.8.3.6.1. The value of sps_ladf_lowest_interval_qp_offset shall be in the range of −63 to 63, inclusive. |
| sps_ladf_qp_offset[ i ] specifies the offset array used to derive the variable qP as specified in clause 8.8.3.6.1. The value of sps_ladf_qp_offset[ i ] shall be in the range of −63 to 63, inclusive. |
| sps_ladf_delta_threshold_minus1[ i ] is used to compute the values of SpsLadfIntervalLowerBound[ i ], which specifies the lower bound of the i-th luma intensity level interval. The value of sps_ladf_delta_threshold_minus1[ i ] shall be in the range of 0 to $2^{BitDepth} - 3$ inclusive. |
| The value of SpsLadfIntervalLowerBound[ 0 ] is set equal to 0. |
| For each value of i in the range of 0 to sps_num_ladf_intervals_minus2, inclusive, the variable SpsLadfIntervalLowerBound[ i + 1 ] is derived as follows: |
| SpsLadfIntervalLowerBound[ i + 1 ] = SpsLadfIntervalLowerBound[ i ]<br>+ sps_ladf_delta_threshold_minus1 [ i ] + 1 |
| sps_explicit_scaling_list_enabled_flag equal to 1 specifies that the use of an explicit scaling list, which is signalled in a scaling list APS, in the scaling process for transform coefficients when decoding a slice is enabled for the CLVS. sps_explicit_scaling_list_enabled_flag equal to 0 specifies that the use of an explicit scaling list in the scaling process for transform coefficients when decoding a slice is disabled for the CLVS. |
| sps_scaling_matrix_for_Ifnst_disabled_flag equal to 1 specifies that scaling matrices are disabled and not applied to blocks coded with LFNST for CLVS. sps_scaling_matrix_for_lfnst_disabled_flag equal to 0 specifies that the scaling matrices is enabled and may be applied to blocks coded with LFNST for the CLVS. When not present, the value of sps_scaling_matrix_for_lfnst_disabled_flag is inferred to be equal to 1. |
| sps_scaling_matrix_for_alternative_colour_space_disabled_flag equal to 1 specifies that scaling matrices are disabled and not applied to blocks when the colour space of the blocks is not equal to the designated colour space of scaling matrix. |
| sps_scaling_matrix_for_alternative_colour_space_disabled_flag equal to 0 specifies that scaling matrices are enabled and may be applied to the blocks when the colour space of the blocks is equal to the designated colour space of scaling matrices. When not present, the value of sps_scaling_matrix_for_alternative_colour_sapce_disabled_flag is inferred to be equal to 0. |
| sps_scaling_matrix_designated_colour_space_flag equal to 1 specifies that the designated colour space of scaling matrices is the original colour space. |
| sps_scaling_matrix_designated_colour_space_flag equal to 0 specifies that the designated colour space of scaling matrices is the transformed colour space. When not present, the value of sps_scaling_matrix_designated_colour_space_flag is inferred to be equal to 1. |
| sps_dep_quant_enabled_flag equal to 0 specifies that dependent quantization is disabled for pictures referring to the SPS. sps_dep_quant_enabled_flag equal to 1 specifies that dependent quantization may be enabled for pictures referring to the SPS. |

TABLE 6-continued

| Sequence parameter set RBSP semantics |
|---|
| sps_sign_data_hiding_enabled_flag equal to 0 specifies that sign bit hiding is disabled for pictures referring to the SPS. sps_sign_data_hiding_enabled_flag equal to 1 specifies that sign bit hiding may be enabled for pictures referring to the SPS. When sps_sign_data_hiding_enabled_flag is not present, it is inferred to be equal to 0. |
| sps_virtual_boundaries_enabled_flag equal to 1 specifies that disabling in-loop filtering across virtual boundaries may be applied in the coded pictures in the CLVS. |
| sps_virtual_boundaries_enabled_flag equal to 0 specifies that disabling in-loop filtering across virtual boundaries is not applied in the coded pictures in the CLVS. In-loop filtering operations include the deblocking filter, sample adaptive offset filter, and adaptive loop filter operations. |
| sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations. |
| It is a requirement of bitstream conformance that when the value of res_change_in_clvs_allowed_flag is equal to 1, the value of sps_virtual_boundaries_present_flag shall be equal to 0. |
| sps_num_ver_virtual_boundaries specifies the number of sps_virtual_boundary_pos_x[ i ] syntax elements that are present in the SPS. When sps_num_ver_virtual_boundaries is not present, it is inferred to be equal to 0. |
| sps_virtual_boundary_pos_x[ i ] specifies the location of the i-th vertical virtual boundary in units of luma samples divided by 8. The value of sps_virtual_boundary_pos_x[ i ] shall be in the range of 1 to Ceil( pic_width_max_in_luma_samples ÷ 8 ) − 1, inclusive. |
| sps_num_hor_virtual_boundaries specifies the number of sps_virtual_boundary pos_y[ i ] syntax elements that are present in the SPS. When sps_num_hor_virtual_boundaries is not present, it is inferred to be equal to 0. |
| When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0. |
| sps_virtual_boundary_pos_y[ i ] specifies the location of the i-th horizontal virtual boundary in units of luma samples divided by 8. The value of sps_virtual_boundary_pos_y[ i ] shall be in the range of 1 to Ceil( pic_height_max_in_luma_samples ÷ 8) − 1, inclusive. |
| sps_general_hrd_params_present_flag equal to 1 specifies that the SPS contains a general_hrd_parameters( ) syntax structure and an ols_hrd_parameters( ) syntax structure. sps_general_hrd_params_present_flag equal to 0 specifies that the SPS does not contain a general_hrd_parameters( ) syntax structure or an ols_hrd_parameters( ) syntax structure. |
| sps_sublayer_cpb_params_present_flag equal to 1 specifies that the ols_hrd_parameters( ) syntax structure in the SPS includes HRD parameters for sublayer representations with TemporalId in the range of 0 to sps_max_sublayers_minus1, inclusive. sps_sublayer_cpb_params_present_flag equal to 0 specifies that the ols_hrd_parameters( ) syntax structure in the SPS includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0. |
| When sps_sublayer_cpb_params_present_flag is equal to 0, the HRD parameters for the sublayer representations with TemporalId in the range of 0 to sps_max_sublayers_minus1 − 1, inclusive, are inferred to be the same as that for the sublayer representation with TemporalId equal to sps_max_sublayers_minus1. These include the HRD parameters starting from the fixed_pic_rate_general_flag[ i ] syntax element till the sublayer_hrd_parameters( i ) syntax structure immediately under the condition "if( general_vcl_hrd_params_present_flag )" in the ols_hrd_parameters syntax structure. |
| field_seq_flag equal to 1 indicates that the CLVS conveys pictures that represent fields. field_seq_flag equal to 0 indicates that the CLVS conveys pictures that represent frames. When general_frame_only_constraint_flag is equal to 1, the value of field_seq_flag shall be equal to 0. When field_seq_flag is equal to 1, a frame-field information SEI message shall be present for every coded picture in the CLVS. |
| NOTE 6 - The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920x540, while the sequence picture rate would commonly express the rate of the source fields (typically between 50 and 60 Hz), instead of the source frame rate (typically between 25 and 30 Hz). |
| vui_parameters_present_flag equal to 1 specifies that the syntax structure vui_parameters( ) is present in the SPS RBSP syntax structure. vui_parameters_present_flag equal to 0 specifies that the syntax structure vui_parameters( ) is not present in the SPS RBSP syntax structure. |
| sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure. |
| sps_extension_data_flag may have any value. Its presence and value do not affect decoder conformance to profiles specified in this version of this Specification. Decoders conforming to this version of this Specification shall ignore all sps_extension_data_flag syntax elements. |

VVC's picture parameter set (PPS) contains such information which could change from picture to picture. The PPS includes information roughly comparable what was part of the PPS in HEVC, including: 1) a self-reference; 2) initial picture control information such as initial quantization parameter (QP), a number of flags indicating the use of, or presence of, certain tools or control information in the slice header; and 3) tiling information. The syntax and the associated semantic of the picture parameter set in current VVC draft specification is illustrated in Table 7 and Table 8, respectively. How to read the Table 7 is illustrated in the appendix section of this disclosure which could also be found in the VVC specification.

TABLE 7

| Picture parameter set RBSP syntax | Descriptor |
|---|---|
| pic_parameter_set_rbsp( ) { | |
| **pps_pic_parameter_set_id** | u(6) |
| **pps_seq_parameter_set_id** | u(4) |
| **mixed_nalu_types_in_pic_flag** | u(1) |
| **pic_width_in_luma_samples** | ue(v) |
| **pic_height_in_luma_samples** | ue(v) |
| **pps_conformance_window_flag** | u(1) |
| if( pps_conformance_window_flag ) { | |
| **pps_conf_win_left_offset** | ue(v) |
| **pps_conf_win_right_offset** | ue(v) |
| **pps_conf_win_top_offset** | ue(v) |
| **pps_conf_win_bottom_offset** | ue(v) |
| } | |
| **scaling_window_explicit_signalling_flag** | u(1) |
| if( scaling_window_explicit_signalling_flag ) { | |
| **scaling_win_left_offset** | se(v) |
| **scaling_win_right_offset** | se(v) |
| **scaling_win_top_offset** | se(v) |
| **scaling_win_bottom_offset** | se(v) |
| } | |
| **output_flag_present_flag** | u(1) |
| if (!mixed_nalu_types_in_pic_flag) | |
| **pps_no_pic_partition_flag** | u(1) |
| **subpic_id_mapping_in_pps_flag** | u(1) |
| if( subpic_id_mapping_in_pps_flag ) { | |
| if( !pps_no_pic_partition_flag ) | |
| **pps_num_subpics_minus1** | ue(v) |
| **pps_subpic_id_len_minus1** | ue(v) |
| for( i = 0; i <= pps_num_subpic_minus1; i++) | |
| **pps_subpic_id**[ i ] | u(v) |
| } | |
| if( !pps_no_pic_partition_flag ) { | |
| **pps_log2_ctu_size_minus5** | u(2) |
| **num_exp_tile_columns_minus1** | ue(v) |
| **num_exp_tile_rows_minus1** | ue(v) |
| for( i = 0; i <= num_exp_tile_columns_minus1; i++ ) | |
| **tile_column_width_minus1**[ i ] | ue(v) |
| for( i = 0; i <= num_exp_tile_rows_minus1; i++ ) | |
| **tile_row_height_minus1**[ i ] | ue(v) |
| if( NumTilesInPic > 1 && !mixed_nalu_types_in_pic_flag ) { | |
| **pps_loop_filter_across_tiles_enabled_flag** | u(1) |
| **pps_rect_slice_flag** | u(1) |
| } | |
| if( pps_rect_slice_flag ) | |
| **single_slice_per_subpic_flag** | u(1) |
| if( pps_rect_slice_flag && !single_slice_per_subpic_flag ) { | |
| **num_slices_in_pic_minus1** | ue(v) |
| if( num_slices_in_pic_minus1 > 1) | |
| **tile_idx_delta_present_flag** | u(1) |
| for( i = 0; i < num_slices_in_pic_minus1; i++ ) { | |
| if( SliceTopLeftTileIdx[ i ] % NumTileColumns != NumTileColumns − 1 ) | |
| **slice_width_in_tiles_minus1**[ i ] | ue(v) |
| if( SliceTopLeftTileIdx[ i ] / NumTileColumns != NumTileRows − 1 && ( tile_idx_delta present_flag \| \| SliceTopLeftTileIdx[ i ] % NumTileColumns = = 0 ) ) | |
| **slice_height_in_tiles_minus1**[ i ] | ue(v) |
| if( slice_width_in_tiles_minus1[ i ] = = 0 && slice_height_in_tiles_minus1[ i] = = 0 && RowHeight[ SliceTopLeftTileIdx[ i ] / NumTileColumns ] > 1 ) { | |
| **num_exp_slices_in_tile**[ i ] | ue(v) |
| for( j = 0; j < num_exp_slices_in_tile[ i ]; j++ ) | |
| **exp_slice_height_in_ctus_minus1**[ i ][ j ] | ue(v) |
| i += NumSlicesInTile[ i ] − 1 | |
| } | |

TABLE 7-continued

| Picture parameter set RBSP syntax | Descriptor |
|---|---|
| if( tile_idx_delta_present_flag && i < num_slices_in_pic_minus1 ) | |
| **tile_idx_delta**[ i ] | se(v) |
| } | |
| } | |
| if( !pps_rect_slice_flag \| \| single_slice_per_subpic_flag \| \| num_slices_in_pic_minus1 >0) | |
| **pps_loop_filter_across_slices_enabled_flag** | u(1) |
| } | |
| **cabac_init_present_flag** | u(1) |
| for( i = 0; i < 2; i++ ) | |
| **num_ref_idx_default_active_minus1**[ i ] | ue(v) |
| **rpl1_idx_present_flag** | u(1) |
| **init_qp_minus26** | se(v) |
| **pps_cu_qp_delta_enabled_flag** | u(1) |
| **pps_chroma_tool_offsets_present_flag** | u(1) |
| if( pps_chroma_tool_offsets_present_flag ) { | |
| **pps_cb_qp_offset** | se(v) |
| **pps_cr_qp_offset** | se(v) |
| **pps_joint_cbcr_qp_offset_present_flag** | u(1) |
| if( pps_joint_cbcr_qp_offset_present_flag ) | |
| **pps_joint_cbcr_qp_offset_value** | se(v) |
| **pps_slice_chroma_qp_offsets_present_flag** | u(1) |
| **pps_cu_chroma_qp_offset_list_enabled_flag** | u(1) |
| } | |
| if( pps_cu_chroma_qp_offset_list_enabled_flag ) { | |
| **chroma_qp_offset_list_len_minus1** | ue(v) |
| for( i = 0; i <= chroma qp_offset list_len_minus1; i++ ) { | |
| **cb_qp_offset_list**[ i ] | se(v) |
| **cr_qp_offset_list**[ i ] | se(v) |
| if( pps_joint_cbcr_qp_offset_present_flag ) | |
| **joint_cbcr_qp_offset_list**[ i ] | se(v) |
| } | |
| } | |
| **pps_weighted_pred_flag** | u(1) |
| **pps_weighted_bipred_flag** | u(1) |
| **deblocking_filter_control_present_flag** | u(1) |
| if( deblocking_filter_control_present_flag ) { | |
| **deblocking_filter_override_enabled_flag** | u(1) |
| **pps_deblocking_filter_enabled_flag** | u(1) |
| if( !pps_no_pic_partition_flag && deblocking_filter_override_enabled_flag ) | |
| **dbf_info_in_ph_flag** | u(1) |
| if(pps_deblocking_filter_enabled_flag ) { | |
| **pps_luma_beta_offset_div2** | se(v) |
| **pps_luma_tc_offset_div2** | se(v) |
| if( pps_chroma_tool_offsets_present_flag ) { | |
| **pps_cb_beta_offset_div2** | se(v) |
| **pps_cb_tc_offset_div2** | se(v) |
| **pps_cr_beta_offset_div2** | se(v) |
| **pps_cr_tc_offset_div2** | se(v) |
| } | |
| } | |
| } | |
| if( !pps_no_pic_partition_flag ) { | |
| **rpl_info_in_ph_flag** | u(1) |
| **sao_info_in_ph_flag** | u(1) |
| **alf_info_in_ph_flag** | u(1) |
| if( ( pps_weighted_pred_flag \| \| pps_weighted_bipred_flag ) && rpl_info_in_ph_flag ) | |
| **wp_info_in_ph_flag** | u(1) |
| **qp_delta_info_in_ph_flag** | u(1) |
| } | |
| **pps_ref_wraparound_enabled_flag** | u(1) |
| if( pps_ref_wraparound_enabled_flag ) | |
| **pps_pic_width_minus_wraparound_offset** | ue(v) |
| **picture_header_extension_present_flag** | u(1) |
| **slice_header_extension_present_flag** | u(1) |
| **pps_extension_flag** | u(1) |
| if( pps_extension_flag ) | |
| while( more_rbsp_data( ) ) | |
| **pps_extension_data_flag** | u(1) |
| rbsp_trailing_bits( ) | |
| } | |

TABLE 8

| Picture parameter set RBSP semantics |
|---|
| A PPS RBSP shall be available to the decoding process prior to it being referenced, included in at least one AU with TemporalId less than or equal to the TemporalId of the PPS NAL unit or provided through external means.<br>All PPS NAL units with a particular value of pps_pic_parameter_set_id within a PU shall have the same content.<br>pps_pic_parameter_set_id identifies the PPS for reference by other syntax elements.<br>PPS NAL units, regardless of the nuh_layer_id values, share the same value space of pps_pic_parameter_set_id.<br>Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and all OLSs specified by the VPS that contain the layer with nuh_layer_id equal to vclLayerId also contain the layer with nuh_layer_id equal to ppslayerId.<br>pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.<br>mixed_nalu_types_in_pic_flag equal to 1 specifies that each picture referring to the PPS has more than one VCL NAL unit and the VCL NAL units do not have the same value of nal_unit_type. mixed_nalu_types_in_pic_flag equal to 0 specifies that each picture referring to the PPS has one or value of nal_unit_type.<br>When no_mixed_nalu_types_in_pic_constraint_flag is equal to 1, the value of mixed_nalu_types_in_pic_flag shall be equal to 0.<br>NOTE 1– mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl present_flag is equal to 0 and mixed_nalu_types_in_pic_flag is equal to 1, a picture referring to the PPS cannot have slices with nal_unit_type equal to IDR_W_RADL or IDR_N_LP.<br>pic_width_in_luma_samples specifies the width of each decoded picture referring to the PPS in units of luma samples. pic_width_in_luma_samples shall not be equal to 0, shall be an integer multiple of Max( 8, MinCbSizeY ), and shall be less than or equal to pic_width_max_in_luma_samples.<br>When res_change_in_clvs_allowed_flag equal to 0, the value of pic_width_in_luma_samples shall be equal to pic_width_max_in_luma_samples.<br>When sps_ref_wraparound_enabled_flag is equal to 1, the value of ( CtbSizeY / MinCbSizeY + 1 ) shall be less than or equal to the value of ( pic_width_in_luma_samples / MinCbSizeY − 1 ).<br>pic_height_in_luma_samples specifies the height of each decoded picture referring to the PPS in units of luma samples. pic_height_in_luma_samples shall not be equal to 0 and shall be an integer multiple of Max( 8, MinCbSizeY ), and shall be less than or equal to pic_height_max_in_luma_samples.<br>When res_change_in_clvs_allowed_flag equal to 0, the value of pic_height_in_luma_samples shall be equal to pic_height_max_in_luma_samples.<br>The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:<br>PicWidthInCtbsY = Ceil( pic_width_in_luma_samples ÷ CtbSizeY )<br>PicHeightInCtbsY = Ceil( pic_height_in_luma_samples ÷ CtbSizeY )<br>PicSizeInCtbsY = PicWidthInCtbsY * PicHeightInCtbsY<br>PicWidthInMinCbsY = pic_width_in_luma_samples / MinCbSizeY<br>PicHeightInMinCbsY = pic_height_in_luma_samples / MinCbSizeY<br>PicSizeInMinCbsY = PicWidthInMinCbsY * PicHeightInMinCbsY<br>PicSizeInSamplesY = pic_width_in_luma_samples * pic_height_in_luma_samples<br>PicWidthInSamplesC = pic_width_in_luma_samples / SubWidthC<br>PicHeightInSamplesC = pic_height_in_luma_samples / SubHeightC<br>pps_conformance_window_flag equal to 1 specifies that the conformance cropping window offset parameters follow next in the PPS. pps_conformance_window_flag equal to 0 specifies that the conformance cropping window offset parameters are not present in the PPS.<br>When pic_width_in_luma_samples is equal to pic_width_max_in_luma_samples and pic_height_in_luma_samples is equal to pic_height_max_in_luma_samples, the value of pps_conformance_window_flag shall be equal to 0.<br>pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output.<br>When pps_conformance_window_flag is equal to 0, the following applies:<br>If pic_width_in_luma_samples is equal to pic_width_max_in_luma_samples and pic_height_in_luma_samples is equal to pic_height_max_in_luma_samples, the values of pps_conf_win_left_offset, pps_conf_win_right_offset, pps_conf_win_top_offset, and pps_conf_win_bottom_offset are inferred to be equal to sps_conf_win_left_offset, sps_conf_win_right_offset, sps_conf_win_top_offset, and sps_conf_win_bottom_offset, respectively.<br>Otherwise, the values of pps_conf_win_left_offset, pps_conf_win_right_offset, pps_conf_win_top_offset, and pps_conf_win_bottom_offset are inferred to be equal to 0.<br>The conformance cropping window contains the luma samples with horizontal picture coordinates from SubWidthC * pps_conf_win_left_offset to pic_width_in_luma_samples − ( SubWidthC * pps_conf_win_right_offset + 1 ) and vertical picture coordinates from SubHeightC * pps_conf_win_top_offset to |

TABLE 8-continued

| Picture parameter set RBSP semantics |
|---|
| pic_height_in_luma_samples − ( SubHeightC * pps_conf_win_bottom_offset + 1 ), inclusive.<br>The value of SubWidthC * ( pps_conf_win_left_offset + pps_conf_win_right_offset ) shall be less than pic_width_in_luma_samples, and the value of<br>SubHeightC * ( pps_conf_win_top_offset + pps_conf_win_bottom_offset ) shall be less than pic_height_in_luma_samples.<br>When ChromaArrayType is not equal to 0, the corresponding specified samples of the two chroma arrays are the samples having picture coordinates ( x / SubWidthC, y / SubHeightC ), where ( x, y ) are the picture coordinates of the specified luma samples.<br>NOTE 2 − The conformance cropping window offset parameters are only applied at the output. All internal decoding processes are applied to the uncropped picture size.<br>Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.<br>When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.<br>scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When ref_pic_resampling_enabled_flag is equal to 0, the value of scaling_window_explicit_signalling_flag shall be equal to 0.<br>scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.<br>The value of SubWidthC * ( scaling_win_left_offset + scaling_win_right_offset ) shall be less than pic_width_in_luma_samples, and the value of<br>SubHeightC * ( scaling_win_top_offset + scaling_win_bottom_offset ) shall be less than pic_height_in_luma_samples.<br>The variables PicOutputWidthL and PicOutputHeightL are derived as follows:<br>PicOutputWidthL = pic_width_in_luma_samples −<br>SubWidthC * ( scaling_win_right_offset + scaling_win_left_offset )<br>PicOutputHeightL = pic_height_in_luma_samples −<br>Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:<br>PicOutputWidthL * 2 shall be greater than or equal to refPicWidthInLumaSamples.<br>PicOutputHeightL * 2 shall be greater than or equal to refPicHeightInLumaSamples.<br>PicOutputWidthL shall be less than or equal to refPicWidthInLumaSamples * 8.<br>PicOutputHeightL shall be less than or equal to refPicHeightInLumaSamples * 8.<br>PicOutputWidthL * pic_width_max_in_luma_samples shall be greater than or equal to refPicOutputWidthL * (pic_width_in_luma_samples − Max( 8, MinCbSizeY )).<br>PicOutputHeightL * pic_height_max_in_luma_samples shall be greater than or equal to refPicOutputHeightL * (pic_height_in_luma_samples − Max( 8, MinCbSizeY )).<br>output_flag_present_flag equal to 1 specifies that the pic_output_flag syntax element is present in PHs referring to the PPS. output_flag_present_flag equal to 0 specifies that the pic_output_flag syntax element is not present in PHs referring to the PPS.<br>pps_no_pic_partition_flag equal to 1 specifies that no picture partitioning is applied to each picture referring to the PPS. pps_no_pic_partition_flag equal to 0 specifies each picture referring to the PPS may be partitioned into more than one tile or slice.<br>It is a requirement of bitstream conformance that the value of pps_no_pic_partition_flag shall be the same for all PPSs that are referred to by coded pictures within a CLVS.<br>It is a requirement of bitstream conformance that the value of pps_no_pic_partition_flag shall not be equal to 1 when the value of sps_num_subpics_minus1 is greater than 0.<br>subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.<br>pps_num_subpics_minus1 shall be equal to sps_num_subpics_minus1. When no_pic_partition_flag is equal to 1, the value of pps_num_subpics_minus1 is inferred to be equal to 0.<br>pps_subpic_id_len_minus1 shall be equal to sps_subpic_id_len_minus1.<br>pps_subpic_id[ i ] specifies the subpicture ID of the i-th subpicture. The length of the pps_subpic_id[ i ] syntax element is pps_subpic_id_len_minus1 + 1 bits.<br>The variable SubpicIdVal[ i ], for each value of i in the range of 0 to sps_num_subpics_minus1, inclusive, is derived as follows:<br>for( i = 0; i <= sps_num_subpics_minus1; i++ )<br>if( subpic_id_mapping_explicitly_signalled_flag ) |

TABLE 8-continued

| Picture parameter set RBSP semantics |
|---|
| SubpicId Val[ i ] = subpic_id_mapping_in_pps_flag ? pps_subpic_id[ i ] : sps_subpic_id[ i ] (81)<br>else<br>SubpicIdVal[ i ] = i<br>It is a requirement of bitstream conformance that both of the following constraints apply:<br>For any two differenty values of i and j in the range of 0 to sps_num_subpics_minus1, inclusive, SubpicIdVal[ i ] shall not be equal to SubpicIdVal[ j ].<br>For each value of i in the range of 0 to sps_num_subpics_minus1, inclusive, when the value of SubpicIdVal[ i ] of a current picture is not equal to the value of SubpicIdVal[ i ] of a reference picture, the active entries of the RPLs of the coded slices in the i-th subpicture of the current picture shall not include that reference picture.<br>pps_log2_ctu_size_minus5 plus 5 specifies the luma coding tree block size of each CTU. pps_log2_ctu_size_minus5 shall be equal to sps_log2_ctu_size_minus5.<br>num_exp_tile_columns_minus1 plus 1 specifies the number of explicitly provided tile column widths. The value of num_exp_tile_columns_minus1 shall be in the range of 0 to PicWidthInCtbsY − 1, inclusive. When pps_no_pic_partition_flag is equal to 1, the value of num_exp_tile_columns_minus1 is inferred to be equal to 0.<br>num_exp_tile_rows_minus1 plus 1 specifies the number of explicitly provided tile row heights. The value of num_exp_tile_rows_minus1 shall be in the range of 0 to PicHeightInCtbsY − 1, inclusive. When pps_no_pic_partition_flag is equal to 1, the value of num_tile_rows_minus1 is inferred to be equal to 0.<br>tile_column_width_minus1[ i ] plus 1 specifies the width of the i-th tile column in units of CTBs for i in the range of 0 to num_exp_tile_columns_minus1, inclusive.<br>tile_column_width_minus1[ num_exp_tile_columns_minus1 ] is also used to derive the widths of the tile columns with index greater than num_exp_tile_columns_minus1 as specified in clause 6.5.1. The value of tile_column_width minus1[ i ] shall be in the range of 0 to PicWidthInCtbsY − 1, inclusive. When not present, the value of tile_column_width_minus1[ 0 ] is inferred to be equal to PicWidthInCtbsY − 1.<br>tile_row_height_minus1[ i ] plus 1 specifies the height of the i-th tile row in units of CTBs for i in the range of 0 to num_exp_tile_rows_minus1, inclusive.<br>tile_row_height_minus1[ num_exp_tile_rows_minus1 ] is also used to derive the heights of the tile rows with index greater than num_exp_tile_rows_minus1 as specified in clause 6.5.1. The value of tile_row_height_minus1[ i ] shall be in the range of 0 to PicHeightInCtbsY − 1, inclusive. When not present, the value of tile_row_height_minus1[ 0 ] is inferred to be equal to PicHeightInCtbsY − 1.<br>pps_loop_filter_across_tiles_enabled_flag equal to 1 specifies that in-loop filtering operations may be performed across tile boundaries in pictures referring to the PPS.<br>pps_loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of pps_loop_filter_across_tiles_enabled_flag is inferred to be equal to 1.<br>pps_rect_slice_flag equal to 0 specifies that tiles within each slice are in raster scan order and the slice information is not signalled in PPS. pps_rect_slice_flag equal to 1 specifies that tiles within each slice cover a rectangular region of the picture and the slice information is signalled in the PPS. When not present, pps_rect_slice_flag is inferred to be equal to 1. When sps_subpic_info_present_flag is equal to 1, the value of pps_rect_slice_flag shall be equal to 1.<br>single_slice_per_subpic_flag equal to 1 specifies that each subpicture consists of one and only one rectangular slice. single_slice_per_subpic_flag equal to 0 specifies that each subpicture may consist of one or more rectangular slices. When not present, the value of single_slice_per_subpic_flag is inferred to be equal to 1.<br>num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified. When pps_no_pic_partition_flag is equal to 1, the value of num_slices_in_pic_minus1 is inferred to be equal to 0. When single_slice_per_subpic_flag is equal to 1, the value of num_slices_in_pic_minus1 is inferred to be equal to sps_num_subpics_minus1.<br>tile_idx_delta_present_flag equal to 0 specifies that tile_idx_delta[ i ] syntax elements are not present in the PPS and all pictures referring to the PPS are partitioned into rectangular slice rows and rectangular slice columns in slice raster order. tile_idx_delta_present_flag equal to 1 specifies that tile_idx_delta[ i ] syntax elements may be present in the PPS and all rectangular slices in pictures referring to the PPS are specified in the order indicated by the values of the tile_idx_delta[ i ] in increasing values of i. When not present, the value of tile_idx_delta present_flag is inferred to be equal to 0.<br>slice_width_in_tiles_minus1[ i ] plus 1 specifies the width of the i-th rectangular slice in units of tile columns. The value of slice_width_in_tiles_minus1[ i ] shall be in the range of 0 to NumTileColumns − 1, inclusive. When not present, the value of slice_width_in_tiles_minus1[ i ] is inferred to be equal to 0.<br>slice_height_in_tiles_minus1[ i ] plus 1 specifies the height of the i-th rectangular slice in units of tile rows when num_exp_slices_in_tile[ i ] is equal to 0. The value of slice_height_in_tiles_minus1[ i ] shall be in the range of 0 to NumTileRows − 1, inclusive.<br>When slice_height_in_tiles_minus1[ i ] is not present, it is inferred as follows:<br>If SliceTopLeftTileIdx[ i ] % NumTileColumns is equal to NumTileColumns − 1, the value of slice_height_in_tiles_minus1[ i ] is inferred to be equal to 0.<br>Otherwise, the value of slice_height_in_tiles_minus1[ i ] is inferred to be equal to slice_height_in_tiles_minus1[ i − 1 ].<br>num_exp_slices_in_tile[ i ] specifies the number of explicitly provided slice heights for the slices in the tile containing the i-th slice (i.e., the tile with tile index equal to SliceTopLeftTileIdx[ i ]). |

TABLE 8-continued

| Picture parameter set RBSP semantics |
|---|
| The value of num_exp_slices_in_tile[ i ] shall be in the range of 0 to RowHeight[ SliceTopLeftTileIdx[ i ] / NumTileColumns ] − 1, inclusive. When not present, the value of num_exp_slices_in_tile[ i ] is inferred to be equal to 0.<br>NOTE 3 − If num_exp_slices_in_tile[ i ] is equal to 0, the tile containing the i-th slice is not split into multiple slices. Otherwise (num_exp_slices_in_tile[ i ] is greater than 0), the tile containing the i-th slice may or may not be split into multiple slices.<br>exp_slice_height_in_ctus_minus1[ i ][ j ] plus 1 specifies the height of the j-th rectangular slice in the tile containing the i-th slice, in units of CTU rows, for j in the range of 0 to num_exp_slices_in_tile[ i ] − 1, inclusive, when num_exp_slices_in_tile[ i ] is greater than 0. exp_slice_height_in_ctus_minus1[ i ][ num_exp_slices_in_tile[ i ] ] is also used to derive the heights of the rectangular slices in the tile containing the i-th slice with index greater than num_exp_slices_in_tile[ i ] − 1 as specified in clause 6.5.1. The value of exp_slice_height_in_ctus_minus1[ i ][ j ] shall be in the range of 0 to RowHeight[ SliceTopLeftTileIdx[ i ] / NumTileColumns ] − 1, inclusive.<br>tile_idx_delta[ i ] specifies the difference between the tile index of the tile containing the first CTU in the ( i + 1 )-th rectangular slice and the tile index of the tile containing the first CTU in the i-th rectangular slice. The value of tile_idx_delta[ i ] shall be in the range of −NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.<br>pps_loop_filter_across_slices_enabled_flag equal to 1 specifies that in-loop filtering operations may be performed across slice boundaries in pictures referring to the PPS.<br>loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of pps_loop_filter_across_slices_enabled_flag is inferred to be equal to 0.<br>cabac_init_present_flag equal to 1 specifies that cabac_init_flag is present in slice headers referring to the PPS. cabac_init_present_flag equal to 0 specifies that cabac_init_flag is not present in slice headers referring to the PPS.<br>num_ref_idx_default_active_minus1[ i ] plus 1, when i is equal to 0, specifies the inferred value of the variable NumRefIdxActive[ 0 ] for P or B slices with num_ref_idx_active_override_flag equal to 0, and, when i is equal to 1, specifies the inferred value of NumRefIdxActive[ 1 ] for B slices with num_ref_idx_active_override_flag equal to 0. The value of num_ref_idx_default_active_minus1[ i ] shall be in the range of 0 to 14, inclusive.<br>rpl1_idx_present_flag equal to 0 specifies that rpl_sps_flag[ 1 ] and rpl_idx[ 1 ] are not present in the PH syntax structures or the slice headers for pictures referring to the PPS.<br>rpl1_idx_present_flag equal to 1 specifies that rpl_sps_flag[ 1 ] and rpl_idx[ 1 ] may be present in the PH syntax structures or the slice headers for pictures referring to the PPS.<br>init_qp_minus26 plus 26 specifies the initial value of $SliceQp_Y$ for each slice referring to the PPS. The initial value of $SliceQp_Y$ is modified at the picture level when a non-zero value of ph_qp_delta is decoded or at the slice level when a non-zero value of slice_qp_delta is decoded. The value of init_qp_minus26 shall be in the range of −( 26 + QpBdOffset ) to +37, inclusive.<br>pps_cu_qp_delta_enabled_flag equal to 1 specifies that the ph_cu_qp_delta_subdiv_intra_slice and ph_cu_qp_delta_subdiv_inter_slice syntax elements are present in PHs referring to the PPS, and the cu_qp_delta_abs and cu_qp_delta_sign_flag syntax elements may be present in the transform unit syntax and the palette coding syntax. pps_cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS, and the cu_qp_delta_abs and cu_qp_delta_sign_flag syntax elements are not present in the transform unit syntax or the palette coding syntax.<br>pps_chroma_tool_offsets_present_flag equal to 1 specifies that chroma tool offsets related syntax elements are present in the PPS RBSP syntax structure and the chroma deblocking $t_c$ and β offset syntax elements are present in the PHs or the SHs of pictures referring to the PPS. pps_chroma_tool_offsets_present_flag equal to 0 specifies that chroma tool offsets related syntax elements are not present in in the PPS RBSP syntax structure and the chroma deblocking $t_c$ and β offset syntax elements are not present in the PHs or the SHs of pictures referring to the PPS. When ChromaArrayType is equal to 0, the value of pps_chroma_tool_offsets_present_flag shall be equal to 0.<br>pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equalt to 0.<br>pps_joint_cbcr_qp_offset_present_flag equal to 1 specifies that pps_joint_cbcr_qp_offset_value and joint_cbcr_qp_offset_list[ i ] are present in the PPS RBSP syntax structure.<br>pps_joint_cbcr_qp_offset_present_flag equal to 0 specifies that pps_joint_cbcr_qp_offset_value and joint_cbcr_qp_offset_list[ i ] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.<br>pps_joint_cbcr_qp_offset_value specifies the offset to the luma quantization parameter $Qp'_Y$ used for deriving $Qp'_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.<br>pps_slice_chroma_qp_offsets_present_flag equal to 1 specifies that the slice_cb_qp_offset and slice_cr_qp_offset syntax elements are present in the associated slice headers. |

TABLE 8-continued

| Picture parameter set RBSP semantics |
| --- |
| pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0. |
| pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. |
| pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0. |
| chroma_qp_offset_list_len_minus1 plus 1 specifies the number of cb_qp_offset_list[ i ], cr_qp_offset_list[ i ], and joint_cbcr_qp_offset_list[ i ], syntax elements that are present in the PPS RBSP syntax structure. The value of chroma_qp_offset_list_len_minus1 shall be in the range of 0 to 5, inclusive. |
| cb_qp_offset_list[ i ], cr_qp_offset_list[ i ], and joint_cbcr_qp_offset_list[ i ], specify offsets used in the derivation of $Qp'_{Cb}$, $Qp'_{Cr}$, and $Qp'_{CbCr}$, respectively. The values of cb_qp_offset_list[ i ], cr_qp_offset_list[ i ], and joint_cbcr_qp_offset_list[ i ] shall be in the range of −12 to +12, inclusive. When pps_joint_cbcr_qp_offset_present_flag is equal to 0, joint_cbcr_qp_offset_list[ i ] is not present and it is inferred to be equal to 0. |
| pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted pred_flag is equal to 0, the value of pps_weighted_pred_flag shall be equal to 0. |
| pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0. |
| deblocking_filter_control_present_flag equal to 1 specifies the presence of deblocking filter control syntax elements in the PPS. deblocking_filter_control_present_flag equal to 0 specifies the absence of deblocking filter control syntax elements in the PPS and that the deblocking filter is applied for all slices referring to the PPS, using 0-valued deblocking $\beta$ and $t_C$ offsets. |
| deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0. |
| pps_deblocking_filter_enabled_flag equal to 1 specifies that the operation of deblocking filter is not applied for slices referring to the PPS for which one of the following two conditions is true: 1) ph_deblocking_filter_disabled_flag and slice_deblocking_filter_disabled_flag are not present and inferred to be equal to 1 and 2) ph_deblockig_filter_disabled flag or slice_deblocking_filter_disabled_flag is present and equal to 1, and also specifies that the operation of deblocking filter is applied for slices referring to the PPS for which one of the following two conditions is true:1) ph_deblocking_filter_disabled_flag and slice_deblocking_filter_disabled_flag are not present and inferred to be equal to 0 and 2) ph_deblocking_filter_disabled_flag or slice_deblocking_filter_disabled_flag is present and equal to 0. |
| pps_deblocking_filter_disabled_flag equal to 0 specifies that the operation of the deblocking filter is applied for slices referring to the PPS for which one of the following two conditions is true: 1) ph_deblocking_filter_disabled_flag and slice_deblocking_filter_disabled_flag are not present and 2) ph_deblocking_filter_disabled_flag or slice_deblocking_filter_disabled_flag is present and equal to 0, and also specifies that the operation of deblocking filter is not applied for slices referring to the PPS for which ph_deblocking_filter_disabled_flag or slice_deblocking_filter_disabled_flag is present and equal to 1. |
| When not present, the value of pps_deblocking_filter_disabled_flag is inferred to be equal to 0. |
| dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS. When not present, the value of dbf_info_in_ph_flag is inferred to be equal to 0. |
| pps_luma_beta_offset_div2 and pps_luma_tc_offset_div2 specify the default deblocking parameter offsets for $\beta$ and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_luma_beta_offset_div2 and pps_luma_tc_offset_div2 shall both be in the range of −12 to 12, inclusive. When not present, the values of pps_luma_beta_offset_div2 and pps_luma_tc_offset_div2 are both inferred to be equal to 0. |
| pps_cb_beta_offset_div2 and pps_cb_tc_offset_div2 specify the default deblocking parameter offsets for $\beta$ and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are inferred to be equal to pps_luma_beta_offset_div2 and pps_luma_tc_offset_div2, respectively. |
| pps_cr_beta_offset_div2 and pps_cr_tc_offset_div2 specify the default deblocking parameter offsets for $\beta$ and tC (divided by 2) that are applied to the Cr component for slices referring to the |

TABLE 8-continued

| Picture parameter set RBSP semantics |
| --- |
| PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are inferred to be equal to pps_luma_beta_offset_div2 and pps_luma_tc_offset_div2, respectively. |
| rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS. When not present, the value of rpl_info_in_ph_flag is inferred to be equal to 0. |
| sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS. When not present, the value of sao_info_in_ph_flag is inferred to be equal to 0. |
| alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS. When not present, the value of alf_info_in_ph_flag is inferred to be equal to 0. |
| wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS. When not present, the value of wp_info_in_ph_flag is inferred to be equal to 0. |
| qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and is present in slice headers referring to the PPS. When not present, the value of qp_delta_info_in_ph_flag is inferred to be equal to 0. |
| pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY / MinCbSizeY + 1 is greater than pic_width_in_luma_samples / MinCbSizeY − 1, the value of pps_ref_wraparound_enabled_flag shall be equal to 0. When sps_ref_wraparound_enabled_flag is equal to 0, the value of pps_ref_wraparound_enabled_flag shall be equal to 0. |
| pps_pic_width_minus_wraparound_offset specifies the difference between the picture width and the offset used for computing the horizontal wrap-around position in units of MinCbSizeY luma samples. The value of pps_pic_width_minus_wraparound_offset shall be less than or equal to ( pic_width_in_luma_samples / MinCbSizeY ) − ( CtbSizeY / MinCbSizeY ) − 2. |
| The variable PpsRefWraparoundOffset is set equal to pic_width_in_luma_samples / MinCbSizeY − pps_pic_width_minus_wraparound_offset. |
| picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification. |
| slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification. |
| pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure. |
| pps_extension_data_flag may have any value. Its presence and value do not affect decoder conformance to profiles specified in this version of this Specification. Decoders conforming to this version of this Specification shall ignore all pps_extension data flag syntax elements. |

The slice header contains information that can change from slice to slice, as well as such picture related information that is relatively small or relevant only for certain slice or picture types. The size of slice header may be noticeably bigger than the PPS, particular when there are tile or wavefront entry point offsets in the slice header and RPS, prediction weights, or reference picture list modifications are explicitly signaled. The syntax of the picture header in current VVC draft specification is illustrated in Table 10. How to read the Table 10 is illustrated in the appendix section of this disclosure which could also be found in the VVC specification.

TABLE 10

Picture header structure syntax

| picture_header_structure( ) { | Descriptor |
| --- | --- |
| **gdr_or_irap_pic_flag** | u(1) |
| if( gdr_or_irap_pic_flag ) | |
| **gdr_pic_flag** | u(1) |
| **ph_inter_slice_allowed_flag** | u(1) |
| if( ph_inter_slice_allowed_flag ) | |
| **ph_intra_slice_allowed_flag** | u(1) |
| **non_reference_picture_flag** | u(1) |
| **ph_pic_parameter_set_id** | ue(v) |
| **ph_pic_order_cnt_lsb** | u(v) |
| if( gdr_or_irap_pic_flag ) | |
| **no_output_of_prior_pics_flag** | u(1) |
| if( gdr_pic_flag ) | |
| **recovery_poc_cnt** | ue(v) |
| for( i = 0; i < NumExtraPhBits; i++ ) | |
| **ph_extra_bit**[ i ] | u(1) |
| if( sps_poc_msb_cycle_flag ) { | |
| **ph_poc_msb_cycle_present_flag** | u(1) |
| if( ph_poc_msb_cycle_present_flag ) | |
| **poc_msb_cycle_val** | u(v) |
| } | |
| if( sps_alf_enabled_flag && alf_info_in_ph_flag ) { | |
| **ph_alf_enabled_flag** | u(1) |
| if( ph_alf_enabled_flag ) { | |
| **ph_num_alf_aps_ids_luma** | u(3) |
| for( i = 0; i < ph_num_alf_aps_ids_luma; i++ ) | |
| **ph_alf_aps_id_luma**[ i ] | u(3) |
| if( ChromaArrayType != 0 ) { | |
| **ph_alf_cb_flag** | u(1) |
| **ph_alf_cr_flag** | u(1) |
| } | |
| if( ph_alf_cb_flag \|\| ph_alf_cr_flag ) | |
| **ph_alf_aps_id_chroma** | u(3) |
| if( sps_ccalf_enabled_flag ) { | |
| **ph_cc_alf_cb_enabled_flag** | u(1) |
| if( ph_cc_alf_cb_enabled_flag ) | |
| **ph_cc_alf_cb_aps_id** | u(3) |
| **ph_cc_alf_cr_enabled_flag** | u(1) |
| if( ph_cc_alf_cr_enabled_flag ) | |
| **ph_cc_alf_cr_aps_id** | u(3) |
| } | |
| } | |
| } | |
| if( sps_lmcs_enabled_flag ) { | |
| **ph_lmcs_enabled_flag** | |
| if( ph_lmcs_enabled_flag ) { | |
| **ph_lmcs_aps_id** | u(2) |
| if( ChromaArrayType != 0) | |
| **ph_chroma_residual_scale_flag** | u(1) |
| } | |
| } | |
| if( sps_explicit_scaling_list_enabled_flag ) { | |
| **ph_explicit_scaling_list_enabled_flag** | u(1) |
| if( ph_explicit_scaling_list_enabled_flag ) | |
| **ph_scaling_list_aps_id** | u(3) |
| } | |
| if( sps_virtual_boundaries_enabled_flag && !sps_virtual_boundaries_present_flag ) { | |
| **ph_virtual_boundaries_present_flag** | u(1) |
| if( ph_virtual_boundaries_present_flag ) { | |
| **ph_num_ver_virtual_boundaries** | u(2) |
| for( i = 0; i < ph_num_ver_virtual_boundaries; i++ ) | |
| **ph_virtual_boundary_pos_x**[ i ] | ue(v) |
| **ph_num_hor_virtual_boundaries** | u(2) |
| for( i = 0; i < ph_num hor_virtual_boundaries; i++ ) | |
| **ph_virtual_boundary_pos_y**[ i ] | ue(v) |
| } | |
| } | |
| if( output_flag_present_flag && !non_reference_picture_flag ) | |
| **pic_output_flag** | u(1) |
| if( rpl_info_in_ph_flag ) | |
| ref_pic_lists( ) | |
| if( partition_constraints_override_enabled_flag ) | |
| **partition_constraints_override_flag** | u(1) |

TABLE 10-continued

| Picture header structure syntax | |
|---|---|
| picture_header_structure( ) { | Descriptor |
| if( ph_intra_slice_allowed_flag ) { | |
| if( partition_constraints_override_flag ) { | |
| **ph_log2_diff_min_qt_min_cb_intra_slice_luma** | ue(v) |
| **ph_max_mtt_hierarchy_depth_intra_slice_luma** | ue(v) |
| if( ph_max_mtt_hierarchy_depth_intra_slice_luma != 0 ) { | |
| **ph_log2_diff_max_bt_min_qt_intra_slice_luma** | ue(v) |
| **ph_log2_diff_max_tt_min_qt_intra_slice_luma** | ue(v) |
| } | |
| if( qtbtt_dual_tree_intra_flag ) { | |
| **ph_log2_diff_min_qt_min_cb_intra_slice_chroma** | ue(v) |
| **ph_max_mtt_hierarchy_depth_intra_slice_chroma** | ue(v) |
| if( ph_max_mtt_hierarchy_depth_intra_slice_chroma != 0 ) { | |
| **ph_log2_diff_max_bt_min_qt_intra_slice_chroma** | ue(v) |
| **ph_log2_diff_max_tt_min_qt_intra_slice_chroma** | ue(v) |
| } | |
| } | |
| } | |
| if( pps_cu_qp_delta_enabled_flag ) | |
| **ph_cu_qp_delta_subdiv_intra_slice** | ue(v) |
| if( pps_cu_chroma_qp_offset_list_enabled_flag ) | |
| **ph_cu_chroma_qp_offset_subdiv_intra_slice** | ue(v) |
| } | |
| if( ph_inter_slice_allowed_flag ) { | |
| if( partition_constraints_override_flag ) { | |
| **ph_log2_diff_min_qt_min_cb_inter_slice** | ue(v) |
| **ph_max_mtt_hierarchy_depth_inter_slice** | ue(v) |
| if( ph_max_mtt_hierarchy_depth_inter_slice != 0 ) { | |
| **ph_log2_diff_max_bt_min_qt_inter_slice** | ue(v) |
| **ph_log2_diff_max_tt_min_qt_inter_slice** | ue(v) |
| } | |
| } | |
| if( pps_cu_qp_delta_enabled_flag ) | |
| **ph_cu_qp_delta_subdiv_inter_slice** | ue(v) |
| if( pps_cu_chroma_qp_offset_list_enabled_flag ) | |
| **ph_cu_chroma_qp_offset_subdiv_inter_slice** | ue(v) |
| if( sps_temporal_mvp_enabled_flag ) { | |
| **ph_temporal_mvp_enabled_flag** | u(1) |
| if( ph_temporal_mvp_enabled_flag && rpl_info_in_ph flag ) { | |
| if( num_ref_entries[ 1 ][ RplsIdx[ 1 ] ] > 0 ) | |
| **ph_collocated_from_l0_flag** | u(1) |
| if( ( ph_collocated_from l0 flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) | |
| **ph_collocated_ref_idx** | ue(v) |
| } | |
| } | |
| if( sps_fpel_mmvd_enabled_flag ) | |
| **ph_fpel_mmvd_enabled_flag** | u(1) |
| if( !rpl_info_in_ph_flag \|\| num_ref_entries[ 1 ][ RplsIdx[ 1 ] ] > 0 ) { | |
| **mvd_l1_zero_flag** | u(1) |
| if( sps_bdof_control_present_in_ph_flag ) | |
| **ph_disable_bdof_flag** | u(1) |
| if( sps_dmvr_control_present_in_ph_flag ) | |
| **ph_disable_dmvr_flag** | u(1) |
| } | |
| if( sps_prof_control_present_in_ph_flag ) | |
| **ph_disable_prof_flag** | u(1) |
| if( ( pps_weighted_pred_flag \|\| pps_weighted_bipred_flag ) && wp_info_in_ph_flag ) | |
| pred_weight_table( ) | |
| } | |
| if( qp_delta_info_in_ph_flag ) | |
| **ph_qp_delta** | se(v) |
| if( sps_joint_cbcr_enabled_flag ) | |
| **ph_joint_cbcr_sign_flag** | u(1) |
| if( sps_sao_enabled_flag && sao_info_in_ph_flag ) { | |
| **ph_sao_luma_enabled_flag** | u(1) |
| if( ChromaArrayType != 0 ) | |
| **ph_sao_chroma_enabled_flag** | u(1) |
| } | |

TABLE 10-continued

| Picture header structure syntax | |
|---|---|
| picture_header_structure( ) { | Descriptor |
| if( sps_dep_quant_enabled_flag ) | |
| **ph_dep_quant_enabled_flag** | u(1) |
| if( sps_sign_data_hiding_enabled_flag && !ph_dep_quant_enabled_flag ) | |
| **ph_sign_data_hiding_enabled_flag** | u(1) |
| if( deblocking_filter_override_enabled flag && dbf_info_in_ph_flag ) { | |
| **ph_deblocking_filter_override_flag** | u(1) |
| if( ph_deblocking_filter_override_flag ) { | |
| if( !pps_deblocking_filter_disabled_flag ) | |
| **ph_deblocking_filter_disabled_flag** | u(1) |
| if( !ph_deblocking_filter_disabled_flag ) { | |
| **ph_luma_beta_offset_div2** | se(v) |
| **ph_luma_tc_offset_div2** | se(v) |
| if( pps_chroma_tool_offsets_present_flag ) { | |
| **ph_cb_beta_offset_div2** | se(v) |
| **ph_cb_tc_offset_div2** | se(v) |
| **ph_cr_beta_offset_div2** | se(v) |
| **ph_cr_tc_offset_div2** | se(v) |
| } | |
| } | |
| } | |
| } | |
| if( picture_header_extension_present_flag ) { | |
| **ph_extension_length** | ue(v) |
| for( i = 0; i < ph_extension_length; i++ ) | |
| **ph_extension_data_byte**[ i ] | u(8) |
| } | |
| } | |

Improvements to Syntax Elements

In current VVC, when there are similar syntax elements for intra and inter prediction, respectively, in some places the syntax elements related to inter prediction are defined prior to those related to intra prediction. Such an order may not be preferable, given that fact that intra prediction is allowed in all picture/slice types while inter prediction is not. It would be beneficial from standardization point of view to always define intra prediction related syntaxes prior to those for inter prediction.

It is also observed that in current VVC, some syntax elements that are highly correlated to each other are defined at different places in a spread manner. It would be also beneficial from standardization point of view to group some syntaxes together.

Proposed Methods

In this disclosure, to address the issues as pointed out in the "problem statement" section, methods are provided to simplify and/or further improve the existing design of the high-level syntax. It is noted that the invented methods could be applied independently or jointly.

Grouping the Partition Constraint Syntax Elements by Prediction Type

In this disclosure, it is proposed to rearrange the syntax elements so that the intra prediction related syntax elements are defined before those related to inter prediction. According to the disclosure, the partition constraint syntax elements are grouped by prediction type, with intra prediction related first, followed by inter prediction related. In one embodiment, the order of the partition constraint syntax elements in SPS is consistent with the order of the partition constraint syntax elements in the picture header. An example of the decoding process on VVC Draft is illustrated in Table 11 below. The changes to the VVC Draft are shown using the bold and italicized font while the deleted parts are shown in italicized font and enclosed between double number sign "##".

TABLE 11

| Proposed sequence parameter set RBSP syntax | |
|---|---|
| seq_parameter_set_rbsp( ) { | Descriptor |
| . . . | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| ***if( qtbtt_dual_tree_intra_flag ) {*** | |
| ***sps_log2_diff_min_qt_min_cb_intra_slice_chroma*** | ***ue(v)*** |
| ***sps_max_mtt_hierarchy_depth_intra_slice_chroma*** | ***ue(v)*** |

TABLE 11-continued

| Proposed sequence parameter set RBSP syntax | |
|---|---|
| seq_parameter_set_rbsp( ) { | Descriptor |
| ***if( sps_max_mtt_hierarchy_depth_intra_slice_chroma != 0 )*** { | |
| ***sps_log2_diff_max_bt_min_qt_intra_slice_chroma*** | ***ue(v)*** |
| ***sps_log2_diff_max_tt_min_at_intra_slice_chroma*** | ***ue(v)*** |
| } | |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| *##if( qtbtt_dual_tree_intra_flag ) {##* | |
| *##sps_log2_diff_min_qt_min_cb_intra_slice_chroma##* | *##ue(v) ##* |
| *##sps_max_mtt_hierarchy_depth_intra_slice_chroma##* | *##ue(v) ##* |
| *##if( sps_max_mtt_hierarchy_depth_intra_slice_chroma != 0 ) {##* | |
| *##sps_log2_diff_max_bt_min_qt_intra_slice_chroma##* | *##ue(v) ##* |
| *##sps_log2_diff_max_tt_min_qt_intra_slice_chroma##* | *#ue(v) ##* |
| *##}##* | |
| *##}##* | |
| . . . | |
| } | |

Grouping the Dual-Tree Chroma Syntax Elements

In this disclosure, it is proposed to group the syntax elements related to dual-tree chroma type. In one embodiment, the partition constraint syntax elements for dual-tree chroma in SPS should be signaled together under dual-tree chroma cases. An example of the decoding process on VVC Draft is illustrated in Table 12 below. The changes to the VVC Draft are shown using the bold and italicized font while the deleted parts are shown in italicized font and enclosed between double number sign "##".

TABLE 12

| Proposed sequence parameter set RBSP syntax | |
|---|---|
| seq_parameter_set_rbsp( ) { | Descriptor |
| . . . | |
| *##if( ChromaArrayType != 0 ) ##* | |
| *##qtbtt_dual_tree_intra_flag##* | *##u(1) ##* |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| ***if( ChromaArrayType != 0 )*** { | |
| ***qtbtt_dual_tree_intra_flag*** | ***u(1)*** |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| } | |
| . . . | |
| } | |

If also considering defining intra prediction related syntaxes prior to those related to inter prediction, according to the method of the disclosure, another example of the decoding process on VVC Draft is illustrated in Table 13 below. The changes to the VVC Draft are shown using the bold and italicized font while the deleted parts are shown in italicized font and enclosed between double number sign "##".

TABLE 13

| Proposed sequence parameter set RBSP syntax | |
|---|---|
| seq_parameter_set_rbsp( ) { | Descriptor |
| . . . | |
| *##if( ChromaArrayType != 0 )##* | |
| *##qtbtt_dual_tree_intra_flag##* | *##u(1)##* |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| ***if( ChromaArrayType != 0 )*** { | |
| ***qtbtt_dual_tree_intra_flag*** | ***u(1)*** |
| ***if( qtbtt_dual_tree_intra_flag )*** { | |
| ***sps_log2_diff_min_qt_min_cb_intra_slice_chroma*** | ***ue(v)*** |
| ***sps_max_mtt_hierarchy_depth_intra_slice_chroma*** | ***ue(v)*** |
| ***if( sps_max_mtt_hierarchy_depth_intra_slice_chroma != 0 )*** { | |
| ***sps_log2_diff_max_bt_min_qt_intra_slice_chroma*** | ***ue(v)*** |
| ***sps_log2_diff_max_tt_min_at_intra_slice_chroma*** | ***ue(v)*** |
| } | |
| } | |
| } | |
| sps_log2_diff_min_qt_min_cb_inter slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| *##if( qtbtt_dual_tree_intra_flag ) {##* | |
| *##sps_log2_diff_min_qt_min_cb_intra_slice_chroma##* | *##ue(v) ##* |
| *##sps_max_mtt_hierarchy_depth_intra_slice_chroma##* | *##ue(v) ##* |
| *##if( sps_max_mtt_hierarchy_depth_intra_slice_chroma != 0 ) {##* | |
| *##sps log2_diff_max_bt_min_qt_intra_slice_chroma##* | *##ue(v) ##* |
| *##sps_log2_diff_max_tt_min_qt_intra_slice_chroma##* | *#ue(v) ##* |
| *##}##* | |
| *##}##* | |
| . . . | |
| } | |

Conditionally Signaling Inter-Prediction Related Syntax Elements

As mentioned in the earlier description, according to the current VVC, intra prediction is allowed in all picture/slice types while inter prediction is not. According to this disclosure, it is proposed to add a flag in VVC syntax at certain coding level to indicate whether inter prediction is allowed or not in a sequence, picture and/or slice. In case inter prediction is not allowed, inter prediction related syntaxes are not signaled at the corresponding coding level, e.g. sequence, picture and/or slice level.

According to this disclosure, it is also proposed to add a flag in VVC syntax at certain coding level to indicate whether inter slices such as P-slice and B-slice are allowed or not in a sequence, picture and/or slice. In case inter slices are not allowed, inter slices related syntaxes are not signaled at the corresponding coding level, e.g. sequence, picture and/or slice level.

Some examples are given based on the proposed inter slices allowed flags in the following section. And, the proposed inter prediction allowed flags can be used in a similar way.

When the proposed inter slice allowed flags are added at different levels. These flags can be signaled in a hierarchical manner. When the signaled flag at higher level indicates that inter slice is not allowed, the flag at lower levels has no need to be signaled and can be inferred as 0 (which mean inter slice is not allowed).

In one example, according to the method of the disclosure, a flag is added in SPS to indicate if inter slice is allowed in coding the current video sequence. In case it is not allowed, inter slice related syntax elements are not signaled in SPS. An example of the decoding process on VVC Draft is illustrated in Table 14 below. The changes to the VVC Draft are shown using the bold and italicized font while the deleted parts are shown in italicized font and enclosed between double number sign "##". It is noted that there are syntax elements other than those introduced in the example. For example, there are many inter slice (or inter prediction tools) related syntax elements such as sps_weighted_pred_flag, sps_temporal_mvp_enabled_flag, sps_amvr_enabled_flag, sps_bdof_enabled_flag and so on; there are also syntax elements related to the reference picture lists such as long_term_ref_pics_flag, inter_layer_ref_pics_present_flag, sps_idr_rpl_present_flag and so on. All these syntax elements related to inter prediction can selectively be controlled by the proposed flag.

TABLE 14

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height max in luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| ***sps_inter_slice_allowed_flag*** | ***u(1)*** |
| ***if(sps_inter_slice_allowed_flag )*** { | |
| sps_weighted_pred_flag | u(1) |
| sps_weighted_bipred_flag | u(1) |
| } | |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| long_term_ref_pics_flag | u(1) |
| inter_layer_ref_pics_present_flag | u(1) |

TABLE 14-continued

| Proposed sequence parameter set RBSP syntax | |
|---|---|
| seq_parameter_set_rbsp( ) { | Descriptor |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
| num_ref pic_lists_in_sps[ i ] | ue(v) |
| for( j = 0; j < num_ref pic_lists_in_sps[ i ]; j++) | |
| ref pic_list_struct( i, j ) | |
| } | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| ***if(sps_inter_slice_allowed_flag )*** { | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables_same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for(j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***if(sps_inter_slice_allowed_flag )*** { | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag) | |
| sps_dmvr_pic_present_flag | u(1) |
| sps_mmvd_enabled_flag | u(1) |
| } | |
| sps_isp_enabled_flag | u(1) |
| sps_mrl_enabled_flag | u(1) |
| sps_mip_enabled_flag | u(1) |

TABLE 14-continued

Proposed sequence parameter set RBSP syntax

```
seq_parameter_set_rbsp( ) {                                          Descriptor
  if( ChromaArrayType != 0 )
    sps_cclm_enabled_flag                                            u(1)
  if( chroma_format_idc = = 1 ) {
    sps_chroma_horizontal_collocated_flag                            u(1)
    sps_chroma_vertical_collocated_flag                              u(1)
  }
  sps_mts_enabled_flag                                               u(1)
  if( sps_mts_enabled_flag ) {
    sps_explicit_mts_intra_enabled_flag                              u(1)
    if(sps_inter_slice_allowed_flag )
    sps_explicit_mts_inter_enabled_flag                              u(1)
  }
  if(sps_inter_slice_allowed_flag ) {
  six_minus_max_num_merge_cand                                       ue(v)
  sps_sbt_enabled_flag                                               u(1)
  sps_affine_enabled_flag                                            u(1)
  if( sps_affine_enabled_flag ) {
    five_minus_max_num_subblock_merge_cand                           ue(v)
    sps_affine_type_flag                                             u(1)
    if( sps_amvr_enabled_flag )
      sps_affine_amvr_enabled_flag                                   u(1)
    sps_affine_prof_enabled_flag                                     u(1)
    if( sps_affine_prof_enabled_flag )
      sps_prof_pic_present_flag                                      u(1)
  }
  }
  sps_palette_enabled_flag                                           u(1)
  if(      ChromaArrayType         = =          3
&& !sps_max_luma_transform_size_64_flag )
    sps_act_enabled_flag                                             u(1)
  if( sps_transform_skip_enabled_flag | | sps_palette_enabled_flag )
    min_qp_prime_ts_minus4                                           ue(v)
if(sps_inter_slice_allowed_flag)
  sps_bcw_enabled_flag                                               u(1)
  sps_ibc_enabled_flag                                               u(1)
  if( sps_ibc_enabled_flag )
    six_minus_max_num_ibc_merge_cand                                 ue(v)
if(sps_inter_slice_allowed_flag ) {
  sps_ciip_enabled_flag                                              u(1)
  if( sps_mmvd_enabled_flag )
    sps_fpel_mmvd_enabled_flag                                       u(1)
  if( MaxNumMergeCand >= 2 ) {
    sps_gpm_enabled_flag                                             u(1)
    if( sps_gpm_enabled_flag && MaxNumMergeCand >= 3 )
      max_num_merge_cand_minus_max_num_gpm_cand                      ue(v)
  }
}
  sps_lmcs_enabled_flag                                              u(1)
  sps_lfnst_enabled_flag                                             u(1)
  sps_ladf_enabled_flag                                              u(1)
  if( sps_ladf_enabled_flag ) {
    sps_num_ladf_intervals_minus2                                    u(2)
    sps_ladf_lowest_interval_qp_offset                               se(v)
    for( i = 0; i < sps_num_ladf_intervals_minus2 + 1; i++ ) {
      sps_ladf_qp_offset[ i ]                                        se(v)
      sps_ladf_delta_threshold_minus1[ i ]                           ue(v)
    }
  }
  if(sps_inter_slice_allowed_flag )
  log2_parallel_merge_level_minus2                                   ue(v)
  sps_explicit_scaling_list_enabled_flag                             u(1)
  sps_dep_quant_enabled_flag                                         u(1)
  if( !sps_dep_quant_enabled_flag )
    sps_sign_data_hiding_enabled_flag                                u(1)
  sps_virtual_boundaries_enabled_flag                                u(1)
  if( sps_virtual_boundaries_enabled_flag ) {
    sps_virtual_boundaries_present_flag                              u(1)
    if( sps_virtual_boundaries_present_flag ) {
  sps_num_ver_virtual_boundaries                                     u(2)
      for( i = 0; i < sps_num_ver_virtual_boundaries; i++ )
        sps_virtual_boundaries_pos_x[ i ]                            u(13)
      sps_num_hor_virtual_boundaries                                 u(2)
      for( i = 0; i < sps_num_hor_virtual_boundaries; i++ )
        sps_virtual_boundaries pos_y[ i ]                            u(13)
    }
  }
```

TABLE 14-continued

| Proposed sequence parameter set RBSP syntax | |
|---|---|
| seq_parameter_set_rbsp( ) { | Descriptor |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

7.4.3.3 Sequence Parameter Set RBSP Semantics sps_inter_slice_allowed_flag equal to 0 specifies that all coded slices of the video sequence have slice_type equal to 2 (which indicates that the coded slice is I slice). sps_inter_slice_allowed_flag equal to 1 specifies that there may or may not be one or more coded slices in the video sequence that have slice_type equal to 0 (which indicates that the coded slice is P slice) or 1 (which indicates that the coded slice is B slice).

In another example, according to the method of the disclosure, a flag is added in picture parameter set PPS to indicate if inter slice is allowed in coding the pictures associated with this PPS. In case it is not allowed, the selected inter prediction related syntax elements are not signaled in PPS.

In yet another example, according to the method of the disclosure, the inter slice allowed flags can be signaled in a hierarchical manner. A flag is added in SPS to indicate if inter slice is allowed in coding the pictures associated with this SPS e.g. sps_inter_slice_allowed_flag. When sps_inter_slice_allowed_flag is equal to 0 (which means inter slice is not allowed), the inter slice allowed flag in picture header can be omitted for signaling and be inferred as 0. An example of the decoding process on VVC Draft is illustrated in Table 15 below. The changes to the VVC Draft are shown using the bold and italicized font while the deleted parts are shown in italicized font and enclosed between double number sign "##".

TABLE 15

| Proposed sequence parameter set RBSP syntax | |
|---|---|
| picture header structure( ) { | Descriptor |
| . . . | |
| ***if(sps_inter_slice_allowed_flag )*** | |
| ph_inter_slice_allowed_flag | u(1) |
| if( ph_inter_slice_allowed_flag ) | |
| ph_intra_slice_allowed_flag | u(1) |
| . . . | |
| } | |

7.4.3.7 Picture Header Structure Semantics ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1. When not present, the value of ph_inter_slice_allowed_flag is inferred to be equal to 0.

Grouping the Inter-Related Syntax Elements

In this disclosure, it is proposed to rearrange the syntax elements so that the inter prediction related syntax elements are grouping in VVC syntax at certain coding level, e.g. sequence, picture and/or slice level. According to the disclosure, it is proposed to rearrange the syntax elements related to inter slices in the sequence parameter set (SPS). An example of the decoding process on VVC Draft is illustrated in Table 16 below. The changes to the VVC Draft are shown using the bold and italicized font while the deleted parts are shown in italicized font and enclosed between double number sign "##".

TABLE 16

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |

TABLE 16-continued

Proposed sequence parameter set RBSP syntax

| seq_parameter_set_rbsp( ) { | Descriptor |
|---|---|
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left y[ i ] | u(v) |
| if( i < sps_num_subpics_minus1 && pic_width_max_in luma samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| ##*sps_weighted_pred_flag*## | ##*u*(*1*) ## |
| ##*sps_weighted_bipred_flag*## | ##*u*(*1*) ## |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |

TABLE 16-continued

| Proposed sequence parameter set RBSP syntax | |
|---|---|
| seq_parameter_set_rbsp( ) { | Descriptor |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for(i = 0; i < rpll_same_as_rpl0_flag ? 1 : 2; i+ + ) {##* | |
| *##num_ref_pic_lists_in_sps[ i ] ##* | *#ue(v) ##* |
| *##for( j = 0; j < num_ref_pic_lists_in_sps[ i ]; j+ +)##* | |
| *##ref_pic_list_struct( i, j ) ##* | |
| *##}##* | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| sps_log2_diff_min_qt_min_cb_inter_slice | *##ue(v)##* |
| sps_max_mtt_hierarchy_depth_inter_slice | *##ue(v)##* |
| if( sps_max_mtt_hierarchy_depth_inter_slice != 0 ) { | |
| sps_log2_diff_max_bt_min_qt_inter_slice | *##ue(v)##* |
| sps_log2_diff_max_tt_min_qt_inter_slice | *##ue(v)##* |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |
| ***for( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j <num_ref_pic_lists_in_sps***[ ***i*** ]***; j++)*** | |
| ***ref_pic_list_struct( i, j )*** | |
| } | |
| ***sps_weighted_pred_flag*** | ***u(1)*** |
| ***sps_weighted_bipred_flag*** | ***u(1)*** |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |

TABLE 16-continued

Proposed sequence parameter set RBSP syntax

| seq_parameter_set_rbsp( ) { | Descriptor |
|---|---|
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag ) | |
| sps_dmvr_pic_present_flag | u(1) |
| sps_mmvd_enabled_flag | u(1) |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag ) {*** | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag)*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 ) {*** | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ##*six_minus_max_num_merge_cand*## | ##*ue(v)* ## |
| ##*sps_sbt_enabled_flag*## | ##*u(1)* ## |
| ##*sps_affine_enabled_flag*## | ##*u(1)* ## |
| ##*if( sps_affine_enabled_flag* ) {## | |
| ##*five_minus_max_num_subblock_merge_cand*## | ##*ue(v)* ## |
| ##*sps_affine_type_flag*## | ##*u(1)* ## |
| ##*if( sps_amvr_enabled_flag* ) ## | |
| ##*sps_affine_amvr_enabled_flag*## | ##*u(1)* ## |
| ##*sps_affine_prof_enabled_flag*## | ##*u(1)* ## |
| ##*if( sps_affine_prof_enabled_flag* ) ## | |
| ##*sps_prof_pic_present_flag*## | ##*u(1)* ## |
| ##}## | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| ##*sps_bcw_enabled_flag*## | ##*u(1)* ## |
| sps_ibc_enabled_flag | u(1) |
| if( sps_ibc_enabled_flag ) | |
| six_minus_max_num_ibc_merge_cand | ue(v) |
| ##sps_ciip_enabled_flag## | ##u(1) ## |
| ##if( sps_mmvd_enabled_flag ) ## | |
| ##sps_fpel_mmvd_enabled_flag## | ##u(1)## |
| ##if( MaxNumMergeCand >= 2 ) {## | |
| ##sps_gpm_enabled_flag## | ##u(1)## |
| ##if( sps_gpm_enabled_flag && MaxNumMergeCand >= 3 )## | |
| ##max_num_merge_cand_minus_max_num_gpm_cand## | ##ue(v) ## |
| ##}## | |
| sps_lmcs_enabled_flag | u(1) |
| sps_lfnst_enabled_flag | u(1) |
| sps_ladf_enabled_flag | u(1) |

TABLE 16-continued

| Proposed sequence parameter set RBSP syntax | |
|---|---|
| seq_parameter_set_rbsp( ) { | Descriptor |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus2##* | *##ue(v) ##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Another example of the decoding process on VVC Draft is illustrated in Table 17 below: The changes to the VVC Draft are shown using the bold and italicized font while the deleted parts are shown in italicized font and enclosed between double number sign "##".

TABLE 17

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |

TABLE 17-continued

Proposed sequence parameter set RBSP syntax

| seq_parameter_set_rbsp( ) { | Descriptor |
|---|---|
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i >0 && pic_height_max in luma samples > CtbSizeY ) { | |
| subpic_ctu_top_left_y[ i ] | u(v) |
| if( i < sps_num_subpics_minus1 && | |
| pic_width max_in_luma_samples > CtbSizeY ) | |
| subpic_width_minus1[ i ] | u(v) |
| if( i < sps_num_subpics_minus1 && | |
| pic_height_max_in_luma samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) sps_wpp_entry_point_offsets_present_flag | u(1) |
| *##sps_weighted_pred_flag##* | *##u(1) ##* |
| *##sps_weighted_bipred_flag##* | *##u(1)##* |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for( i = 0; i < rpl1_same_as_rpl0_flag ? 1 : 2; i+ + ) {##* | |
| *##num_ref_pic_lists_in_sps[ i ] ##* | *##ue(v) ##* |
| *##for( j = 0; j < num_ref_pic_lists_in_sps[ i ]; j+ +)##* | |
| *##ref_pic_list_struct( i, j ) ##* | |
| *##}##* | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice)luma | ue(v) |

TABLE 17-continued

Proposed sequence parameter set RBSP syntax

| seq_parameter_set_rbsp( ) { | Descriptor |
|---|---|
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| *##sps_log2_diff_min_qt_min_cb_inter_slice##* | *#ue(v) ##* |
| *##sps_max_mtt_hierarchy_depth_inter_slice##* | *#ue(v) ##* |
| *##if( sps_max_mtt_hierarchy_depth_inter_slice != 0 ) {##* | |
| *##sps_log2_diff_max_bt_min_qt_inter_slice##* | *##ue(v) ##* |
| *##sps_log2_diff_max_tt_min_qt_inter_slice##* | *##ue(v) ##* |
| *##}##* | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for(j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***sps_mts_enabled_flag*** | ***u(1)*** |
| ***if( sps_mts_enabled_flag )*** | |
| ***sps_explicit_mts_intra_enabled_flag*** | ***u(1)*** |
| ***sps_inter_slice_allowed_flag*** | ***u(1)*** |
| ***if(sps_inter_slice_allowed_flag )*** { | |
| ***if( sps_mts_enabled_flag )*** | |
| ***sps_explicit_mts_inter_enabled_flag*** | ***u(1)*** |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |
| ***for( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j < num_ref_pic_lists_in_sps***[ ***i*** ]***; j++)*** | |
| ***ref_pic_list_struct( i, j )*** | |
| } | |
| ***sps_log2_diff_min_qt_min_cb_inter_slice*** | ***ue(v)*** |
| ***sps_max_mtt_hierarchy_depth_inter_slice*** | ***ue(v)*** |
| ***if( sps_max_mtt_hierarchy_depth_inter_slice != 0 )*** { | |
| ***sps_log2_diff_max_bt_min_qt_inter_slice*** | ***ue(v)*** |
| ***sps_log2_diff_max_tt_min_qt_inter_slice*** | ***ue(v)*** |
| } | |
| ***sps_weighted_pred_flag*** | ***u(1)*** |
| ***sps_weighted_bipred_flag*** | ***u(1)*** |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |

TABLE 17-continued

Proposed sequence parameter set RBSP syntax

| seq_parameter_set_rbsp( ) { | Descriptor |
|---|---|
| if( sps_dmvr_enabled_flag) | |
| sps_dmvr_pic_present_flag | u(1) |
| sps_mmvd_enabled_flag | u(1) |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag ) {*** | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag)*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 ) {*** | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| *##sps_mts_enabled_flag##* | *##u(1) ##* |
| *##if( sps_mts_enabled_flag ) {##* | |
| *##sps_explicit_mts_intra enabled_flag##* | *##u(1) ##* |
| *##sps_explicit_mts_inter_enabled_flag##* | *##u(1) ##* |
| *##}##* | |
| *##six_minus_max_num_merge_cand##* | *##ue(v) ##* |
| *##sps_sbt_enabled_flag##* | *##u(1) ##* |
| *##sps_affine_enabled_flag##* | *##u(1) ##* |
| *##if( sps_affine_enabled_flag ) {##* | |
| *##five_minus_max_num_subblock_merge_cand##* | *##ue(v) ##* |
| *##sps_affine_type_flag##* | *##u(1) ##* |
| *##if( sps_amvr_enabled_flag ) ##* | |
| *##sps_affine_amvr_enabled_flag##* | *##u(1)##* |
| *##sps_affine_prof_enabled_flag##* | *##u(1)##* |
| *##if( sps_affine_prof_enabled_flag ) ##* | |
| *##sps_prof_pic_present_flag##* | *##u(1)##* |
| *##}##* | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| *##sps_bcw_enabled_flag##* | *##u(1) ##* |
| sps_ibc_enabled_flag | u(1) |
| if( sps_ibc_enabled_flag ) | |
| six_minus_max_num_ibc_merge_cand | ue(v) |
| *##sps_ciip_enabled_flag##* | *##u(1) ##* |
| *##if( sps_mmvd_enabled_flag ) ##* | |
| *##sps_fpel_mmvd_enabled_flag##* | *##u(1) ##* |
| *##if( MaxNumMergeCand >= 2 ) {##* | |
| *##sps_gpm_enabled_flag##* | *##u(1) ##* |
| *##if( sps_gpm_enabled_flag && MaxNumMergeCand >= 3 ) ##* | |
| *##max_num_merge_cand_minus_max_num_gpm_cand##* | *##ue(v) ##* |
| *##}##* | |
| sps_lmcs_enabled_flag | u(1) |
| sps_lfnst_enabled_flag | u(1) |
| sps_ladf_enabled_flag | u(1) |

TABLE 17-continued

| Proposed sequence parameter set RBSP syntax | |
|---|---|
| seq_parameter_set_rbsp( ) { | Descriptor |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus2##* | *##ue(v)##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

In yet another example, the decoding process on VVC Draft is illustrated in Table 18 below: The changes to the VVC Draft are shown using the bold and italicized font while the deleted parts are shown in italicized font and enclosed between double number sign "!!!"

TABLE 18

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |

TABLE 18-continued

Proposed sequence parameter set RBSP syntax

| seq_parameter_set_rbsp( ) { | Descriptor |
|---|---|
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| ##*sps_weighted_pred_flag*## | ##*u(1)*## |
| ##*sps_weighted_bipred_flag*## | ##*u(1)*## |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| ##*long_term_ref_pics_flag*## | ##*u(1)*## |
| ##*inter_layer_ref_pics_present_flag*## | ##*u(1)*## |
| ##*sps_idr_rpl_present_flag*## | ##*u(1)*## |
| ##*rpl1_same_as_rpl0_flag*## | ##*u(1)*## |
| ##*for( i = 0; i < rpl1_same_as_rpl0_flag ? 1 : 2; i+ + ) {*## | |
| ##*num_ref_pic_lists_in_sps[ i ]*## | ##*ue(v)* ## |
| ##*for( j = 0; j < num_ref_pic_lists_in_sps[ i ]; j+ +)*## | |
| ##*ref_pic_list_struct( i, j )* ## | |
| ##}## | |

TABLE 18-continued

| Proposed sequence parameter set RBSP syntax | |
|---|---|
| seq_parameter_set_rbsp( ) { | Descriptor |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***sps_weighted_pred_flag*** | ***u(1)*** |
| ***sps_weighted_bipred_flag*** | ***u(1)*** |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |
| ***for ( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j <num_ref_pic_lists_in_sps***[ ***i*** ]***; j++)*** | |
| ***ref_pic_list_struct( i, j )*** | |
| ***sps_log2_diff_min_qt_min_cb_inter_slice*** | ***ue(v)*** |
| ***sps_max_mtt_hierarchy_depth_inter_slice*** | ***ue(v)*** |
| ***if( sps_max_mtt_hierarchy_depth_inter_slice != )*** { | |
| ***sps_log2_diff_max_bt_min_qt_inter_slice*** | ***ue(v)*** |
| ***sps_log2_diff_max_tt_min_qt_inter_slice*** | ***ue(v)*** |
| } | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |

TABLE 18-continued

Proposed sequence parameter set RBSP syntax

| seq_parameter_set_rbsp( ) { | Descriptor |
|---|---|
| if( sps_dmvr_enabled_flag) | |
| sps_dmvr_pic_present_flag | u(1) |
| sps_mmvd_enabled_flag | u(1) |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag )*** { | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 )*** { | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ##*six_minus_max_num_merge_cand*## | ##*ue(v)*## |
| ##*sps_sbt_enabled_flag*## | ##*u(1)*## |
| ##*sps_affine_enabled_flag*## | ##*u(1)*## |
| ##*if( sps_affine_enabled_flag )* {## | |
| ##*five_minus_max_num_subblock_merge_cand*## | ##*ue(v)*## |
| ##*sps_affine_type_flag*## | ##*u(1)*## |
| ##*if( sps_amvr_enabled_flag)*## | |
| ##*sps_affine_amvr_enabled_flag*## | ##*u(1)*## |
| ##*sps_affine_prof_enabled_flag*## | ##*u(1)*## |
| ##*if( sps_affine_prof_enabled_flag )*## | |
| ##*sps_prof_pic_present_flag*## | ##*u(1)*## |
| ##}## | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| ##*sps_bcw_enabled_flag*## | ##*u(1)*## |
| sps_ibc_enabled_flag | u(1) |
| if( sps_ibc_enabled_flag ) | |
| six_minus_max_num_ibc_merge_cand | ue(v) |
| ##*sps_ciip_enabled_flag*## | ##*u(1)*## |
| ##*if( sps_mmvd_enabled_flag )*## | |
| ##*sps_fpel_mmvd_enabled_flag*## | ##*u(1)*## |
| ##*if( MaxNumMergeCand >= 2 )* {## | |
| ##*sps_gpm_enabled_flag*## | ##*u(1)*## |
| ##*if( sps_gpm_enabled_flag && MaxNumMergeCand >= 3 )*## | |
| ##*max_num_merge_cand_minus_max_num_gpm_cand*## | ##*ue(v)*## |
| ##}## | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |

TABLE 18-continued

Proposed sequence parameter set RBSP syntax

| seq_parameter_set_rbsp( ) { | Descriptor |
|---|---|
| for( i = 0; i < sps_num ladf intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus2##* | *##ue(v) ##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

In yet another example, the decoding process on VVC Draft is illustrated in Table 19 below: The changes to the VVC Draft are shown using the bold and italicized font while the deleted parts are shown in italicized font and enclosed between double number sign "##".

TABLE 19

Proposed sequence parameter set RBSP syntax

| seq_parameter_set_rbsp( ) { | Descriptor |
|---|---|
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| sps_gdr_enabled_flag | u(1) |
| chroma_format_idc | u(2) |
| if(chroma_format_idc = = 3 ) | |
| separate_colour_plane_flag | u(1) |
| ref_pic_resampling_enabled_flag | u(1) |
| if( ref_pic_resampling_enabled_flag ) | |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |

TABLE 19-continued

| Proposed sequence parameter set RBSP syntax | |
|---|---|
| seq_parameter_set_rbsp( ) { | Descriptor |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| sps_subpic_info_present_flag | u(1) |
| if( sps_subpic_info_present_flag ) { | |
| sps_num_subpics_minus1 | ue(v) |
| if( sps_num_subpics_minus1 > 0 ) | |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| sps_entry_point_offsets_present_flag | u(1) |
| *##sps_weighted_pred_flag##* | *##u(1) ##* |
| *##sps_weighted_bipred_flag##* | *##u(1) ##* |
| log2_max_pic_order_cnt_lsb_minus4 | u(4) |
| sps_poc_msb_cycle_flag | u(1) |
| if( sps_poc_msb_cycle_flag ) | |
| poc_msb_cycle_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_ptl_dpb_hrd_params_present_flag ) { | |
| if( sps_max_sublayers_minus1 > 0 ) | |
| sps_sublayer_dpb_params_flag | u(1) |
| dpb_parameters( sps_max_sublayers_minus1, sps_sublayer_dpb_params_flag ) | |
| } | |
| *##long_term_ref_pics_flag##* | *##u(1) ##* |
| *##sps_inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for( i = 0; i < rpl1_same_as_rpl0_flag ? 1 : 2; i+ + ) {##* | |
| *##num_ref_pic_lists_in_sps[ i ] ##* | *##ue(v) ##* |
| *##for( j = 0; j < num_ref_pic_lists_in_sps[ i ]; j+ +)##* | |
| *##ref_pic_list_struct( i, j ) ##* | |
| *##}##* | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |

TABLE 19-continued

| Proposed sequence parameter set RBSP syntax | |
|---|---|
| seq_parameter_set_rbsp( ) { | Descriptor |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| if ( CtbSizeY > 32 ) | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| **sps_weighted_pred_flag** | **u(1)** |
| **sps_weighted_bipred_flag** | **u(1)** |
| **long_term_ref_pics_flag** | **u(1)** |
| **if( sps_video_parameter_set_id > 0 )** | |
| **sps_inter_layer_ref_pics_present_flag** | **u(1)** |
| **sps_idr_rpl_present_flag** | **u(1)** |
| **rpl1_same_as_rpl0_flag** | **u(1)** |
| **for( i = 0; i < rpl1_same_as_rpl0_flag ? 1 : 2; i++ ) {** | |
| **num_ref_pic_lists_in_sps[ i ]** | **ue(v)** |
| **for( j = 0; j <num_ref_pic_lists_in_sps[ i ]; j++)** | |
| **ref_pic_list_struct( i, j )** | |
| } | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_control_present_in_ph_flag | u(1) |
| sps_smvd_enabled_flag | u(1) |
| sps_dmvr_enabled_flag | u(1) |
| if( sps_dmvr_enabled_flag) | |
| sps_dmvr_control_present_in_ph_flag | u(1) |
| sps_mmvd_enabled_flag | u(1) |
| **if( sps_mmvd_enabled_flag )** | |
| **sps_fpel_mmvd_enabled_flag** | **u(1)** |
| **six_minus_max_num_merge_cand** | **ue(v)** |
| **sps_sbt_enabled_flag** | **u(1)** |
| **sps_affine_enabled_flag** | **u(1)** |
| **if( sps_affine_enabled_flag ) {** | |
| **five_minus_max_num_subblock_merge_cand** | **ue(v)** |
| **sps_affine_type_flag** | **u(1)** |

TABLE 19-continued

Proposed sequence parameter set RBSP syntax

| seq_parameter_set_rbsp( ) { | Descriptor |
|---|---|
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_control_present_in_ph_flag*** | ***u(1)*** |
| } | |
| ***sps_bcw_enabled_flag*** | ***u(1)*** |
| ***sps_ciip_enabled_flag*** | ***u(1)*** |
| ***if( MaxNumMergeCand >= 2 )*** { | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| sps_mts_enabled_flag | u(1) |
| if( sps_mts_enabled_flag ) { | |
| sps_explicit_mts_intra_enabled flag | u(1) |
| sps_explicit_mts_inter_enabled_flag | u(1) |
| } | |
| ##*six_minus_max_num_merge_cand*## | ##*ue(v)* ## |
| ##*sps_sbt_enabled_flag*## | ##*u(1)* ## |
| ##*sps_affine_enabled_flag*## | ##*u(1)* ## |
| ##*if( sps_affine_enabled_flag* ) {## | |
| ##*five_minus_max_num_subblock_merge_cand*## | ##*ue(v)* ## |
| ##*sps_affine_type_flag*## | ##*u(1)* ## |
| ##*if( sps_amvr_enabled_flag* ) ## | |
| ##*sps_affine_amvr_enabled_flag*## | ##*u(1)* ## |
| ##*sps_affine_prof_enabled_flag*## | ##*u(1)* ## |
| ##*if( sps_affine_prof_enabled_flag* ) ## | |
| ##*sps_prof_control_present_in_ph_flag*## | ##*u(1)* ## |
| ##}## | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| internal_bit_depth_minus_input_bit_depth | ue(v) |
| ##*sps_bcw_enabled_flag*## | ##*u(1)*## |
| sps_ibc_enabled_flag | u(1) |
| if( sps_ibc_enabled_flag ) | |
| six_minus_max_num_ibc_merge_cand | ue(v) |
| ##*sps_ciip_enabled_flag*## | ##*u(1)*## |
| ##*if( sps_mmvd_enabled_flag* ) ## | |
| ##*sps_fpel_mmvd_enabled_flag*## | ##*u(1)*## |
| ##*if( MaxNumMergeCand >= 2* ) {## | |
| ##*sps_gpm_enabled_flag*## | ##*u(1)*## |
| ##*if( sps_gpm_enabled_flag && MaxNumMergeCand >= 3* ) ## | |
| ##*max_num_merge_cand_minus_max_num_gpm_cand*## | ##*ue(v)*## |
| ##}## | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| ##*log2_parallel_merge_level_minus2*## | ##*ue(v)*## |
| sps_explicit_scaling_list_enabled_flag | u(1) |
| if( sps_lfnst_enabled_flag && sps_explicit_scaling_list_enabled_flag ) | |
| sps_scaling_matrix_for_lfnst_disabled_flag | u(1) |
| if( sps_act_enabled_flag && sps_explicit_scaling_list_enabled_flag ) | |
| sps_scaling_matrix_for_alternative_colour_space_disabled_flag | u(1) |

TABLE 19-continued

| Proposed sequence parameter set RBSP syntax | |
|---|---|
| seq_parameter_set_rbsp( ) { | Descriptor |
| if( sps_scaling_matrix_for_alternative_colour_space_disabled_flag ) | |
| sps_scaling_matrix_designated_colour_space_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Figure 4:
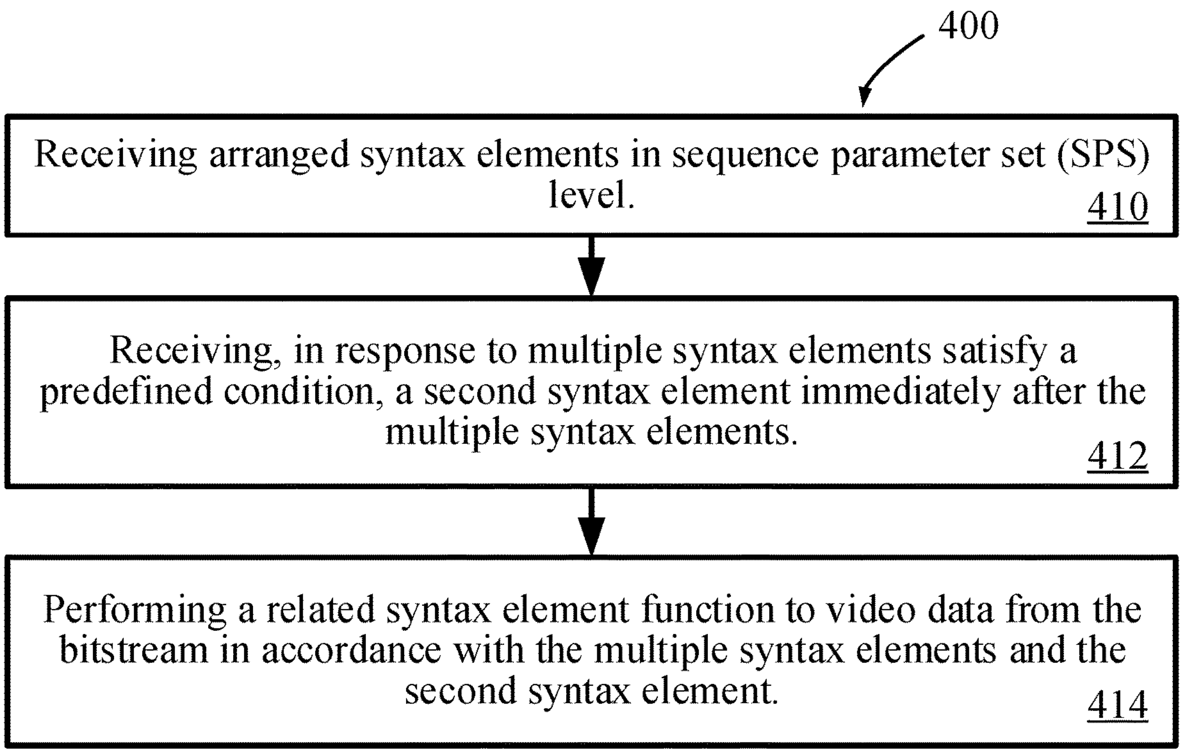
FIG. 4 is a method for decoding a video signal, according to an example of the present disclosure.

FIG. 4 shows a method for decoding a video signal in accordance with the present disclosure. The method may be, for example, applied to a decoder.

In step 410, the decoder may receive, through a bitstream, arranged syntax elements in sequence parameter set (SPS) level. The arranged syntax elements in the SPS level may be arranged so that functions of related syntax elements are grouped in versatile video coding (VVC) syntax at a coding level.

In step 412, the decoder may receive, through the bitstream and in response to multiple syntax elements satisfy a predefined condition, a second syntax element immediately after the multiple syntax elements. The multiple syntax elements, for example, may include a sps_mmvd_enabled_flag flag and a sps_fpel_mmvd_enabled_flag flag. The predefined condition, for example, may include sps_mmvd_enabled_flag flag being equal to 1.

In step 414, the decoder may perform, through the bitstream, a related syntax element function to video data from the bitstream in accordance with the multiple syntax elements and the second syntax element.

According to this disclosure, it is also proposed to add a flag in VVC syntax at certain coding level to indicate whether inter slices such as P-slice and B-slice are allowed or not in a sequence, picture and/or slice. In case inter slices are not allowed, inter slices related syntaxes are not signaled at the corresponding coding level, e.g. sequence, picture and/or slice level. In one example, according to the method of the disclosure, a flag, sps_inter_slice_allowed_flag, is added in SPS to indicate if inter slice is allowed in coding the current video sequence. In case it is not allowed, inter slice related syntax elements are not signaled in SPS. An example of the decoding process on VVC Draft is illustrated in Table 20 below. The added parts are shown using the bold and italicized font while the deleted parts are shown in italicized font and enclosed between double number sign "##".

TABLE 20

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |

TABLE 20-continued

Proposed sequence parameter set RBSP syntax

| seq_parameter_set_rbsp( ) { | Descriptor |
|---|---|
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| *##sps_weighted_pred_flag##* | *##u(1)##* |
| *##sps_weighted_bipred_flag##* | *##u(1)##* |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for(i = 0; i < rpl1_same_as_rpl0_flag ? 1 : 2; i+ + ) {##* | |
| *##num ref_pic_lists_in_sps[ i ] ##* | *##ue(v) ##* |
| *##for(j = 0; j < num_ref_pic_lists_in_sps[ i ]; j+ +)##* | |
| *##ref_pic_list_struct( i, j ) ##* | |
| *##}##* | |
| ***sps_inter_slice_allowed_flag*** | ***u(1)*** |

TABLE 20-continued

Proposed sequence parameter set RBSP syntax

| seq_parameter_set_rbsp( ) { | Descriptor |
|---|---|
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| ***if(sps_inter_slice_allowed_flag )*** { | |
| sps_log2_diff_min_qt_min_cb_inter slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus 1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***if(sps_inter_slice_allowed_flag )*** { | |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |
| ***for( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j < num_ref_pic_lists_in_sps***[ ***i*** ]***; j++)*** | |
| ***ref_pic_list_struct( i, j )*** | |
| } | |
| ***sps_weighted_pred_flag*** | ***u(1)*** |
| ***sps_weighted_bipred_flag*** | ***u(1)*** |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag ) | |
| sps_dmvr_pic_present_flag | u(1) |
| sps_mmvd_enabled_flag | u(1) |
| ***six_minus_max_num_merge_cand*** | ***ue(v)*** |

TABLE 20-continued

Proposed sequence parameter set RBSP syntax

| seq_parameter_set_rbsp( ) { | Descriptor |
|---|---|
| ***sps_sbt_enabled_flag*** | ***u(1)*** |
| ***sps_affine_enabled_flag*** | ***u(1)*** |
| ***if( sps_affine_enabled_flag )*** { | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 )*** { | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| } | |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| sps_mts_enabled_flag | u(1) |
| if( sps_mts_enabled_flag ) { | |
| sps_explicit_mts_intra_enabled flag | u(1) |
| ***if( sps_inter_slice_allowed_flag )*** | |
| sps_explicit_mts_inter_enabled_flag | u(1) |
| } | |
| ##*six_minus_max_num_merge_cand*## | ##*ue(v)*## |
| ##*sps_sbt_enabled_flag*## | ##*u(1)*## |
| ##*sps_affine_enabled_flag*## | ##*u(1)*## |
| ##*if( sps_affine_enabled_flag )* {## | |
| ##*five_minus_max_num_subblock_merge_cand*## | ##*ue(v)*## |
| ##*sps_affine_type_flag*## | ##*u(1)*## |
| ##*if( sps_amvr_enabled_flag )* ## | |
| ##*sps_affine_amvr_enabled_flag*## | ##*u(1)*## |
| ##*sps_affine_prof_enabled_flag*## | ##*u(1)*## |
| ##*if( sps_affine_prof_enabled_flag )* ## | |
| ##*sps_prof_pic_present_flag*## | ##*u(1)*## |
| ##}## | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| ##*sps_bcw_enabled_flag*## | ##*u(1)* ## |
| sps_ibc_enabled_flag | u(1) |
| if( sps_ibc_enabled_flag ) | |
| six_minus_max_num_ibc_merge_cand | ue(v) |
| ##sps_ciip_enabled_flag## | ##*u(1)* ## |
| ##*if( sps_mmvd_enabled_flag )* ## | |
| ##*sps_fpel_mmvd_enabled_flag*## | ##*u(1)* ## |
| ##*if( MaxNumMergeCand >= 2 )* {## | |
| ##*sps_gpm_enabled_flag*## | ##*u(1)* ## |
| ##*if( sps_gpm_enabled_flag && MaxNumMergeCand >= 3 )* ## | |
| ##*max_num_merge_cand_minus_max_num_gpm_cand*## | ##*ue(v)* ## |
| ##}## | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |

TABLE 20-continued

| Proposed sequence parameter set RBSP syntax | |
|---|---|
| seq_parameter_set_rbsp( ) { | Descriptor |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus2##* | *#ue(v) ##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Another example of the decoding process on VVC Draft is illustrated in Table 21 below: The changes to the VVC Draft are shown using the bold and italicized font while the deleted parts are shown in italicized font and enclosed between double number sign "##".

TABLE 21

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |

TABLE 21-continued

Proposed sequence parameter set RBSP syntax

| seq_parameter_set_rbsp( ) { | Descriptor |
|---|---|
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i= 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| *##sps_weighted_pred_flag##* | *##u(1) ##* |
| *##sps_weighted_bipred_flag##* | *##u(1) ##* |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for(i = 0; i < rpl1 same as_rpl0_flag ? 1 : 2; i++ ) {##* | |
| *##num ref_pic_lists_in_sps[ i ] ##* | *##ue(v) ##* |
| *##for(j = 0; j < num_ref_pic_lists_in_sps[ i ]; j++)##* | |
| *##ref_pic_list_struct( i, j) ##* | |
| *##}##* | |
| ***sps_inter_slice_allowed_flag*** | ***u(1)*** |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |

TABLE 21-continued

Proposed sequence parameter set RBSP syntax

| seq_parameter_set_rbsp( ) { | Descriptor |
| --- | --- |
| *##sps_log2_diff_min_qt_min_cb_inter_slice##* | *##ue(v) ##* |
| *##sps_max_mtt_hierarchy_depth_inter_slice##* | *#ue(v) ##* |
| *##if( sps_max_mtt_hierarchy_depth_inter_slice != 0 ) {##* | |
| *##sps_log2_diff_max_bt_min_qt_inter_slice##* | *##ue(v) ##* |
| *##sps_log2_diff_max_tt_min_qt_inter_slice##* | *##ue(v) ##* |
| *##}##* | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***if(sps_inter_slice_allowed_flag )*** { | |
| ***sps_mts_enabled_flag*** | ***u(1)*** |
| ***if( sps_mts_enabled_flag )*** | |
| ***sps_explicit_mts_intra_enabled_flag*** | ***u(1)*** |
| ***sps_inter_slice_allowed_flag*** | ***u(1)*** |
| ***if(sps_inter_slice_allowed_flag )*** { | |
| ***if( sps_mts_enabled_flag )*** | |
| ***sps_explicit_mts_inter_enabled_flag*** | ***u(1)*** |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |
| ***for( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j < num_ref_pic_lists_in_sps***[ ***i*** ]***; j++ )*** | |
| ***ref_pic_list_struct( i, j )*** | |
| } | |
| ***sps_log2_diff_min_qt_min_cb_inter_slice*** | ***ue(v)*** |
| ***sps_max_mtt_hierarchy_depth_inter_slice*** | ***ue(v)*** |
| ***if( sps_max_mtt_hierarchy_depth_inter_slice != 0 )*** { | |
| ***sps_log2_diff_max_bt_min_at_inter_slice*** | ***ue(v)*** |
| ***sps_log2_diff_max_tt_min_qt_inter_slice*** | ***ue(v)*** |
| } | |
| ***sps_weighted_pred_flag*** | ***u(1)*** |
| ***sps_weighted_bipred_flag*** | ***u(1)*** |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag) | |
| sps_dmvr_pic_present_flag | u(1) |
| sps_mmvd_enabled_flag | u(1) |

TABLE 21-continued

| Proposed sequence parameter set RBSP syntax | |
|---|---|
| seq_parameter_set_rbsp( ) { | Descriptor |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag ) {*** | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 ) {*** | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| } | |
| sps_isp_enabled_flag | u(1) |
| sps_mrl_enabled_flag | u(1) |
| sps_mip_enabled_flag | u(1) |
| if( ChromaArrayType != 0 ) | |
| sps_cclm_enabled_flag | u(1) |
| if( chroma_format_idc = = 1 ) { | |
| sps_chroma_horizontal_collocated_flag | u(1) |
| sps_chroma_vertical_collocated_flag | u(1) |
| } | |
| ##*sps_mts_enabled_flag*## | ##*u(1)* ## |
| ##*if( sps_mts_enabled_flag* ) {## | |
| ##*sps_explicit_mts_intra_enabled_flag*## | ##*u(1)* ## |
| ##*sps_explicit_mts_inter_enabled_flag*## | ##*u(1)* ## |
| ##}## | |
| ##*six_minus_max_num_merge_cand*## | ##*ue(v)* ## |
| ##*sps_sbt_enabled_flag*## | ##*u(1)* ## |
| ##*sps_affine_enabled_flag*## | ##*u(1)* ## |
| ##*if( sps_affine_enabled_flag* ) {## | |
| ##*five_minus_max_num subblock_merge_cand*## | ##*ue(v)* ## |
| ##*sps_affine_type_flag*## | ##*u(1)* ## |
| ##*if( sps_amvr_enabled_flag* ) ## | |
| ##*sps_affine_amvr_enabled_flag*## | ##*u(1)* ## |
| ##*sps_affine_prof_enabled_flag*## | ##*u(1)* ## |
| ##*if( sps_affine_prof_enabled_flag* ) ## | |
| ##*sps_prof_pic_present_flag*## | #*u(1)* ## |
| ##}## | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| ##*sps_bcw_enabled_flag*## | ##*u(1)* ## |
| sps_ibc_enabled_flag | u(1) |
| if( sps_ibc_enabled_flag ) | |
| six_minus_max_num_ibc_merge_cand | ue(v) |
| ##*sps_ciip_enabled_flag*## | ##*u(1)* ## |
| ##*if( sps_mmvd_enabled_flag* ) ## | |
| ##*sps_fpel_mmvd_enabled_flag*## | ##*u(1)* ## |
| ##*if( MaxNumMergeCand >= 2* ) {## | |
| ##*sps_gpm_enabled_flag*## | ##*u(1)* ## |
| ##*if( sps_gpm_enabled_flag && MaxNumMergeCand >= 3* ) ## | |
| ##*max_num_merge_cand_minus_max_num_gpm_cand*## | ##*ue(v)* ## |
| ##}## | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals_minus2 | u(2) |
| sps_ladf_lowest_interval_qp_offset | se(v) |

TABLE 21-continued

Proposed sequence parameter set RBSP syntax

| seq_parameter_set_rbsp( ) { | Descriptor |
|---|---|
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus2##* | *##ue(v) ##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus 1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Grouping the Similar Function Syntax Elements

In this disclosure, it is proposed to rearrange the syntax elements so that the similar function, e.g. intra tools, inter tools, screen content tools, transform tools, quantization tools, loop filter tools and/or partition tools, related syntax elements are grouping in VVC syntax at certain coding level, e.g. sequence, picture and/or slice level. According to the disclosure, it is proposed to rearrange the syntax elements in the sequence parameter set (SPS) so that the similar function related syntax elements are grouping. An example of the decoding process on VVC Draft is illustrated in Table 23 below. The changes to the VVC Draft are shown using the bold and italicized font while the deleted parts are shown in italicized font and enclosed between double number sign "##".

TABLE 23

Proposed sequence parameter set RBSP syntax

| seq_parameter_set_rbsp( ) { | Descriptor |
|---|---|
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |
| if( chroma_format_idc = = 3 ) | |
| separate_colour_plane_flag | u(1) |
| res_change_in_clvs_allowed_flag | u(1) |
| pic_width_max_in_luma_samples | ue(v) |

TABLE 23-continued

Proposed sequence parameter set RBSP syntax

| seq_parameter_set_rbsp( ) { | Descriptor |
|---|---|
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max in luma samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i ] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for( i = 0; i <= sps_num_subpics_minus1; i++ ) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| *##sps_weighted_pred_flag##* | *##u(1) ##* |
| *##sps_weighted_bipred_flag##* | *##u(1) ##* |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for(i = 0; i < rpll_same_as_rpl0_flag ? 1 : 2; i+ + ) {##* | |
| *##num ref pic lists_in_sps[ i ] ##* | *##ue(v) ##* |
| *##for(j = 0; j < num_ref pic_lists_in_sps[i ]; j+ +)##* | |
| *#ref_pic_list _struct( i, j ) ##* | |
| *##}##* | |
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |

TABLE 23-continued

| Proposed sequence parameter set RBSP syntax | |
|---|---|
| seq_parameter_set_rbsp( ) { | Descriptor |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for(j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***sps_isp_enabled_flag*** | ***u(1)*** |
| ***sps_mrl_enabled_flag*** | ***u(1)*** |
| ***sps_mip_enabled_flag*** | ***u(1)*** |
| ***if( ChromaArrayType != 0 )*** | |
| ***sps_cclm_enabled_flag*** | ***u(1)*** |
| ***if( chroma_format_idc = = 1 )*** { | |
| ***sps_chroma_horizontal_collocated_flag*** | ***u(1)*** |
| ***sps_chroma_vertical_collocated_flag*** | ***u(1)*** |
| } | |
| ***sps_weighted_pred_flag*** | ***u(1)*** |
| ***sps_weighted_bipred_flag*** | ***u(1)*** |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rplo_flag*** | ***u(1)*** |
| ***for( i = 0; i < rpl1_same_as_rpl0_flag ? 1 : 2; i++ )*** { | |
| ***num_ref_pic_lists_in_sps***[ ***i*** ] | ***ue(v)*** |
| ***for( j = 0; j <num_ref_pic_lists_in_sps***[ ***i*** ]***; j++)*** | |
| ***ref_pic_list_struct( i, j )*** | |
| } | |
| ***sps_log2_diff_min_qt_min_cb_inter_slice*** | ***ue(v)*** |
| ***sps_max_mtt_hierarchy_depth_inter_slice*** | ***ue(v)*** |
| ***if( sps_max_mtt_hierarchy_depth_inter_slice != 0 )*** { | |
| ***sps_log2_diff_max_bt_min_qt_inter_slice*** | ***ue(v)*** |
| ***sps_log2_diff_max_tt_min_at_inter_slice*** | ***ue(v)*** |
| } | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |

TABLE 23-continued

Proposed sequence parameter set RBSP syntax

| seq_parameter_set_rbsp( ) { | Descriptor |
|---|---|
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag ) | |
| sps_dmvr_pic_present_flag | u(1) |
| sps_mmvd_enabled_flag | u(1) |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag )*** { | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 )*** { | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| *##sps_isp_enabled_flag##* | *##u(1) ##* |
| *##sps_mrl_enabled_flag##* | *##u(1) ##* |
| *##sps_mip_enabled_flag##* | *##u(1) ##* |
| *##if( ChromaArrayType != 0 ) ##* | |
| *##sps_cclm_enabled_flag##* | *##u(1) ##* |
| *##if( chroma_format_idc = = 1 ) {##* | |
| *##sps_chroma_horizontal_collocated_flag##* | *##u(1) ##* |
| *##sps_chroma_vertical_collocated_flag##* | *##u(1) ##* |
| *##}##* | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| *##six_minus_max_num_merge_cand##* | *##ue(v) ##* |
| *##sps_sbt_enabled_flag##* | *##u(1) ##* |
| *##sps_affine_enabled_flag##* | *##u(1) ##* |
| *##if( sps_affine_enabled_flag ) {##* | |
| *##five_minus_max_num_subblock_merge_cand##* | *##ue(v) ##* |
| *##sps_affine_type_flag##* | *##u(1) ##* |
| *##if( sps_amvr_enabled_flag ) ##* | |
| *##sps_affine_amvr_enabled_flag##* | *##u(1) ##* |
| *##sps_affine_prof_enabled_flag##* | *##u(1) ##* |
| *##if( sps_affine_prof_enabled_flag ) ##* | |
| *##sps_prof_pic_present_flag##* | *##u(1) ##* |
| *##}##* | |
| sps_palette_enabled_flag | u(1) |
| if( ChromaArrayType = = 3 && !sps_max_luma_transform_size_64_flag ) | |
| sps_act_enabled_flag | u(1) |
| if( sps_transform_skip_enabled_flag \| \| sps_palette_enabled_flag ) | |
| min_qp_prime_ts_minus4 | ue(v) |
| ##sps_bcw_enabled_flag## | ##u(1) ## |
| sps_ibc_enabled_flag | u(1) |
| if( sps_ibc_enabled_flag ) | |
| six_minus_max_num_ibc_merge_cand | ue(v) |
| *##sps_ciip_enabled_flag##* | *##u(1) ##* |
| *##if( sps_mmvd_enabled_flag ) ##* | |
| *##sps_fpel_mmvd_enabled_flag##* | *##u(1) ##* |
| *##if( MaxNumMergeCand >= 2 ) {##* | |
| *##sps_gpm_enabled_flag##* | *##u(1) ##* |
| *##if( sps_gpm_enabled_flag && MaxNumMergeCand >= 3 ) ##* | |
| *##max_num_merge_cand_minus_max_num_gpm_cand##* | *##ue(v) ##* |
| *##}##* | |
| sps_lmcs_enabled_flag | u(1) |
| sps_lfnst_enabled_flag | u(1) |
| sps_ladf_enabled_flag | u(1) |

TABLE 23-continued

| Proposed sequence parameter set RBSP syntax | |
|---|---|
| seq_parameter_set_rbsp( ) { | Descriptor |
| if( sps_ladf_enabled_flag ) { | |
| sps_num_ladf_intervals_minus2 | u(2) |
| sps_ladf_lowest_interval_qp_offset | se(v) |
| for( i = 0; i < sps_num_ladf_intervals_minus2 + 1; i++ ) { | |
| sps_ladf_qp_offset[ i ] | se(v) |
| sps_ladf_delta_threshold_minus1[ i ] | ue(v) |
| } | |
| } | |
| *##log2_parallel_merge_level_minus 2##* | *##ue(v) ##* |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus 1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Another example of the decoding process on VVC Draft is illustrated in Table 24 below: The changes to the VVC Draft are shown using the bold and italicized font while the deleted parts are shown in italicized font and enclosed between double number sign "##".

TABLE 24

| Proposed sequence parameter set RBSP syntax | |
|---|---|
| seq_parameter_set_rbsp( ) { | Descriptor |
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
| profile_tier_level( 1, sps_max_sublayers_minus1 ) | |
| gdr_enabled_flag | u(1) |
| chroma_format_idc | u(2) |

TABLE 24-continued

Proposed sequence parameter set RBSP syntax

| seq_parameter_set_rbsp( ) { | Descriptor |
|---|---|
| if( chroma_format_idc = = 3 ) | |
| separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
| sps_conf_win_left_offset | ue(v) |
| sps_conf_win_right_offset | ue(v) |
| sps_conf_win_top_offset | ue(v) |
| sps_conf_win_bottom_offset | ue(v) |
| } | |
| sps_log2_ctu_size_minus5 | u(2) |
| subpic_info_present_flag | u(1) |
| if( subpic_info_present_flag ) { | |
| sps_num_subpics_minus1 | ue(v) |
| sps_independent_subpics_flag | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| subpic_ctu_top_left_x[ i ] | u(v) |
| if( i > 0 && pic_height_max_in_luma_samples > CtbSizeY ) { | |
| subpic_ctu_top_left_y[ i ] | u(v) |
| if( i < sps_num_subpics_minus1 && pic_width_max_in_luma_samples > CtbSizeY ) | |
| subpic_width_minus1[ i] | u(v) |
| if( i < sps_num_subpics_minus1 && pic_height_max_in_luma_samples > CtbSizeY ) | |
| subpic_height_minus1[ i ] | u(v) |
| if( !sps_independent_subpics_flag) { | |
| subpic_treated_as_pic_flag[ i ] | u(1) |
| loop_filter_across_subpic_enabled_flag[ i ] | u(1) |
| } | |
| } | |
| sps_subpic_id_len_minus1 | ue(v) |
| subpic_id_mapping_explicitly_signalled_flag | u(1) |
| if( subpic_id_mapping_explicitly_signalled_flag ) { | |
| subpic_id_mapping_in_sps_flag | u(1) |
| if( subpic_id_mapping_in_sps_flag ) | |
| for(i = 0; i <= sps_num_subpics_minus1; i++) | |
| sps_subpic_id[ i ] | u(v) |
| } | |
| } | |
| bit_depth_minus8 | ue(v) |
| sps_entropy_coding_sync_enabled_flag | u(1) |
| if( sps_entropy_coding_sync_enabled_flag ) | |
| sps_wpp_entry_point_offsets_present_flag | u(1) |
| *##sps_weighted_pred_flag##* | *##u(1) ##* |
| *##sps_weighted_bipred_flag##* | *##u(1) ##* |
| log2_max_pic_order_cnt_lsb_minus4 | u(4) |
| sps_poc_msb_flag | u(1) |
| if( sps_poc_msb_flag ) | |
| poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
| sps_sublayer_dpb_params_flag | u(1) |
| if( sps_ptl_dpb_hrd_params_present_flag ) | |
| dpb_parameters( sps_max_sublayers_minus1, sps_sublayer_dpb_params_flag ) | |
| *##long_term_ref_pics_flag##* | *##u(1) ##* |
| *##inter_layer_ref_pics_present_flag##* | *##u(1) ##* |
| *##sps_idr_rpl_present_flag##* | *##u(1) ##* |
| *##rpl1_same_as_rpl0_flag##* | *##u(1) ##* |
| *##for ( i = 0; i < rpl1_same_as_rpl0_flag ? 1 : 2; i+ + ) {##* | |
| *##num ref pic lists_in_sps[ i ] ##* | *##ue(v) ##* |
| *##for( j = 0; j < num_ref_pic_lists_in_sps[ i ]; j+ +)##* | |
| *##ref_pic_list_struct( i, j ) ##* | |
| *##}##* | |

TABLE 24-continued

Proposed sequence parameter set RBSP syntax

| seq_parameter_set_rbsp( ) { | Descriptor |
|---|---|
| if( ChromaArrayType != 0 ) | |
| qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| sps_max_luma_transform_size_64_flag | u(1) |
| if( ChromaArrayType != 0 ) { | |
| sps_joint_cbcr_enabled_flag | u(1) |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| sps_sao_enabled_flag | u(1) |
| sps_alf_enabled_flag | u(1) |
| if( sps_alf_enabled_flag && ChromaArrayType != 0 ) | |
| sps_ccalf_enabled_flag | u(1) |
| sps_transform_skip_enabled_flag | u(1) |
| if( sps_transform_skip_enabled_flag ) { | |
| log2_transform_skip_max_size_minus2 | ue(v) |
| sps_bdpcm_enabled_flag | u(1) |
| } | |
| ***sps_isp_enabled_flag*** | ***u(1)*** |
| ***sps_mrl_enabled_flag*** | ***u(1)*** |
| ***sps_mip_enabled_flag*** | ***u(1)*** |
| ***if( ChromaArrayType != 0 )*** | |
| ***sps_cclm_enabled_flag*** | ***u(1)*** |
| ***if( chroma_format_idc = = 1 )*** { | |
| ***sps_chroma_horizontal_collocated_flag*** | ***u(1)*** |
| ***sps_chroma_vertical_collocated_flag*** | ***u(1)*** |
| } | |
| ***sps_palette_enabled_flag*** | ***u(1)*** |
| ***if( ChromaArrayType = = 3 && !sps_max_luma_transform_size_64_flag )*** | |
| ***sps_act_enabled_flag*** | ***u(1)*** |
| ***if( sps_transform_skip_enabled_flag \|\| sps_palette_enabled_flag )*** | |
| ***min_qp_prime_ts_minus4*** | ***ue(v)*** |
| ***sps_ibc_enabled_flag*** | ***u(1)*** |
| ***if( sps_ibc_enabled_flag )*** | |
| ***six_minus_max_num_ibc_merge_cand*** | ***ue(v)*** |
| ***sps_weighted_pred_flag*** | ***u(1)*** |
| ***sps_weighted_bipred_flag*** | ***u(1)*** |
| ***long_term_ref_pics_flag*** | ***u(1)*** |
| ***inter_layer_ref_pics_present_flag*** | ***u(1)*** |
| ***sps_idr_rpl_present_flag*** | ***u(1)*** |
| ***rpl1_same_as_rpl0_flag*** | ***u(1)*** |

TABLE 24-continued

| Proposed sequence parameter set RBSP syntax | |
|---|---|
| seq_parameter_set_rbsp( ) { | Descriptor |
| ***for( i = 0; i <rpl1_same_as_rpl0_flag ? 1 : 2; i++ )*** { | |
| ***num_ref_pic_lists_in_sps***[ ***i*** ] | ***ue(v)*** |
| ***for( j = 0; j <num_ref_pic_lists_in_sps***[ ***i*** ]***; j++)*** | |
| ***ref_pic_list_struct( i, j )*** | |
| } | |
| ***sps_log2_diff_min_qt_min_cb_inter_slice*** | ***ue(v)*** |
| ***sps_max_mtt_hierarchy_depth_inter_slice*** | ***ue(v)*** |
| ***if( sps_max_mtt_hierarchy_depth_inter_slice != 0 )*** { | |
| ***sps_log2_diff_max_bt_min_at_inter_slice*** | ***ue(v)*** |
| ***sps_log2_diff_max_tt_min_at_inter_slice*** | ***ue(v)*** |
| } | |
| sps_ref_wraparound_enabled_flag | u(1) |
| sps_temporal_mvp_enabled_flag | u(1) |
| if( sps_temporal_mvp_enabled_flag ) | |
| sps_sbtmvp_enabled_flag | u(1) |
| sps_amvr_enabled_flag | u(1) |
| sps_bdof_enabled_flag | u(1) |
| if( sps_bdof_enabled_flag ) | |
| sps_bdof_pic_present_flag | u(1) |
| sps_smvd_enabled_flag | u(1) |
| sps_dmvr_enabled_flag | u(1) |
| if( sps_dmvr_enabled_flag) | |
| sps_dmvr_pic_present_flag | u(1) |
| sps_mmvd_enabled_flag | u(1) |
| ***six_minus_max_num_merge_cand*** | ***ue(v)*** |
| ***sps_sbt_enabled_flag*** | ***u(1)*** |
| ***sps_affine_enabled_flag*** | ***u(1)*** |
| ***if( sps_affine_enabled_flag )*** { | |
| ***five_minus_max_num_subblock_merge_cand*** | ***ue(v)*** |
| ***sps_affine_type_flag*** | ***u(1)*** |
| ***if( sps_amvr_enabled_flag )*** | |
| ***sps_affine_amvr_enabled_flag*** | ***u(1)*** |
| ***sps_affine_prof_enabled_flag*** | ***u(1)*** |
| ***if( sps_affine_prof_enabled_flag )*** | |
| ***sps_prof_pic_present_flag*** | ***u(1)*** |
| } | |
| ***sps_bcw_enabled_flag*** | ***u(1)*** |
| ***sps_ciip_enabled_flag*** | ***u(1)*** |
| ***if( sps_mmvd_enabled_flag )*** | |
| ***sps_fpel_mmvd_enabled_flag*** | ***u(1)*** |
| ***if( MaxNumMergeCand >= 2 )*** { | |
| ***sps_gpm_enabled_flag*** | ***u(1)*** |
| ***if( sps_gpm_enabled_flag && MaxNumMergeCand >= 3 )*** | |
| ***max_num_merge_cand_minus_max_num_gpm_cand*** | ***ue(v)*** |
| } | |
| ***log2_parallel_merge_level_minus2*** | ***ue(v)*** |
| *##sps_isp_enabled_flag##* | *##u(1) ##* |
| *##sps_mrl_enabled_flag##* | *##u(1) ##* |
| *##sps_mip_enabled_flag##* | *##u(1) ##* |
| *##if( ChromaArrayType != 0 ) ##* | |
| *##sps_cclm_enabled_flag##* | *##u(1) ##* |
| *##if( chroma_format_idc = = 1 ) {##* | |
| *##sps_chroma_horizontal collocated_flag##* | *##u(1) ##* |
| *##sps_chroma_vertical_collocated_flag##* | *##u(1) ##* |
| *##}##* | |
| *sps_mts_enabled_flag* | *u(1)* |
| *if( sps_mts_enabled_flag ) {* | |
| *sps_explicit_mts_intra_enabled_flag* | *u(1)* |
| *sps_explicit_mts_inter_enabled_flag* | *u(1)* |
| } | |

TABLE 24-continued

| Proposed sequence parameter set RBSP syntax | |
|---|---|
| seq_parameter_set_rbsp( ) { | Descriptor |
| ##six_minus_max_num_merge_cand## | ##ue(v) ## |
| ##sps_sbt_enabled_flag## | ##u(1) ## |
| ##sps_affine_enabled_flag## | ##u(1) ## |
| ##if( sps_affine_enabled_flag ) {## | |
| ##five_minus_max_num_subblock_merge_cand## | ##ue(v) ## |
| ##sps_affine_type_flag## | ##u(1) ## |
| ##if( sps_amvr_enabled_flag ) ## | |
| ##sps_affine_amvr_enabled_flag## | ##u(1) ## |
| ##sps_affine_prof_enabled_flag## | ##u(1) ## |
| ##if( sps_affine_prof_enabled_flag ) ## | |
| ##sps_prof_pic_present_flag## | ##u(1) ## |
| ##}## | |
| ##sps_palette_enabled_flag## | ##u(1) ## |
| ##if( ChromaArrayType = = 3 && | |
| !sps_max_luma_transform_size_64_flag ) ## | |
| ##sps_act_enabled_flag## | ##u(1) ## |
| ##if( sps_transform_skip_enabled_flag \| \| sps_palette_enabled_flag ) ## | |
| ##min_qp_prime_ts_minus4## | ##ue(v) ## |
| ##sps_bcw_enabled_flag## | ##u(1) ## |
| ##sps_ibc_enabled_flag## | ##u(1) ## |
| ##if( sps_ibc_enabled_flag ) ## | |
| ##six_minus_max_num_ibc_merge_cand## | ##ue(v) ## |
| ##sps_ciip_enabled_flag## | ##u(1) ## |
| ##if( sps_mmvd_enabled_flag ) ## | |
| ##sps_fpel_mmvd_enabled_flag## | ##u(1) ## |
| ##if( MaxNumMergeCand >= 2 ) {## | |
| ##sps_gpm_enabled_flag## | ##u(1) ## |
| ##if( sps_gpm_enabled_flag && MaxNumMergeCand >= 3 ) ## | |
| ##max_num_merge_cand_minus_max_num_gpm_cand## | ##ue(v) ## |
| ##}## | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
| sps_num_ladf_intervals minus2 | u(2) |
| sps_ladf_lowest_interval_qp_offset | se(v) |
| for( i = 0; i < sps_num_ladf intervals_minus2 + 1; i++ ) { | |
| sps_ladf_qp_offset[ i ] | se(v) |
| sps_ladf_delta_threshold_minus1[ i ] | ue(v) |
| } | |
| } | |
| ##log2_parallel_merge_level_minus2## | #ue(v) ## |
| sps_explicit_scaling_list_enabled_flag | u(1) |
| sps_dep_quant_enabled_flag | u(1) |
| if( !sps_dep_quant_enabled_flag ) | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| if( sps_ptl_dpb_hrd_params_present_flag ) { | |
| sps_general_hrd_params_present_flag | u(1) |
| if( sps_general_hrd_params_present_flag ) { | |
| general_hrd_parameters( ) | |
| if( sps_max_sublayers_minus1 > 0 ) | |
| sps_sublayer_cpb_params_present_flag | u(1) |
| firstSubLayer = sps_sublayer_cpb_params_present_flag ? 0 : sps_max_sublayers_minus1 | |
| ols_hrd_parameters( firstSubLayer, sps_max_sublayers_minus1 ) | |
| } | |
| } | |
| field_seq_flag | u(1) |
| vui_parameters_present_flag | u(1) |
| if( vui_parameters_present_flag ) | |
| vui_parameters( ) /* Specified in ITU-T H.SEI \| ISO/IEC 23002-7 */ | |
| sps_extension_flag | u(1) |

TABLE 24-continued

Proposed sequence parameter set RBSP syntax

| seq_parameter_set_rbsp( ) { | Descriptor |
|---|---|
| if( sps_extension_flag ) | |
| while( more_rbsp_data( ) ) | |
| sps_extension_data_flag | u(1) |
| rbsp_trailing_bits( ) | |
| } | |

According to the disclosure, it is proposed to rearrange the syntax elements in the picture parameter set (PPS) so that the similar function related syntax elements are grouped. An example of the decoding process on VVC Draft is illustrated in Table 25 below. The changes to the VVC Draft are shown using the bold and italicized font while the deleted parts are shown in italicized font and enclosed between double number sign "##".

TABLE 25

Proposed sequence parameter set RBSP syntax

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| if( pps_conformance_window_flag ) { | |
| pps_conf_win_left_offset | ue(v) |
| pps_conf_win_right_offset | ue(v) |
| pps_conf_win_top_offset | ue(v) |
| pps_conf_win_bottom_offset | ue(v) |
| } | |
| scaling_window_explicit_signalling_flag | u(1) |
| if( scaling_window_explicit_signalling_flag ) { | |
| scaling_win_left_offset | ue(v) |
| scaling_win_right_offset | ue(v) |
| scaling_win_top_offset | ue(v) |
| scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
| pps_num_subpics_minus1 | ue(v) |
| pps_subpic_id_len_minus1 | ue(v) |
| for( i = 0; i <= pps_num_subpic_minus1; i++ ) | |
| pps_subpic_id[ i ] | u(v) |
| } | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| if( NumTilesInPic > 1 ) | |
| rect_slice_flag | u(1) |
| if( rect_slice_flag ) | |
| single_slice_per_subpic_flag | u(1) |
| if( rect_slice_flag && !single_slice_per_subpic_flag ) { | |
| num_slices_in_pic_minus1 | ue(v) |
| if( num_slices_in_pic_minus1 > 0 ) | |
| tile_idx_delta present_flag | u(1) |
| for( i = 0; i < num_slices_in_pic_minus1; i++ ) { | |
| if( NumTileColumns > 1 ) | |
| slice_width_in_tiles_minus1[ i ] | ue(v) |
| if( NumTileRows > 1 && ( tile_idx_delta present_flag \| \| SliceTopLeftTileIdx[ i ] % NumTileColumns = = 0 ) ) | |
| slice_height_in_tiles_minus1[ i ] | ue(v) |
| if( slice_width_in_tiles_minus1[ i ] = = 0 && slice_height_in_tiles_minus1[ i ] = = 0 && RowHeight[ SliceTopLeftTileIdx[ i ] / NumTileColumns ] > 1 ) | |
| { | |
| num_exp_slices_in_tile[ i ] | ue(v) |
| for( j = 0; j < num_exp_slices_in_tile[ i ]; j++ ) | |

TABLE 25-continued

Proposed sequence parameter set RBSP syntax

| pic_parameter_set_rbsp( ) { | Descriptor |
|---|---|
| exp_slice_height_in_ctus_minus1[ i ][ j ] | ue(v) |
| i += NumSlicesInTile[ i ] − 1 | |
| } | |
| if( tile_idx_delta_present_flag && i < num_slices_in_pic_minus1 ) | |
| tile_idx_delta[ i ] | se(v) |
| } | |
| } | |
| loop_filter_across_tiles_enabled_flag | u(1) |
| loop_filter_across_slices_enabled_flag | u(1) |
| } | |
| cabac_init_present_flag | u(1) |
| *##for( i = 0; i < 2; i+ + ) ##* | |
| *##num_ref_idx_default_active_minus1[ i ] ##* | *##ue(v) ##* |
| *##rpl1_idx_present_flag##* | *##u(1) ##* |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
| pps_joint_cbcr_qp_offset_value | se(v) |
| pps_slice_chroma_qp_offsets_present_flag | u(1) |
| pps_cu_chroma_qp_offset_list_enabled_flag | u(1) |
| } | |
| if( pps_cu_chroma_qp_offset_list_enabled_flag ) { | |
| chroma_qp_offset_list len_minus1 | ue(v) |
| for( i = 0; i <= chroma_qp_offset_list_len_minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| ***for( i = 0; i < 2; i++ )*** | |
| ***num_ref_idx_default_active_minus1[ i ]*** | ***ue(v)*** |
| ***rpl1_idx_present_flag*** | ***u(1)*** |
| ***pps_weighted_pred_flag*** | ***u(1)*** |
| ***pps_weighted_bipred_flag*** | ***u(1)*** |
| ***rpl_info_in_ph_flag*** | ***u(1)*** |
| ***if( ( pps_weighted_pred_flag \| \| pps_weighted_bipred_flag ) && rpl_info_in_ph_flag )*** | |
| ***wp_info_in_ph_flag*** | ***u(1)*** |
| ***pps_ref_wraparound_enabled_flag*** | ***u(1)*** |
| ***if( pps_ref_wraparound_enabled_flag )*** | |
| ***pps_ref_wraparound_offset*** | ***ue(v)*** |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| *##rpl_info_in_ph_flag##* | *##u(1) ##* |
| if( deblocking_filter_override_enabled_flag ) | |
| dbf_info_in_ph_flag | u(1) |
| sao_info_in_ph_flag | u(1) |
| alf_info_in_ph_flag | u(1) |
| *##if( ( pps_weighted_pred_flag \| \| pps_weighted_bipred_flag ) & & rpl_info_in_ph_flag ) ##* | |
| *##wp_info_in_ph_flag##* | *##u(1) ##* |
| qp_delta_info_in_ph_flag | u(1) |
| *##pps_ref_wraparound_enabled_flag##* | *##u(1) ##* |
| *##if( pps_ref_wraparound_enabled_flag ) ##* | |
| *##pps_ref_wraparound_offset##* | *##ue(v) ##* |
| picture_header_extension_present_flag | u(1) |
| slice_header_extension_present_flag | u(1) |
| pps_extension_flag | u(1) |

TABLE 25-continued

Proposed sequence parameter set RBSP syntax

| pic_parameter_set_rbsp( ) { | Descriptor |
|---|---|
| if( pps_extension_flag ) | |
| while( more_rbsp_data( ) ) | |
| pps_extension_data_flag | u(1) |
| rbsp_trailing_bits( ) | |
| } | |

Another example of the decoding process on VVC Draft is illustrated in Table 26 below: The changes to the VVC Draft are shown using the bold and italicized font while the deleted parts are shown in italicized font and enclosed between double number sign "##".

TABLE 26

Proposed sequence parameter set RBSP syntax

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| if( pps_conformance_window_flag ) { | |
| pps_conf_win_left_offset | ue(v) |
| pps_conf_win_right_offset | ue(v) |
| pps_conf_win_top_offset | ue(v) |
| pps_conf_win_bottom_offset | ue(v) |
| } | |
| scaling_window_explicit_signalling_flag | u(1) |
| if( scaling_window_explicit_signalling_flag ) { | |
| scaling_win_left_offset | ue(v) |
| scaling_win_right_offset | ue(v) |
| scaling_win_top_offset | ue(v) |
| scaling_win_bottom_offset | ue(v) |
| } | |
| output_flag_present_flag | u(1) |
| subpic_id_mapping_in_pps_flag | u(1) |
| if( subpic_id_mapping_in_pps_flag ) { | |
| pps_num_subpics_minus1 | ue(v) |
| pps_subpic_id_len_minus1 | ue(v) |
| for( i = 0; i <= pps_num_subpic_minus1; i++ ) | |
| pps_subpic_id[ i ] | u(v) |
| } | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| if( NumTilesInPic > 1 ) | |
| rect_slice_flag | u(1) |
| if( rect_slice_flag ) | |
| single_slice_per_subpic_flag | u(1) |
| if( rect_slice_flag && !single_slice_per_subpic_flag ) { | |
| num_slices_in_pic_minus1 | ue(v) |
| if( num_slices_in_pic_minus1 > 0 ) | |
| tile_idx_delta_present_flag | u(1) |
| for( i = 0; i < num_slices_in_pic_minus1; i++ ) { | |
| if( NumTileColumns > 1 ) | |
| slice_width_in_tiles_minus1[ i ] | ue(v) |
| if( NumTileRows > 1 && ( tile_idx_delta present_flag \| \| SliceTopLeftTileIdx[ i ] % NumTileColumns = = 0 ) ) | |
| slice_height_in_tiles_minus1[ i ] | ue(v) |

TABLE 26-continued

| Proposed sequence parameter set RBSP syntax | |
|---|---|
| pic_parameter_set_rbsp( ) { | Descriptor |
| if( slice_width_in_tiles_minus1[ i ] = = 0 && | |
| slice_height_in_tiles_minus1[ i ] = = 0 && | |
| RowHeight[ SliceTopLeftTileIdx[ i ] / NumTileColumns ] > 1 ) { | |
| num_exp_slices_in_tile[ i ] | ue(v) |
| for( j = 0; j < num_exp_slices_in_tile[ i ]; j++ ) | |
| exp_slice_height_in_ctus_minus1[ i ][ j ] | ue(v) |
| i += NumSlicesInTile[ i ] − 1 | |
| } | |
| if( tile_idx_delta_present_flag && i < num_slices_in_pic_minus1 ) | |
| tile_idx_delta[ i ] | se(v) |
| } | |
| } | |
| loop_filter_across_tiles_enabled_flag | u(1) |
| loop_filter_across_slices_enabled_flag | u(1) |
| } | |
| cabac_init_present_flag | u(1) |
| for( i = 0; i < 2; i++ ) | |
| num_ref idx_default_active_minus1[ i ] | ue(v) |
| rpl1_idx_present_flag | u(1) |
| ***pps_weighted_pred_flag*** | ***u(1)*** |
| ***pps_weighted_bipred_flag*** | ***u(1)*** |
| ***rpl_info_in_ph_flag*** | ***u(1)*** |
| ***if( ( pps_weighted_pred_flag \| \| pps_weighted_bipred_flag ) && rpl_info_in_ph_flag )*** | |
| ***wp_info_in_ph_flag*** | ***u(1)*** |
| ***pps_ref_wraparound_enabled_flag*** | ***u(1)*** |
| ***if( pps_ref_wraparound_enabled_flag )*** | |
| ***pps_ref_wraparound_offset*** | ***ue(v)*** |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
| pps_joint_cbcr_qp_offset_value | se(v) |
| pps_slice_chroma_qp_offsets_present_flag | u(1) |
| pps_cu_chroma_qp_offset_list_enabled_flag | u(1) |
| } | |
| if( pps_cu_chroma_qp_offset_list_enabled_flag ) { | |
| chroma_qp_offset_list_len_minus1 | ue(v) |
| for( i = 0; i <= chroma_qp_offset_list_len_minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| ##*pps_weighted_pred_flag*## | ##*u(1)* ## |
| ##*pps_weighted_bipred_flag*## | ##*u(1)* ## |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| ##*rpl_info_in_ph_flag*## | ##*u(1)* ## |
| if( deblocking_filter_override_enabled_flag ) | |
| dbf_info_in_ph_flag | u(1) |
| sao_info_in_ph_flag | u(1) |
| alf_info_in_ph_flag | u(1) |
| ##*if*( ( *pps_weighted_pred_flag* \| \| *pps_weighted_bipre_flag* ) *& & rpl_info_in_ph_flag* ) ## | |
| ##*wp_info_in_ph_flag*## | ##*u(1)* ## |
| *qp_delta_info_in_ph_flag* | *u(1)* |

TABLE 26-continued

| Proposed sequence parameter set RBSP syntax | |
|---|---|
| pic_parameter_set_rbsp( ) { | Descriptor |
| *##pps_ref_wraparound_enabled_flag##* | *##u(1) ##* |
| *##if( pps_ref_wraparound_enabled_flag ) ##* | |
| *##pps_ref_wraparound_offset##* | *##ue(v) ##* |
| picture_header_extension_present_flag | u(1) |
| slice_header_extension_present_flag | u(1) |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

In yet another example, the decoding process on VVC Draft is illustrated in Table 27 below: The changes to the VVC Draft are shown using the bold and italicized font while the deleted parts are shown in italicized font and enclosed between double number sign "##".

TABLE 27

| Proposed sequence parameter set RBSP syntax | |
|---|---|
| pic_parameter_set_rbsp( ) { | Descriptor |
| pps_pic_parameter_set_id | u(6) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| if( pps_conformance_window_flag ) { | |
| pps_conf_win_left_offset | ue(v) |
| pps_conf_win_right_offset | ue(v) |
| pps_conf_win_top_offset | ue(v) |
| pps_conf_win_bottom_offset | ue(v) |
| } | |
| scaling_window_explicit_signalling_flag | u(1) |
| if( scaling_window_explicit_signalling_flag ) { | |
| scaling_win_left_offset | se(v) |
| scaling_win_right_offset | se(v) |
| scaling_win_top_offset | se(v) |
| scaling_win_bottom_offset | se(v) |
| } | |
| output_flag_present_flag | u(1) |
| if (!mixed_nalu_types_in_pic_flag) | |
| pps_no_pic_partition_flag | u(1) |
| subpic_id_mapping_in_pps_flag | u(1) |
| if( subpic_id_mapping_in_pps_flag ) { | |
| if( !pps_no_pic_partition_flag ) | |
| pps_num_subpics_minus1 | ue(v) |
| pps_subpic_id_len_minus1 | ue(v) |
| for( i = 0; i <= pps_num_subpic_minus1; i++ ) | |
| pps_subpic_id[ i ] | u(v) |
| } | |
| if( !pps_no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| if( NumTilesInPic > 1 && !mixed_nalu_types_in_pic_flag ) { | |
| pps_loop_filter_across_tiles_enabled_flag | u(1) |
| pps_rect_slice_flag | u(1) |
| } | |
| if( pps_rect_slice_flag ) | |
| single_slice_per_subpic_flag | u(1) |
| if( pps_rect_slice_flag && !single_slice_per_subpic_flag ) { | |
| num_slices_in_pic_minus1 | ue(v) |
| if( num_slices_in_pic_minus ] > 1 ) | |
| tile_idx_delta_present_flag | u(1) |

TABLE 27-continued

| Proposed sequence parameter set RBSP syntax | |
|---|---|
| pic_parameter_set_rbsp( ) { | Descriptor |
| for( i = 0; i < num_slices_in_pic_minus1; i++ ) { | |
| if( SliceTopLeftTileIdx[ i ] % NumTileColumns != NumTileColumns − 1 ) | |
| slice_width_in_tiles_minus1[ i ] | ue(v) |
| if( SliceTopLeftTileIdx[ i ] / NumTileColumns != NumTileRows − 1 && | |
| ( tile_idx_delta present_flag \| \| | |
| SliceTopLeftTileIdx[ i ] % NumTileColumns = = 0 ) ) | |
| slice_height_in_tiles_minus1[ i ] | ue(v) |
| if( slice_width_in_tiles_minus1[ i ] = = 0 && | |
| slice_height_in_tiles_minus1[ i ] = = 0 && | |
| RowHeight[ SliceTopLeftTileIdx[ i ] / NumTileColumns ] > 1 ) { | |
| num_exp_slices_in_tile[ i ] | ue(v) |
| for( j = 0; j < num_exp_slices_in_tile[ i ]; j++ ) | |
| exp_slice_height_in_ctus_minus1[ i ][ j ] | ue(v) |
| i += NumSlicesInTile[ i ] − 1 | |
| } | |
| if( tile_idx_delta present_flag && i < num_slices_in_pic_minus1 ) | |
| tile_idx_delta[ i ] | se(v) |
| } | |
| } | |
| if( !pps_rect_slice_flag \| \| single_slice_per_subpic_flag \| \| | |
| num_slices_in_pic_minus1 > 0 ) | |
| pps_loop_filter_across_slices_enabled_flag | u(1) |
| } | |
| cabac_init_present_flag | u(1) |
| for( i = 0; i < 2; i++ ) | |
| num_ref_idx_default_active_minus1[ i ] | ue(v) |
| rpl1_idx_present_flag | u(1) |
| ***pps_weighted_pred_flag*** | ***u(1)*** |
| ***pps_weighted_bipred_flag*** | ***u(1)*** |
| ***pps_ref_wraparound_enabled_flag*** | ***u(1)*** |
| ***if( pps_ref_wraparound_enabled_flag )*** | |
| ***pps_pic_width_minus_wraparound_offset*** | ***ue(v)*** |
| init_qp_minus26 | se(v) |
| pps_cu_qp_delta_enabled_flag | u(1) |
| pps_chroma_tool_offsets_present_flag | u(1) |
| if( pps_chroma_tool_offsets_present_flag ) { | |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
| pps_joint_cbcr_qp_offset_value | se(v) |
| pps_slice_chroma_qp_offsets_present_flag | u(1) |
| pps_cu_chroma_qp_offset_list_enabled_flag | u(1) |
| } | |
| if( pps_cu_chroma_qp_offset_list_enabled_flag ) { | |
| chroma_qp_offset_list_len minus1 | ue(v) |
| for( i = 0; i <= chroma_qp_offset_list_len minus1; i++ ) { | |
| cb_qp_offset_list[ i ] | se(v) |
| cr_qp_offset_list[ i ] | se(v) |
| if( pps_joint_cbcr_qp_offset_present_flag ) | |
| joint_cbcr_qp_offset_list[ i ] | se(v) |
| } | |
| } | |
| *##pps_weighted_pred_flag##* | *##u(1) ##* |
| *##pps_weighted_bipred_flag##* | *##u(1) ##* |
| deblocking_filter_control_present_flag | u(1) |
| if( deblocking_filter_control_present_flag ) { | |
| deblocking_filter_override_enabled_flag | u(1) |
| pps_deblocking_filter_enabled_flag | u(1) |
| if( !pps_no_pic_partition_flag && deblocking_filter_override_enabled_flag ) | |
| dbf_info_in_ph_flag | u(1) |
| if(pps_deblocking_filter_enabled_flag ) { | |
| pps_luma_beta_offset_div2 | se(v) |
| pps_luma_tc_offset_div2 | se(v) |
| if( pps_chroma_tool_offsets_present_flag ) { | |
| pps_cb_beta_offset_div2 | se(v) |
| pps_cb_tc_offset_div2 | se(v) |
| pps_cr_beta_offset_div2 | se(v) |
| pps_cr_tc_offset_div2 | se(v) |
| } | |
| } | |
| } | |

TABLE 27-continued

| Proposed sequence parameter set RBSP syntax | |
|---|---|
| pic_parameter_set_rbsp( ) { | Descriptor |
| if( !pps_no_pic_partition_flag ) { | |
| rpl_info_in_ph_flag | u(1) |
| sao_info_in_ph_flag | u(1) |
| alf_info_in_ph_flag | u(1) |
| if( ( pps_weighted_pred_flag | | pps_weighted_bipred_flag ) && rpl_info_in_ph_flag ) | |
| wp_info_in_ph_flag | u(1) |
| qp_delta_info_in_ph_flag | u(1) |
| } | |
| *##pps_ref_wraparound_enabled_flag##* | *##u(1) ##* |
| *##if( pps_ref_wraparound_enabled_flag ) ##* | |
| *##pps_pic_width_minus_wraparound_offset##* | *##ue(v) ##* |
| picture_header_extension_present_flag | u(1) |
| slice_header_extension_present_flag | u(1) |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

Figure 5:
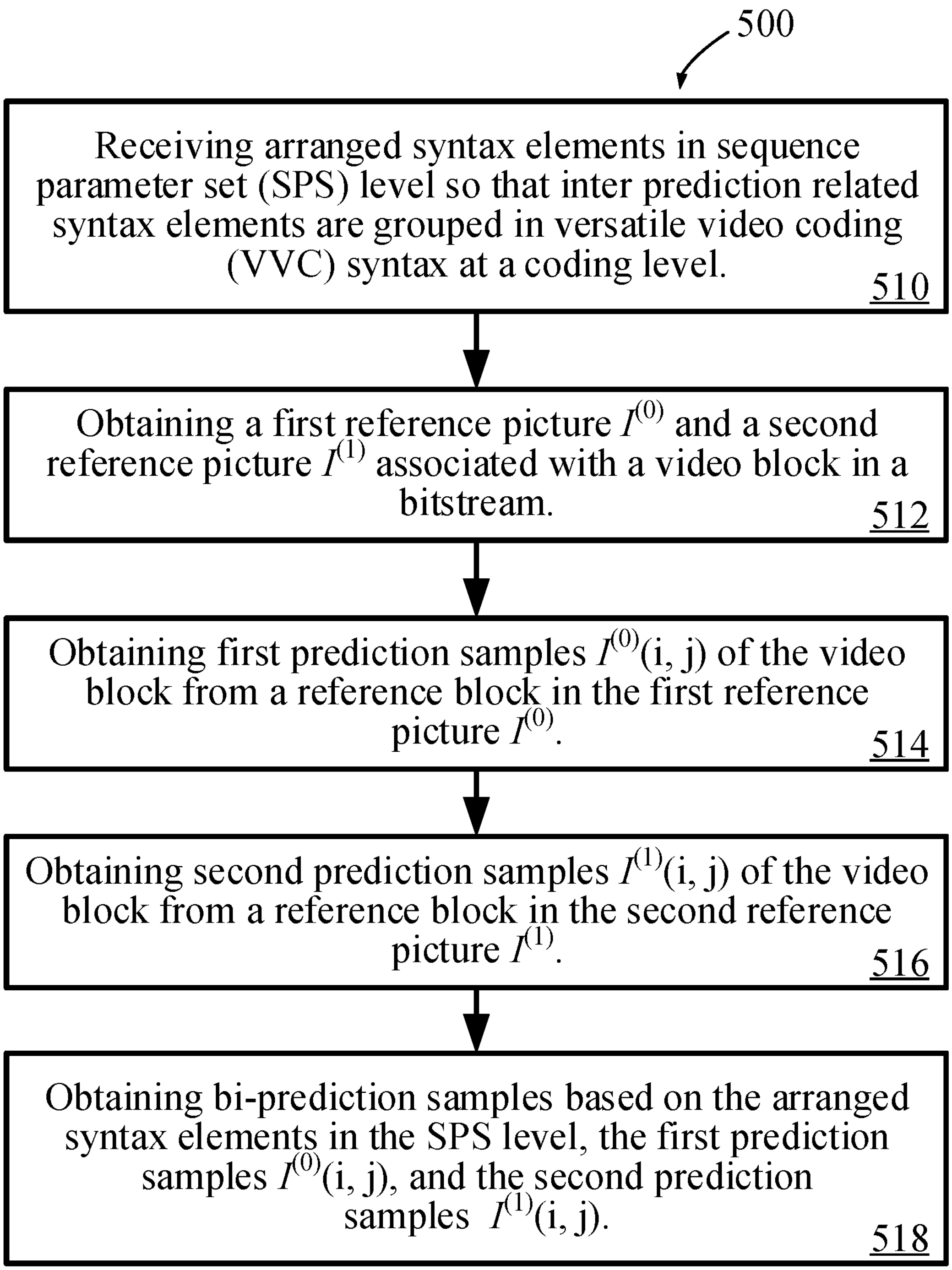
FIG. 5 is a method for decoding a video signal, according to an example of the present disclosure.

FIG. 5 shows a method for decoding a video signal in accordance with the present disclosure. The method may be, for example, applied to a decoder.

In step 510, the decoder may receive arranged syntax elements in SPS level so that inter prediction related syntax elements are grouped in VVC syntax at a coding level.

In step 512, the decoder may obtain a first reference picture $I^{(0)}$ and a second reference picture $I^{(1)}$ associated with a video block in a bitstream. The first reference picture $I^{(0)}$ is before a current picture and the second reference picture $I^{(1)}$ is after the current picture in display order.

In step 514, the decoder may obtain first prediction samples $I^{(0)}(i,j)$ of the video block from a reference block in the first reference picture $I^{(0)}$. The i and j represent a coordinate of one sample with the current picture.

In step 516, the decoder may obtain second prediction samples $I^{(1)}(i,j)$ of the video block from a reference block in the second reference picture $I^{(1)}$.

In step 518, the decoder may obtain bi-prediction samples based on the arranged syntax elements in the SPS level, the first prediction samples $I^{(0)}(i,j)$, and the second prediction samples $I^{(1)}$ (i,j).

Figure 6:
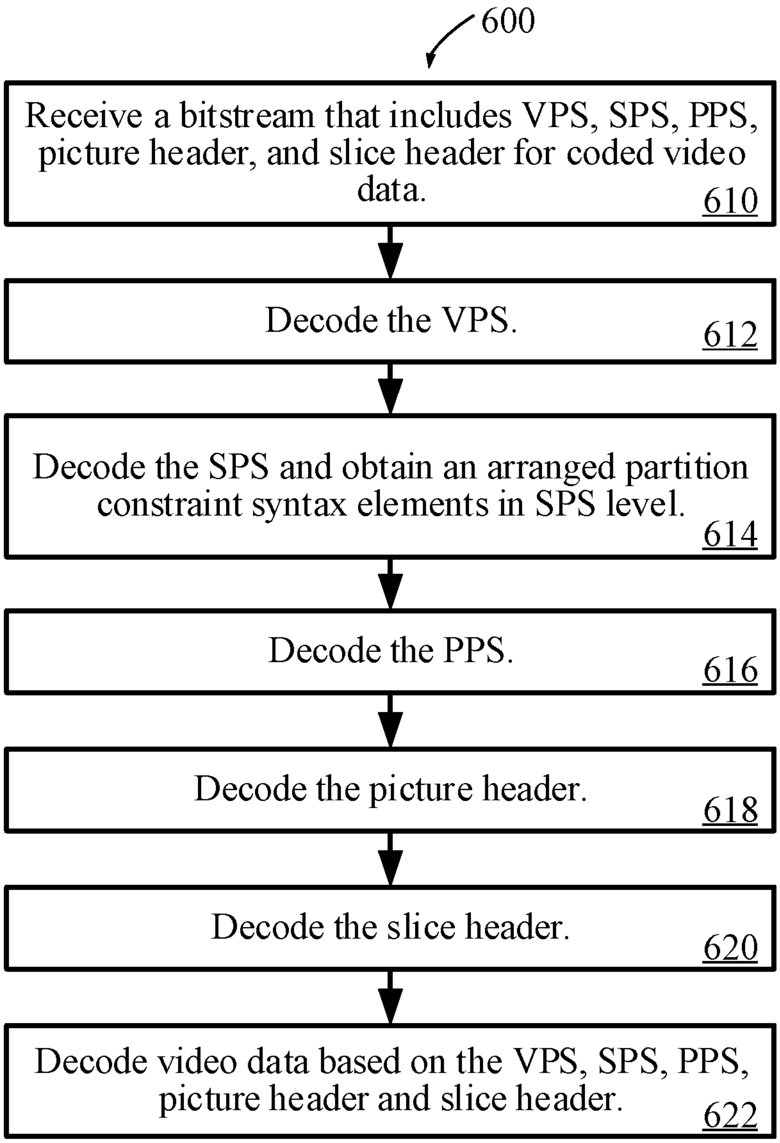
FIG. 6 is a method for decoding a video signal, according to an example of the present disclosure.

FIG. 6 shows a method for decoding a video signal in accordance with the present disclosure. The method may be, for example, applied to a decoder.

In step 610, the decoder may receive a bitstream that includes VPS, SPS, PPS, picture header, and slice header for coded video data.

In step 612, the decoder may decode the VPS.

In step 614, the decoder may decode the SPS and obtain an arranged partition constraint syntax elements in SPS level.

In step 616, the decoder may decode the PPS.

In step 618, the decoder may decode the picture header.

In step 620, the decoder may decode the slice header.

In step 622, the decoder may decode the video data based on VPS, SPS, PPS, picture header and slice header.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 7:
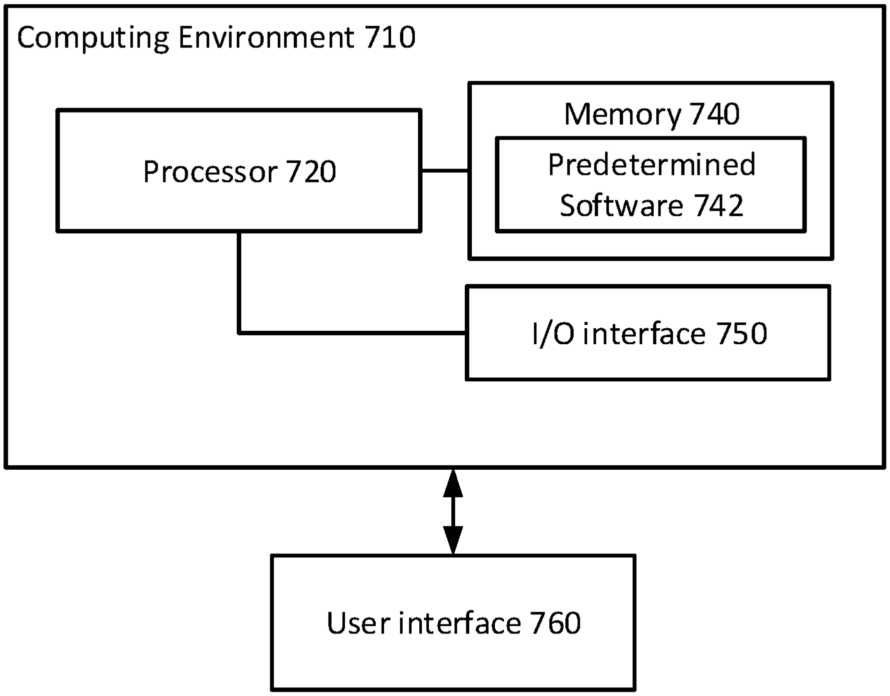
FIG. 7 is a diagram illustrating a computing environment coupled with a user interface, according to an example of the present disclosure.

FIG. 7 shows a computing environment 710 coupled with a user interface 760. The computing environment 710 can be part of a data processing server. The computing environment 710 includes processor 720, memory 740, and I/O interface 750.

The processor 720 typically controls overall operations of the computing environment 710, such as the operations associated with the display, data acquisition, data communications, and image processing. The processor 720 may include one or more processors to execute instructions to perform all or some of the steps in the above-described methods. Moreover, the processor 720 may include one or more modules that facilitate the interaction between the processor 720 and other components. The processor may be a Central Processing Unit (CPU), a microprocessor, a single chip machine, a GPU, or the like.

The memory 740 is configured to store various types of data to support the operation of the computing environment 710. Memory 740 may include predetermine software 742. Examples of such data include instructions for any applications or methods operated on the computing environment 710, video datasets, image data, etc. The memory 740) may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 750 provides an interface between the processor 720 and peripheral interface modules, such as a keyboard, a click wheel, buttons, and the like. The buttons may include but are not limited to, a home button, a start scan button, and a stop scan button. The I/O interface 750 can be coupled with an encoder and decoder.

In some embodiments, there is also provided a non-transitory computer-readable storage medium comprising a plurality of programs, such as comprised in the memory 740, executable by the processor 720 in the computing environment 710, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 710 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for decoding a video signal, comprising:

receiving, by a decoder through a bitstream, arranged syntax elements in a sequence parameter set (SPS) level, wherein the arranged syntax elements in the SPS level are obtained by arranging and grouping syntax elements related to a predefined function into a group corresponding to the predefined function at a coding level, wherein the predefined function comprises intra tools or inter tools, and further comprises screen content tools, transform tools, quantization tools, loop filter tools, or partition tools;

wherein receiving the arranged syntax elements in SPS level comprises:

in response to a first syntax element in the arranged syntax elements satisfying a predefined condition, receiving a second syntax element in the arranged syntax elements immediately after the first syntax element; and performing, by the decoder through the bitstream, the predefined function to video data from the bitstream in accordance with the first syntax element and the second syntax element.

2. The method of claim 1, further comprising:

setting, by the decoder, in response to the first syntax element not satisfying the predefined condition, a value of the second syntax element.

3. The method of claim 1, wherein the first syntax element is a sps_mmvd_enabled_flag flag, the second syntax element is a flag related to using integer sample precision for merge mode with motion vector difference, and the predefined condition comprises the sps_mmvd_enabled_flag flag being equal to 1.

4. The method of claim 1, wherein the arranged syntax elements at least comprise:

a sps_weighted_pred_flag flag, a sps_weighted_bipred_flag flag, a long_term_ref_pics_flag flag and a sps_ref_wraparound_enabled_flag flag.

5. The method of claim 1, wherein the first syntax element is a sps_affine_enabled_flag flag, the second syntax element is a five_minus_max_num_subblock_merge_cand value or a sps_affine_prof_enabled_flag flag, and the predefined condition comprises the sps_affine_enabled_flag flag being equal to 1.

6. The method of claim 1, wherein the first syntax element is a sps_affine_prof_enabled_flag flag, the second syntax element is a sps_prof_control_present_in_ph_flag flag, and the predefined condition comprises the sps_affine_prof_enabled_flag being equal to 1.

7. The method of claim 1, wherein the arranged syntax elements at least comprise:

a six_minus_max_num_merge_cand value, a sps_sbt_enabled_flag flag, a sps_bcw_enabled_flag flag, a sps_ciip_enabled_flag flag, and a log2_parallel_merge_level_minus2 value.

8. The method of claim 1, further comprising:

determining that a MaxNumMergeCand value is larger than or equal to 2;

receiving a sps_gpm_enabled_flag flag in the arranged syntax elements;

determining that the sps_gpm_enabled_flag flag is equal to 1 and the MaxNumMergeCand value is larger than or equal to 3; and receiving a max_num_merge_cand_minus_max_num_gpm_cand value in the arranged syntax elements.

9. The method of claim 1, further comprising:

receiving, by the decoder, arranged syntax elements in a picture parameter set (PPS) level so that the arranged syntax elements in PPS related to the predefined function are grouped at a coding level.

10. The method of claim 9, wherein receiving the arranged syntax elements in the PPS level comprises:

receiving a rpl1_idx_present_flag flag;

receiving a pps_weighted_pred_flag flag;

receiving a pps_weighted_bipred_flag flag;

receiving a pps_ref_wraparound_enabled_flag flag;

determining that pps_ref_wraparound_enabled_flag flag is equal to 1;

receiving a pps_pic_width_minus_wraparound_offset value; and receiving an init_qp_minus26 value.

11. The method of claim 9, wherein receiving the arranged syntax elements in the PPS level further comprising:

determining that pps_ref_wraparound_enabled_flag is not equal to 1; and setting a pps_pic_width_minus_wraparound_offset value.

12. A computing device, comprising:

one or more processors; and a non-transitory computer-readable storage medium storing instructions executable by the one or more processors, wherein the one or more processors are configured to:

receive arranged syntax elements in a sequence parameter set (SPS) level, wherein the arranged syntax elements in the SPS level are obtained by arranging and grouping syntax elements related to a predefined function into a group corresponding to the predefined function at a coding level, wherein the predefined function comprises intra tools and/or inter tools, and further comprises screen content tools, transform tools, quantization tools, loop filter tools, or partition tools;

in response to a first syntax element in the arranged syntax elements satisfying a predefined condition, receive a second syntax element in the arranged syntax elements immediately after the first syntax element; and perform the predefined function to video data from a bitstream in accordance with the first syntax element and the second syntax element.

13. The computing device of claim 12, wherein the one or more processors are further configured to:

in response to the first syntax element not satisfying the predefined condition, set a value of the second syntax element.

14. The computing device of claim 12, wherein the first syntax element is a sps_mmvd_enabled_flag flag, the second syntax element is a flag related to using integer sample precision for merge mode with motion vector difference, and the predefined condition comprises the sps_mmvd_enabled_flag being equal to 1; or the first syntax element is a sps_affine_enabled_flag flag, the second syntax element is a five_minus_max_num_subblock_merge_cand value or a sps_affine_prof_enabled_flag flag, and the predefined condition comprises the sps_affine_enabled_flag flag being equal to 1; or the first syntax element is a sps_affine_prof_enabled_flag flag, the second syntax element is a sps_prof_control_present_in_ph_flag flag, and the predefined condition comprises the sps_affine_prof_enabled_flag being equal to 1.

15. The computing device of claim 12, wherein the arranged syntax elements at least comprise: a sps_weighted_pred_flag flag, a sps_weighted_bipred_flag flag, a long_term_ref_pics_flag flag and a sps_ref_wraparound_enabled_flag flag; or the arranged syntax elements at least comprise: a six_minus_max_num_merge_cand value, a sps_sbt_enabled_flag flag, a sps_bcw_enabled_flag flag, a sps_ciip_enabled_flag flag, and a log2_parallel_merge_level_minus2 value.

16. The computing device of claim 12, wherein the one or more processors are configured to:

determine that a MaxNumMergeCand value is larger than or equal to 2;

receive a sps_gpm_enabled_flag flag in the arranged syntax elements;

determine that the sps_gpm_enabled_flag flag is equal to 1 and the MaxNumMergeCand value is larger than or equal to 3; and receive a max_num_merge_cand_minus_max_num_gpm_cand value in the arranged syntax elements.

17. The computing device of claim 12, wherein the one or more processors are further configured to:

receive arranged syntax elements in a picture parameter set (PPS) level so that the arranged syntax elements in PPS related to the predefined function are grouped at a coding level;

wherein receiving the arranged syntax elements in the PPS level comprises:

receiving a rpl1_idx_present_flag flag;

receiving a pps_weighted_pred_flag flag;

receiving a pps_weighted_bipred_flag flag;

receiving a pps_ref_wraparound_enabled_flag flag;

determining that pps_ref_wraparound_enabled_flag flag is equal to 1;

receiving a pps_pic_width_minus_wraparound_offset value; and receiving an init_qp_minus26 value;

wherein receiving the arranged syntax elements in the PPS level further comprises:

determining that pps_ref_wraparound_enabled_flag is not equal to 1; and setting a pps_pic_width_minus_wraparound_offset value.

18. A non-transitory computer-readable storage medium storing a plurality of programs for execution by a computing device having one or more processors, wherein the plurality of programs, when executed by the one or more processors, cause the computing device to perform acts comprising:

receiving arranged syntax elements in a sequence parameter set (SPS) level, wherein the arranged syntax elements in the SPS level are obtained by arranging and grouping syntax elements related to a predefined function into a group corresponding to the predefined function at a coding level, wherein the predefined function comprises intra tools and/or inter tools, and further comprises screen content tools, transform tools, quantization tools, loop filter tools, or partition tools;

wherein receiving the arranged syntax elements in SPS level comprises:

in response to a first syntax element in the arranged syntax elements satisfying a predefined condition, receiving a second syntax element in the arranged syntax elements immediately after the first syntax element; and performing the predefined function to video data from the bitstream in accordance with the first syntax element and the second syntax element.

* * * * *